US008736908B2

(12) United States Patent
Yeap et al.

(10) Patent No.: US 8,736,908 B2
(45) Date of Patent: May 27, 2014

(54) PRINTING AND AUTHENTICATION OF A SECURITY DOCUMENT ON A SUBSTRATE UTILIZING UNIQUE SUBSTRATE PROPERTIES

(75) Inventors: Alvin Wai Leong Yeap, Marsfield (AU); Andrew James Fields, Cremorne (AU); Nicolas Rowland de Courcy Bingham, North Ryde (AU); Shaun Peter O'Keefe, Artarmon (AU); Alan Gordon Doubleday, Macquarie Park (AU)

(73) Assignee: Canon Kabushiki Kaisha, Tokyo (JP)

( * ) Notice: Subject to any disclaimer, the term of this patent is extended or adjusted under 35 U.S.C. 154(b) by 1061 days.

(21) Appl. No.: 12/334,791

(22) Filed: Dec. 15, 2008

(65) Prior Publication Data

US 2009/0284802 A1    Nov. 19, 2009

(30) Foreign Application Priority Data

Dec. 24, 2007    (AU) ................................ 2007254661

(51) Int. Cl.
*H04N 1/40*    (2006.01)
*G06K 9/00*    (2006.01)

(52) U.S. Cl.
USPC ......................................... 358/3.28; 382/100

(58) Field of Classification Search
USPC ............ 382/100, 232; 380/210, 252, 287, 54;
713/176; 480/460; 386/94; 399/366;
283/902
See application file for complete search history.

(56) References Cited

U.S. PATENT DOCUMENTS

| 4,423,415 | A | 12/1983 | Goldman |
|---|---|---|---|
| 5,337,361 | A | 8/1994 | Wang et al. |
| 5,825,892 | A | 10/1998 | Braudaway et al. |
| 5,901,224 | A | 5/1999 | Hecht |
| 6,577,744 | B1 | 6/2003 | Braudaway et al. |
| 6,869,023 | B2 * | 3/2005 | Hawes ........................... 235/494 |
| 6,888,645 | B1 | 5/2005 | Fujimoto et al. |
| 7,028,188 | B1 * | 4/2006 | Moore ........................... 713/176 |
| 7,162,035 | B1 * | 1/2007 | Durst et al. ...................... 380/54 |
| 7,533,062 | B2 * | 5/2009 | Sanchez et al. .................. 705/51 |
| 7,609,850 | B2 | 10/2009 | Tapson |
| 8,009,329 | B2 * | 8/2011 | Bala et al. ..................... 358/3.28 |
| 8,457,346 | B2 * | 6/2013 | Rodriguez et al. ............. 382/100 |
| 2002/0090110 | A1 | 7/2002 | Braudaway et al. |
| 2004/0234139 | A1 | 11/2004 | Moroo et al. |
| 2005/0215293 | A1 | 9/2005 | Zolla et al. |
| 2006/0274339 | A1 | 12/2006 | Moroo et al. |
| 2007/0109312 | A1 | 5/2007 | Wada et al. |
| 2007/0127077 | A1 * | 6/2007 | Tamura ......................... 358/3.28 |
| 2008/0212824 | A1 | 9/2008 | Braudaway et al. |
| 2008/0253674 | A1 | 10/2008 | Moroo et al. |

FOREIGN PATENT DOCUMENTS

| JP | 7-030743 | 1/1995 |
|---|---|---|
| JP | 10-190893 | 7/1998 |
| JP | 2000-321925 | 11/2000 |
| JP | 2002-252753 | 9/2002 |
| JP | 2004-349879 | 12/2004 |

(Continued)

*Primary Examiner* — Barbara Reinier
(74) *Attorney, Agent, or Firm* — Fitzpatrick, Cella, Harper & Scinto

(57) ABSTRACT

A method for printing a security document on a substrate is disclosed. Firstly, a first reference image of a reference region of the substrate is generated, the image being indicative of an inherent characteristic of the substrate in the reference region. This is followed by generating encoded data indicative of the inherent characteristic of the substrate. Finally, the encoded data is printed over the reference region of the substrate, thus effecting the print of the security document.

15 Claims, 44 Drawing Sheets

(56) References Cited

FOREIGN PATENT DOCUMENTS

| JP | 2006-209741 | 8/2006 |
| JP | 2006-279640 | 10/2006 |
| JP | 2006-339962 | 12/2006 |
| JP | 2007-004479 | 1/2007 |
| JP | 2007-036317 | 2/2007 |
| JP | 2007-135091 | 5/2007 |
| JP | 2007-531401 | 11/2007 |
| WO | WO 97/24699 | 7/1997 |
| WO | 2004/084539 | 9/2004 |

* cited by examiner

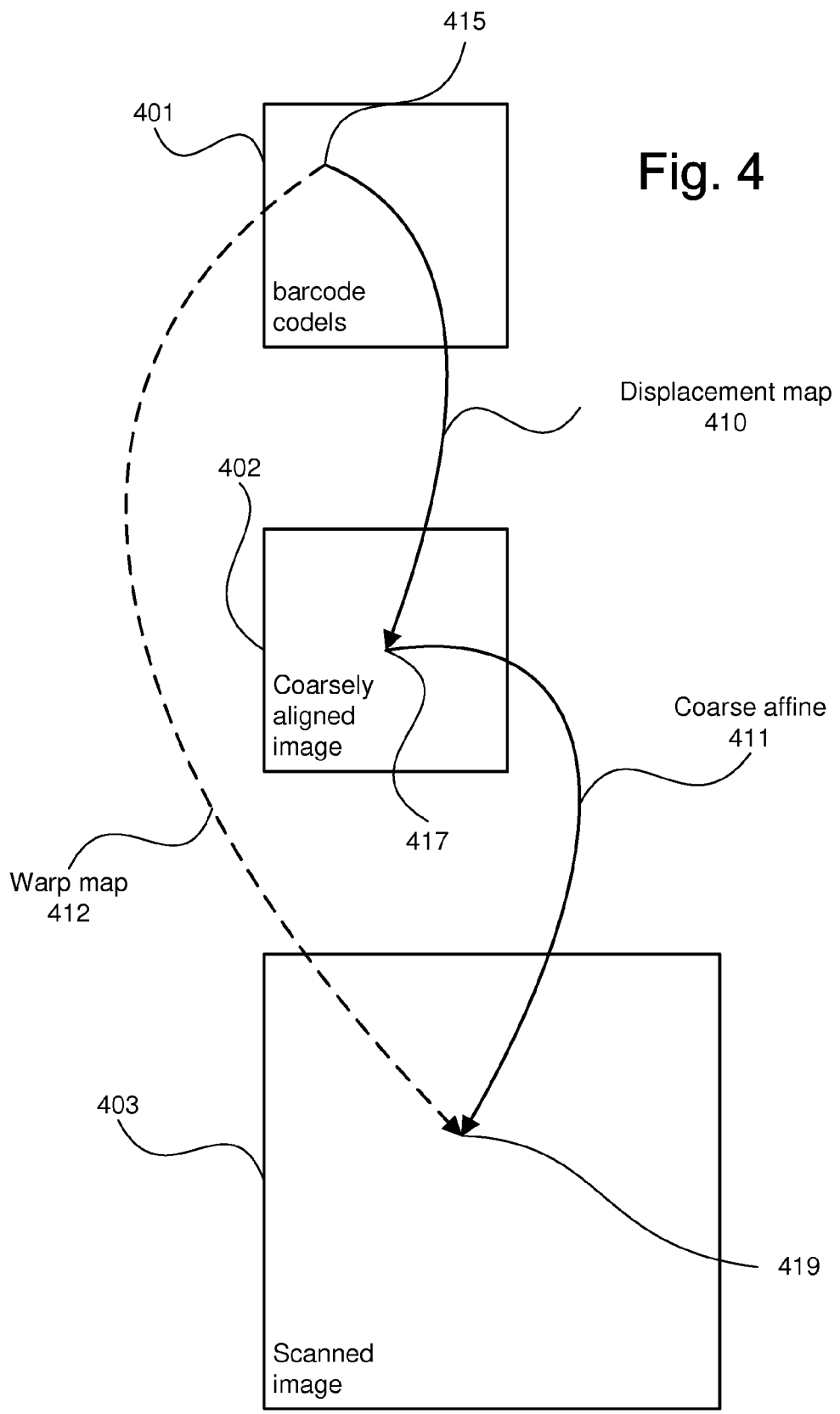

PRINTING AND AUTHENTICATION OF A SECURITY DOCUMENT ON A SUBSTRATE UTILIZING UNIQUE SUBSTRATE PROPERTIES

CROSS-REFERENCE TO RELATED PATENT APPLICATIONS

This application claims the right of priority under 35 U.S.C. §119 based on Australian Patent Application No. 2007254661, filed on 24 Dec. 2007, which is incorporated by reference herein in its entirety as if fully set forth herein.

FIELD OF THE INVENTION

Methods and systems are described that relate to printing and authenticating security documents, and in particular, to documents printed on substrates.

BACKGROUND

Since the invention of printing technology, industry has endeavoured to devise techniques to combat forgery of printed documents. For instance, there are continuing efforts to prevent forgery of bank notes.

Recently, the advent of inexpensive, high-resolution scanning and printing equipment has improved the quality of the forged documents and made it increasingly difficult to detect forged printed documents. Furthermore, the popularity of printed documents as value-bearing instruments is increasing and, hence, printed documents are an appealing target for would-be forgers. For example, forged cheques and tickets often remain undetected.

It is, therefore, desirable to be able to authenticate printed documents. Further, it is desirable that the authentication methods are automated. Such automation will provide greater accuracy, consistency and speed.

One known class of methods for document authentication involves placing a mark that is difficult to replicate on the document. Examples of such marks are holographic emblems and embedded watermarks. Forgers require expensive equipment and a great deal of knowledge to be able to successfully replicate a document authenticated in such manner. However, such marks are expensive to produce and may not be machine-readable.

Another known class of known methods aims to prevent forgery by encoding machine-readable marks on the surface of the document. Upon detection of these machine-readable marks on a document, the copying machine is instructed to halt replication of the document. These marks are inexpensive to reproduce, since they may be printed with a conventional printer. However, a forger may degrade the machine-readable marks to a point where the human-readable document content is satisfactorily reproduced, yet the machine-readable marks are undetectable by the copying machine.

A further class of methods involves encoding a printed image in a barcode and printing the barcode over the printed image. The printed image may be a photograph of a person's head, such as those often used in drivers' licenses. This protects the photograph from tampering since any changes to the photograph would result in a mismatch between the barcode data and the altered photograph. However, these methods afford little security from forgery in which the photograph and barcode are replicated without alteration.

A further class of methods identifies characteristics of a region of the substrate of the document (which is typically paper) and stores centrally information about the identity of document and about the corresponding paper characteristic. When a document is to be authenticated, its paper is again characterised, and compared to the reference paper characteristic stored previously. These methods are very effective at detecting forged documents since each paper characteristic is unique. However, if a large number of documents are to be protected, a large set of paper characteristics will need to be stored centrally. The remote access to a centralized server with a database of security documents may also be a security problem.

Recent methods have been devised to overcome the need to centrally store the paper characteristics. These methods involve encoding the paper characteristics of a document in a barcode encoded somewhere on the document itself. With this technique, the document is considered to be self-verifying since all the information needed to authenticate the document is carried on the document. One disadvantage of these methods is that the region occupied by the barcode and the region of paper that is characterized, limit the amount of user-related data that can be printed on the document. Furthermore, the set of synchronization marks required for each of these regions are highly visible and are, therefore, susceptible to tampering. However, if synchronization marks are only used for the barcode, and the paper characteristic region is specified relative to the barcode, local warping and distortions may hamper accurate characterization of the paper region.

Thus, a need exists for more efficient methods of generating and authenticating security printed documents.

SUMMARY

According to a first aspect of the present disclosure, there is provided a method for printing a security document on a substrate, comprising the steps of;
  generating a first reference image of a reference region of the substrate, the image being indicative of an inherent characteristic of the substrate in the reference region;
  generating encoded data indicative of the inherent characteristic of the substrate; and
  printing the encoded data over the reference region of the substrate, thus effecting the print of the security document.

Preferably, the encoded data is overlaid on the reference region of the substrate in manner which allows a second reference image of the reference region to be generated, the second reference image being indicative of the inherent characteristic of the underlying substrate, such that a comparison between data of the inherent characteristic of the substrate in the reference region, obtained from the encoded data and from the second reference image, is indicative of the authenticity of the substrate.

According to a second aspect of the present disclosure, there is provided a method for authenticating a security document printed on a substrate by the method of the first aspect, the method comprising the steps:
  scanning the security document to obtain the first reference image;
  detecting the reference region of the substrate;
  extracting and decoding the data encoded in the reference region of the substrate;
  obtaining the second reference image of the reference region of the substrate; and
  comparing data associated with the inherent characteristic of the reference region of the substrate, obtained from the decoded data, with respective data obtained from the second reference image.

According to a third aspect of the present disclosure, there is provided a system for printing a security document on a substrate, the system comprising;

a processing device arranged for generating a bitmap of an intermediate document, the bitmap comprising at least one location identification arrangement;

a printing device, controlled by the processing device, for printing the intermediate document on the substrate; and a scanning device for scanning the printed intermediate document; wherein the a processing device is further arranged for;

locating on the scanned intermediate document a reference region of the substrate that is located in a predetermined spatial arrangement with respect to the at least one location identification arrangement;

generating encoded data comprising the inherent characteristic of the substrate in the reference region;

including the encoded data in the bitmap of the intermediate document, thus forming a bitmap of the security document; and instructing the printing device to print the security document on the substrate of the printed intermediate document, such that the encoded data is overlaid on the reference region of the substrate.

According to a fourth aspect of the present disclosure, there is provided a system for authenticating a security document printed on a substrate by the method of the first aspect of the invention, the system comprising;

a scanning device for scanning the security document; and processing means for processing an image obtained from the scanning device to;

detect the reference region of the substrate;

extract and decode the data encoded in the reference region of the substrate;

process the image of the reference region of the substrate; and compare data associated with a structural characteristic of the reference region of the substrate, obtained from the decoded data, with respective data of the same structural characteristic obtained from the processed image.

Other aspects of the present disclosure, related to computer programs and computer program products associated with the hereinbefore stated four aspects of the invention, are also disclosed.

BRIEF DESCRIPTION OF THE DRAWINGS

One or more embodiments of the invention will now be described with reference to the following drawings, in which:

FIG. 4 shows the mapping of coordinates from barcode elements (codels) to a coarsely aligned image and a scanned image of the protected document of FIG. 2;

DETAILED DESCRIPTION INCLUDING BEST MODE

Introduction

It is to be noted that the discussions contained in the "Background" section and that relating to prior art arrangements mention documents and/or devices which form public knowledge through their respective publication and/or use. Such should not be interpreted as a representation by the present inventor(s) or patent applicant that such documents or devices in any way form part of the common general knowledge in the art.

The term 'document' as referred to below refers to a color image. Text documents and the like may be converted into color images before being forgery-protected in accordance with the methods described below.

The term 'protected document' refers to a document (i.e., a color document) with additional features appended to the document that allow for automatic authentication of the document.

When a document is printed, pixels of the document are represented as squares of ink on a document substrate. As an example, the document substrate may be paper. Each pixel, or square of ink, is formed by either an absence of ink or some combination of different colored inks.

Hardware Implementation

The hereinafter described methods for encoding and decoding data in the form of coding marks may be implemented using a computer system 100, shown in FIG. 1, wherein the steps of each respective method may be implemented by way of one or more application programs executable within the computer system 100. In particular, the various steps in the described methods for generating and/or authenticating security documents are effected by software instructions carried out within the computer system 100. The instructions may be formed as one or more code modules, each for performing one or more particular tasks. The software may also be divided into two separate parts, in which a first part and the corresponding code modules perform the described method and a second part and the corresponding code modules manage a user interface between the first part and the user. The software may be stored in a computer readable medium, including the storage devices described below, for example. The software is loaded into the computer system 100 from the computer readable medium, and then executed by the computer system 100. A computer readable medium having such software or computer program recorded on it is a computer program product. The use of the computer program product in the computer system 100 preferably effects the hereinafter described advantageous methods for generating and/or authenticating security documents.

Figure 1:
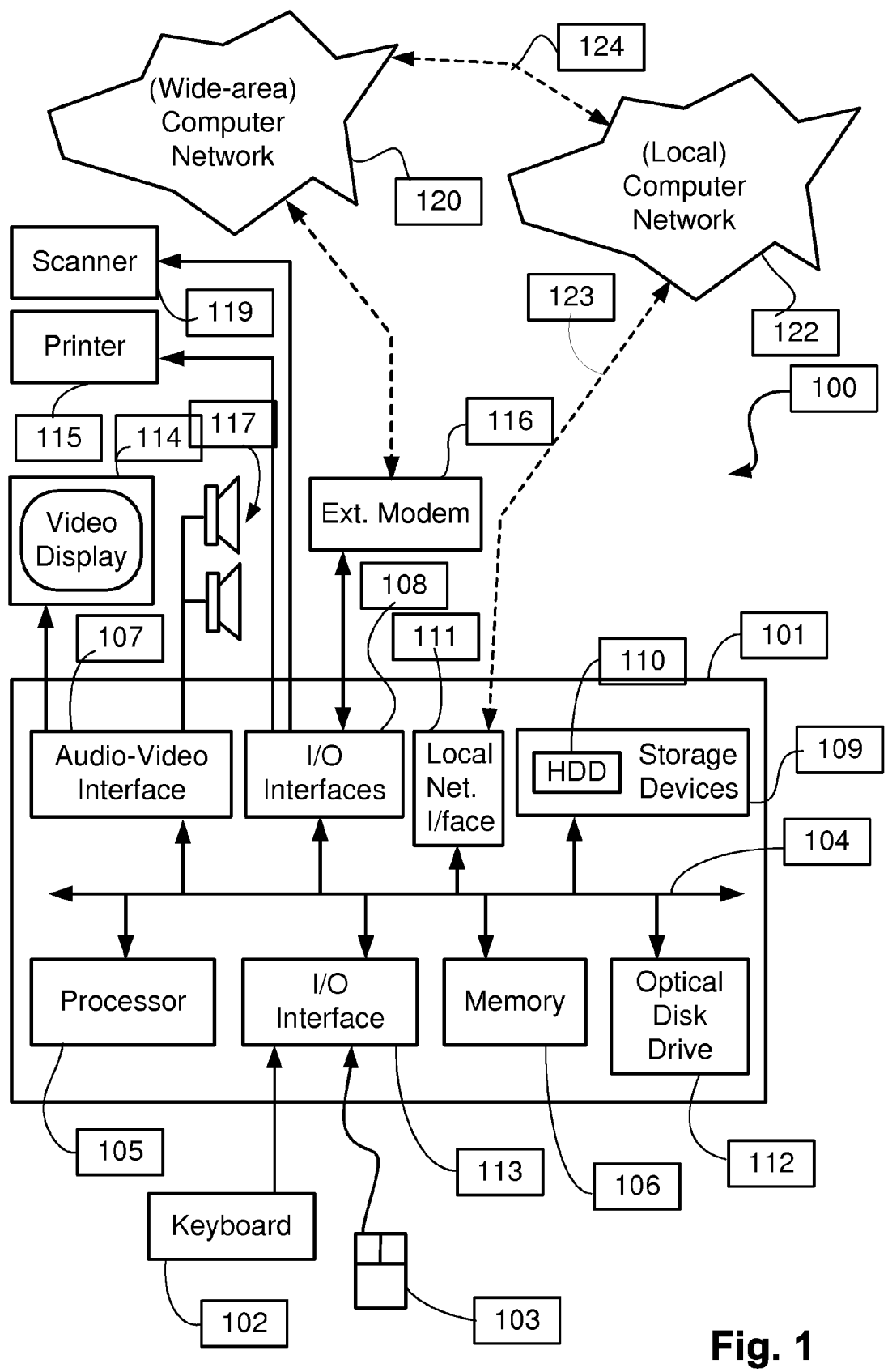
FIG. 1 shows a schematic block diagram of a general purpose computer system upon which the described arrangements can be practiced.

As seen in FIG. 1, the computer system 100 is formed by a computer module 101, input devices such as a keyboard 102 and a mouse pointer device 103, and output devices including a printer 115, a display device 114 and loudspeakers 117 and a scanner 119. An external Modulator-Demodulator (Modem) transceiver device 116 may be used by the computer module 101 for communicating to and from a communications network 120 via a connection 121. The network 120 may be a wide-area network (WAN), such as the Internet or a private WAN. Where the connection 121 is a telephone line, the modem 116 may be a traditional "dial-up" modem. Alternatively, where the connection 121 is a high capacity (eg: cable) connection, the modem 116 may be a broadband modem. A wireless modem may also be used for wireless connection to the network 120.

The computer module 101 typically includes at least one processor unit 105, and a memory unit 106 for example formed from semiconductor random access memory (RAM) and read only memory (ROM). The module 101 also includes an number of input/output (I/O) interfaces including an audio-video interface 107 that couples to the video display 114 and loudspeakers 117, an I/O interface 113 for the keyboard 102 and mouse 103 and optionally a joystick (not illustrated), and an interface 108 for the external modem 116 and printer 115. In some implementations, the modem 116 may be incorporated within the computer module 101, for example within the interface 108. The computer module 101 also has a local network interface 111 which, via a connection 123, permits coupling of the computer system 100 to a local computer network 122, known as a Local Area Network (LAN). As also illustrated, the local network 122 may also couple to the wide network 120 via a connection 124, which would typically include a so-called "firewall" device or similar functionality. The interface 111 may be formed by an Ethernet™ circuit card, a wireless Bluetooth™ or an IEEE 802.11 wireless arrangement.

The interfaces 108 and 113 may afford both serial and parallel connectivity, the former typically being implemented according to the Universal Serial Bus (USB) standards and having corresponding USB connectors (not illustrated). Storage devices 109 are provided and typically include a hard disk drive (HDD) 110. Other devices such as a floppy disk drive and a magnetic tape drive (not illustrated) may also be used. An optical disk drive 112 is typically provided to act as a non-volatile source of data. Portable memory devices, such optical disks (eg: CD-ROM, DVD), USB-RAM, and floppy disks for example may then be used as appropriate sources of data to the system 100.

The components 105, to 113 of the computer module 101 typically communicate via an interconnected bus 104 and in a manner which results in a conventional mode of operation of the computer system 100 known to those in the relevant art. Examples of computers on which the described arrangements can be practiced include IBM-PC's and compatibles, Sun Sparcstations, Apple Mac™ or alike computer systems evolved therefrom.

Typically, the application programs for implementing the discussed methods for generating and/or authenticating security documents are resident on the hard disk drive 110 and read and controlled in execution by the processor 105. Intermediate storage of such programs and any data fetched from the networks 120 and 122 may be accomplished using the semiconductor memory 106, possibly in concert with the hard disk drive 110. In some instances, the application programs may be supplied to the user encoded on one or more CD-ROM and read via the corresponding drive 112, or alternatively may be read by the user from the networks 120 or 122. Still further, the software can also be loaded into the computer system 100 from other computer readable media. Computer readable storage media refers to any storage medium that participates in providing instructions and/or data to the computer system 100 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 114. Through manipulation of the keyboard 102 and the mouse 103, a user of the computer system 100 and the application may manipulate the interface to provide controlling commands and/or input to the applications associated with the GUI(s).

The discussed methods steps for generating and/or authenticating security documents may alternatively be implemented in one or more dedicated hardware modules that may include graphic processors, digital signal processors, or one or more microprocessors and associated memories.

First Embodiment

Elements Making Up a Protected Document

In a first embodiment, a barcode that encodes an image of a region of the document substrate is embedded in the document to form a protected document. The barcode is printed in yellow as the yellow ink does not contribute substantially to the grey intensity image of the document substrate region as will be discussed below.

Figure 2:
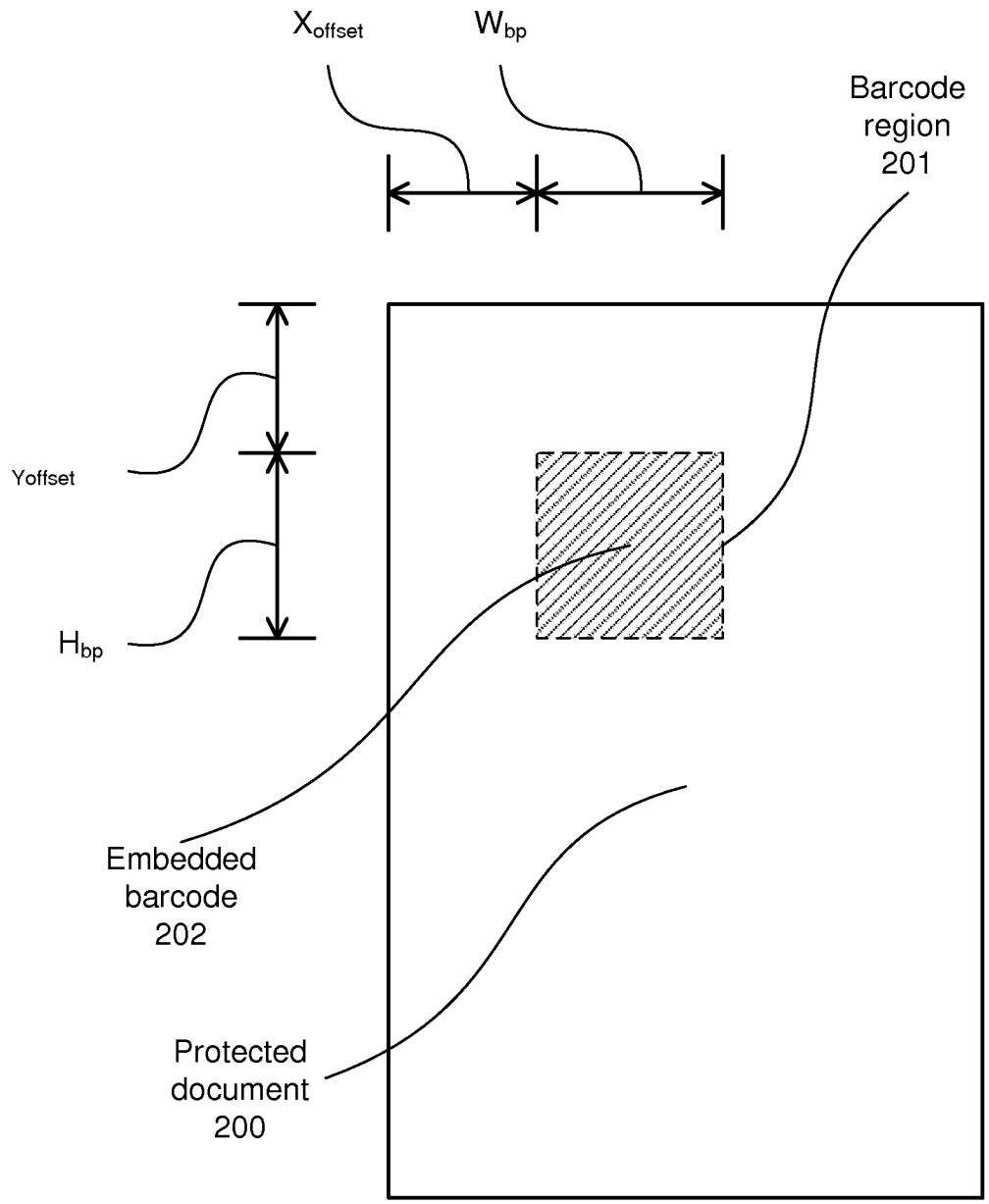
FIG. 2 shows a schematic representation of a protected document, according the described method for generating a security document on a substrate.

FIG. 2 shows a protected document 200. The barcode when embedded in a document occupies a barcode region 201 specified by a vertical offset from the top left-hand corner ($Y_{offset}$) in pixels, a horizontal offset from the top-left corner ($X_{offset}$) in pixels, a region width ($W_{bp}$) in pixels and a region height ($H_{bp}$) in pixels. 202 is an embedded barcode. In this embodiment, the image encoded in the barcode is one of a region of the document substrate with the same dimensions and offsets as the barcode region. Therefore, the term 'document substrate region' is synonymous with 'barcode region'.

An embedded barcode 202 is generated by first creating a barcode, then embedding the barcode in a document, which will be described in detail below. A barcode is a two-dimensional grid of elements (the basic bitmap barcode element will be hereinafter referred to as a codel) specified by a width ($W_{bb}$) [in codels] and height ($H_{bb}$) [in codels]. The barcode is generated at a codel resolution ($R_c$) that is a factor of the print resolution ($R_p$) (i.e., $R_p/R_c=M$, where M is an integer). For example, given a print resolution $R_p=600$ dots-per-inch, a valid codel resolution is $R_c=150$ codels-per-inch.

Figure 3A:
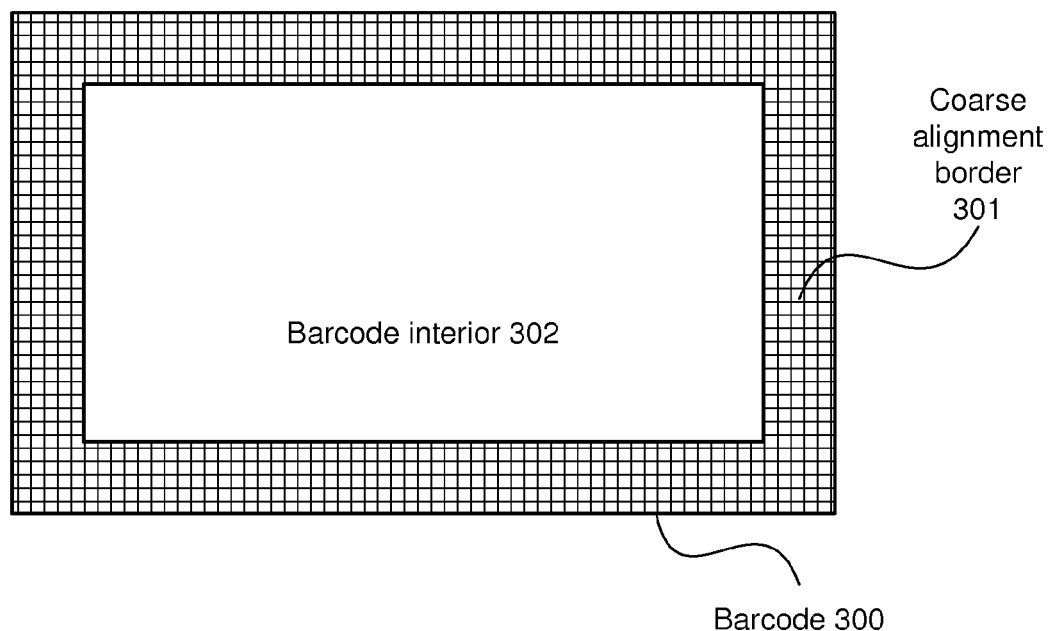
FIGS. 3A and 3B show an area of a barcode and one particular arrangement of the coded data within the barcode area, respectively.

FIG. 3A shows a barcode 300. A barcode 300 comprises a coarse-alignment border 301. The border has a width, which may be denoted as 'B'. For example, B may be equal to thirty-two (32) meaning that the barcode 300 has a coarse-alignment border 301 thirty-two (32) codels on all four sides of the barcode 300.

Figure 3B:
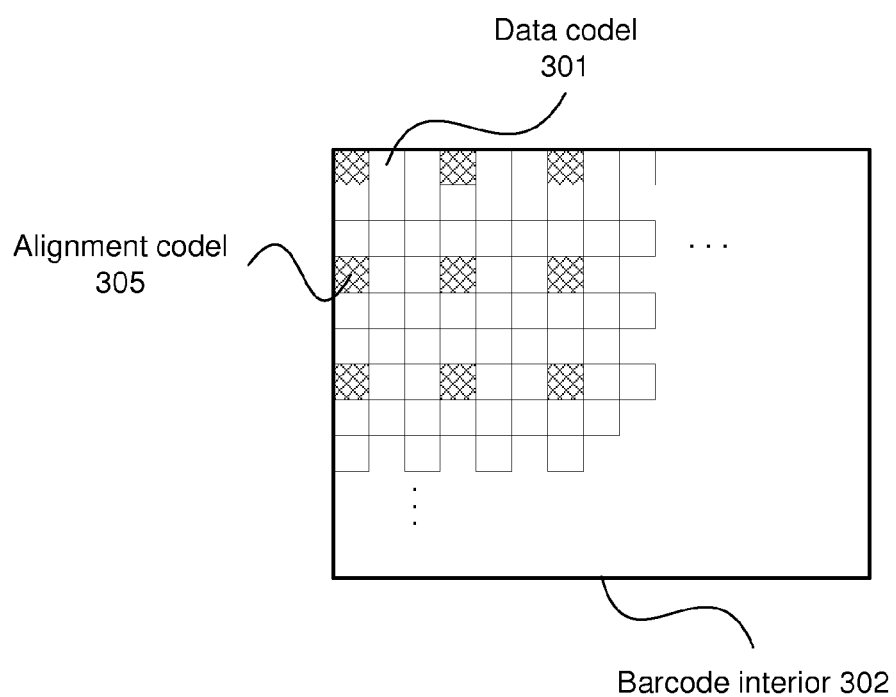

The barcode 300 also comprises an interior 302. The interior 302 of the barcode 300 comprises all codels of the barcode 300 that are not in the border 301. In the interior 302, some of the codels may be referred to as "alignment codels" 305, as seen in FIG. 3B. Alignment codels 305, and border codels may be used to perform fine alignment on the barcode, which will be described in detail below.

The alignment codels 305 are codels whose row and column coordinates are divisible by three (3). However, the alignment codels 305 may be arranged in any other suitable arrangement.

As described above, the dimensions of the barcode 300 may be specified by the width ($W_{bb}$) in codels and height ($H_{bb}$) in codels. In order to ensure the barcode is able to encode sufficient data to represent the image of the document substrate region, a method to calculate $W_{bb}$ and $H_{bb}$ is described in detail below. The vertical offset ($Y_{offset}$) and horizontal offsets ($X_{offset}$) may be user-specified so that the region occupies a blank area in the document. Alternatively, well-known machine methods of selecting an empty region in the document may be used.

In order to refer to specific pixels or codels in a document or image or barcode bitmap, a coordinate system is introduced. A pixel or codel is represented by a pair of coordinates (x, y). Here x specifies the pixel's or codel's column; and y specifies the pixel's or codel's row. Also, the notation a (x, y) is used to refer to a value of the pixel or codel at coordinate (x, y).

Calculating Barcode Dimensions

The dimensions of a barcode that encodes an image of the document substrate region depends on the data capacity required. The required data capacity may be found from the values of parameters used in the methods described in detail below.

For this embodiment, an image of the document substrate region is characterized by a vector of numerical values. The number of bits required to store the vector, SizeV, can be found from the number of elements in the vector $N_v$ and the number of bits used to store each element $N_{bits}$ using the following equation:

$$\text{Size}V = N_v \times N_{bits}$$

Subsequently, the vector of numerical values is serialized and may be encrypted with a well-known RSA encryption method. The RSA encryption method may require an additional $N_{rsa}$ bits. Therefore, the number of bits of the resulting binary data may be found with the following formula:

$$\text{DataSize}_{unrounded} = N_{rsa} + \text{Size}V$$

Subsequently, an error-correcting code is applied to the binary data. The error-correcting code, detailed below, splits the binary data into blocks of length K. If the length of the binary data is not a multiple of K, then the final data size, DataSize, may be found by rounding $\text{DataSize}_{unrounded}$ to the next multiple of K.

The number of codels NumCodels required to store DataSize bits of data can be found from the following formula:

$$\text{NumCodels} = \text{ceil}(9/8 \times \text{DataSize}), \text{ where "ceil" is a ceiling function.}$$

Once the number of codels NumCodels is found, the height of the barcode interior $H_{bi}$ 302 may be found by first selecting the width of the barcode interior $W_{bi}$. In order to make it easier to determine the dimensions of the barcode 300 from a scanned image of the protected document 300, the possible values of height ($H_{bi}$) and width ($W_{bi}$) for the barcode interior 302 may be limited to multiples of the width B of the coarse alignment border 301. Once the width of the barcode interior $W_{bi}$ is selected as a multiple of B, then the height of the barcode interior may be found by the following formula:

$$H_{bi} = \text{round}(\text{NumCodels}/W_{bi})$$

The width of the barcode 300 $W_{bb}$ and the height of the barcode $H_{bb}$ can be calculated with the following formulae:

$$H_{bb} = H_{bi} + 2B$$

$$W_{bb} = W_{bi} + 2B$$

The width $W_{bp}$ and height $H_{bp}$ in pixels of the barcode region can now be found by the following formulae:

$$H_{bp} = (R_p/R_c) \times H_{bb}$$

$$W_{bp} = (R_p/R_c) \times W_{bb}$$

Two-Stage Alignment

Determining the location of codels in a scanned image of the protected document 200, produced using the scanner 119 when reading the protected document 200, can be problematic. A major problem with conventional methods of determining the location of codels in a scanned image is their inability to accurately determine the location of codels at anything except trivially low resolutions. However, using the methods described herein, codel locations in a scanned image of the protected document 200 generated using the scanner 119 (e.g., a standard commercial scanner) and printer 115 may be accurately determined at resolutions up to 200 dpi. This upper resolution is due to the quality of the printing and scanning process, and is not an intrinsic limitation of the methods described herein. As printers and scanners improve in quality, higher resolutions will be possible using the described methods without modification.

Determination of the location of codels in a scanned image of the protected document 200 can be problematic since the barcode codel resolution (e.g., 150 codels-per-inch) may be less than the scan resolution (e.g., 600 dpi). This means that a codel in the scanned image is 4-by-4 scanned pixels in size. The location of the centre of the codel in the scanned image is required to be determined accurately. However, due to distortions and warping, the locations of codels in the scanned image of the protected document may deviate from their expected locations.

The location of codels in the scanned image of the protected document 200 may be determined using "coarse alignment" and "fine alignment". Coarse alignment represents an approximate mapping between codels and the coordinates of their centres in the scanned image of the protected document 200. Coarse alignment may use an affine transformation. Since the mapping between codels and their location in the scanned image is usually more complicated than an affine transform, coarse alignment may not accurately represent the codel locations. Once the coarse alignment affine transform has been found, the scanned image may be transformed, undoing the effects of the original affine transform, and thus producing an image that is approximately the same as the original embedded barcode 202. This image that is approximately the same as the original embedded barcode 202 may be referred to as the coarsely-aligned image.

FIG. 4 shows a coarsely-aligned image 402 and a scanned image 403. A representation of a coarse alignment affine transform 411 is also shown. The coarse alignment affine transform 411 takes coordinates in the coarsely-aligned image and maps the coordinates in the coarsely-aligned image to coordinates in the scanned image.

Fine alignment may be used to determine the mapping between barcode codels 401, as shown in FIG. 4, and the coarsely-aligned image 402, using an array of displacement vectors 410. Such an array of displacement vectors may be referred to as a "displacement map".

The displacement map 410 and the coarse alignment affine transform 411 together provide a mapping from the barcode 401 to coordinates in the scanned image 403. Given the coordinates of a codel 415 in the barcode 401, the displacement map 410 may be used to find the coordinates of the centre of that codel 417 in the coarsely-aligned image 402. Those coordinates may then be transformed by the coarse alignment affine transform 411, resulting in the coordinates of the centre of the codel 419 in the scanned image 403. Thus the composition of the displacement map 410 and the affine transform 411 results in a mapping from the codel coordinates (e.g., the coordinates 415) to the scanned image coordinates (e.g., the coordinates 419). The composed mapping is called a warp map. A representation of a warp map 412 is also shown in FIG. 4.

Creating and Authenticating Protected Documents

An overview of the processes necessary to create and authenticate a protected document is presented.

Figure 5:
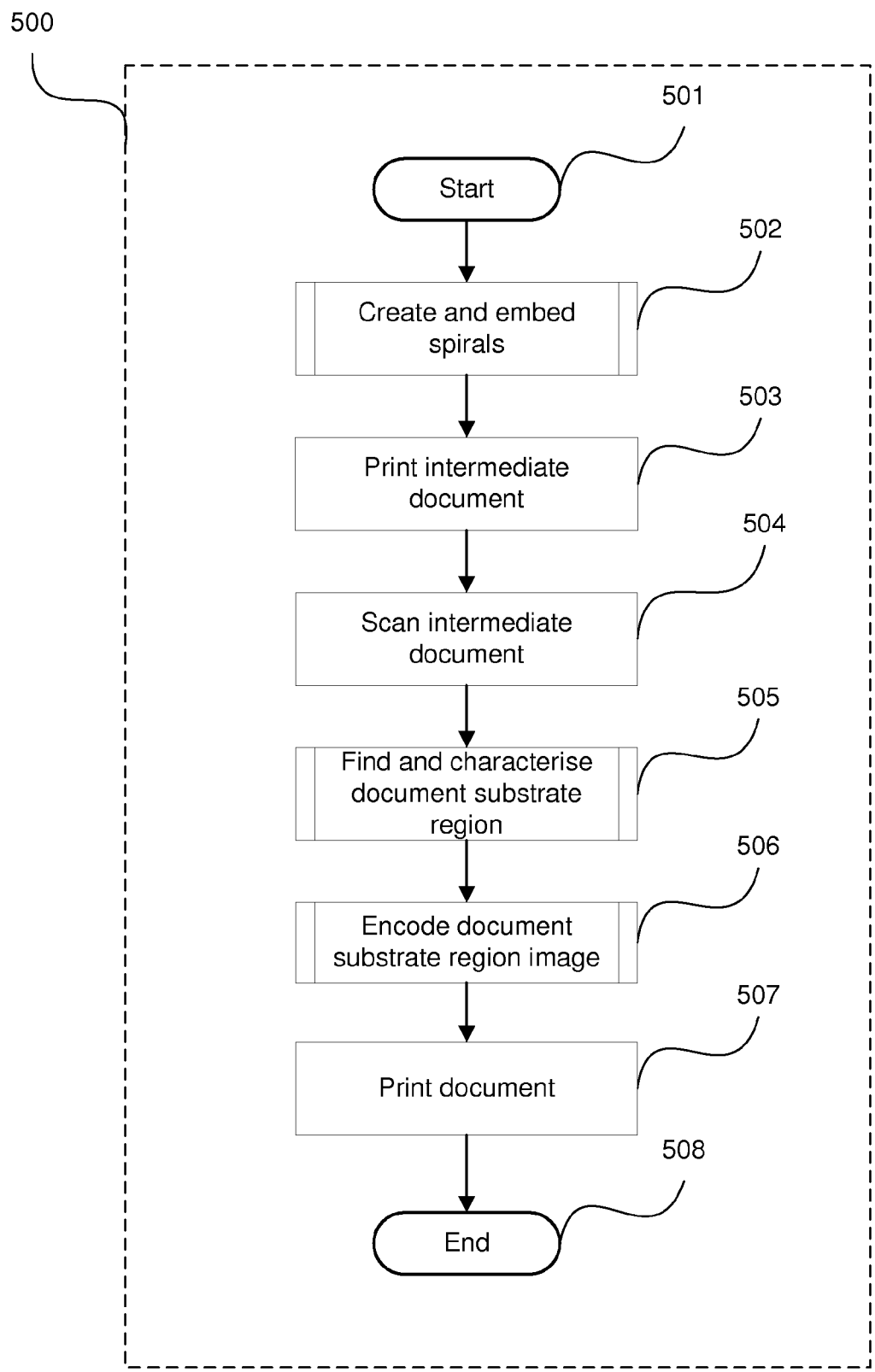
FIG. 5 is a flow diagram showing a method of creating a protected document according to a first embodiment of the invention.

Firstly, a process for creating a protected document is considered. FIG. 5 shows a method for creating a protected document.

The method 500 commences at an initial step 501. A following step 502 creates and embeds spirals in a document to form an 'intermediate document'. The embedded spirals can be treated as location identification arrangements, since their main function is to, once detected, indicate the location of the document substrate region. For this purpose, the document substrate region is in a predetermined spatial arrangement with respect to the spirals. For example, as will be explained with reference to some of the embodiments that will be described later in the text, the spirals may be used to outline an area on the sheet of paper of a predetermined shape, such as square, rectangular etc. This area can then be arranged to enclose the document substrate region. Of course, the spirals are only one possible example and other location-identification marks and/or arrangements can also be used.

A following step 503 prints the intermediate document. A following step 504 scans the intermediate document printed in 503 to form a scanned image. A following step 505 locates the document substrate region, by locating spirals in the scanned image of the intermediate document. Data can be obtained from the imaging of the substrate region defined by the spirals, which is indicative of one or more inherent characteristics of the substrate. Such characteristics can be related to the colour or the structure of the underlying surface, or the body, of the paper sheet and may also be referred to as paper sheet "signature". Step 505 characterizes the document substrate region with a vector of numerical values that is indicative of one or more such characteristics. A following step 506 encodes the vector of numerical values, that characterize the document substrate region image, in a barcode, and embeds the barcode into a blank document for printing. A following step 507 prints the blank document with an embedded barcode on the intermediate document printed in 503, by overlaying the barcode onto the document substrate region, to form a protected document 200. The method 500 concludes at a terminating step 508.

Figure 6:
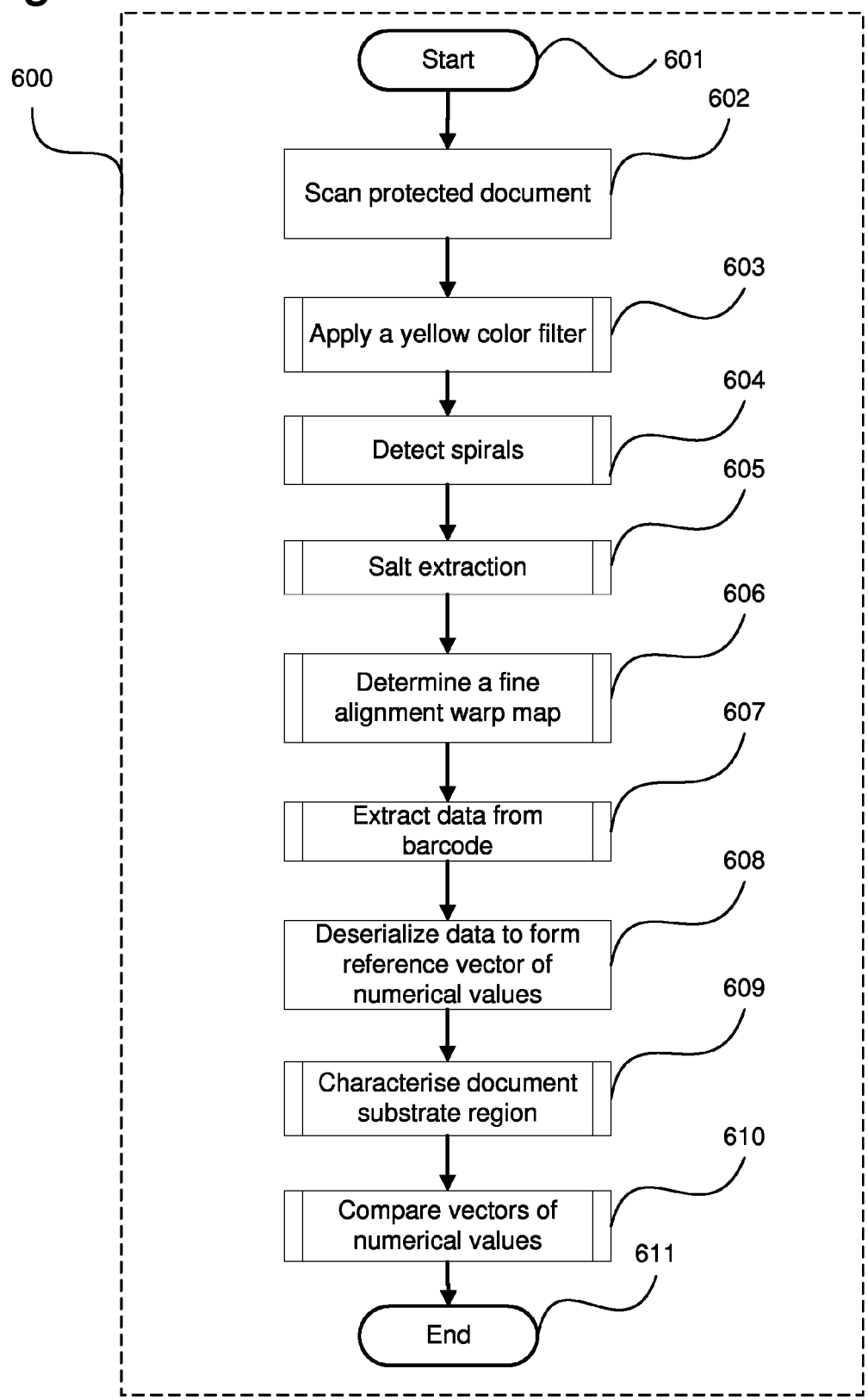
FIG. 6 is a flow diagram showing a method of authenticating a protected document according to a first embodiment of the invention.
Figure 7:
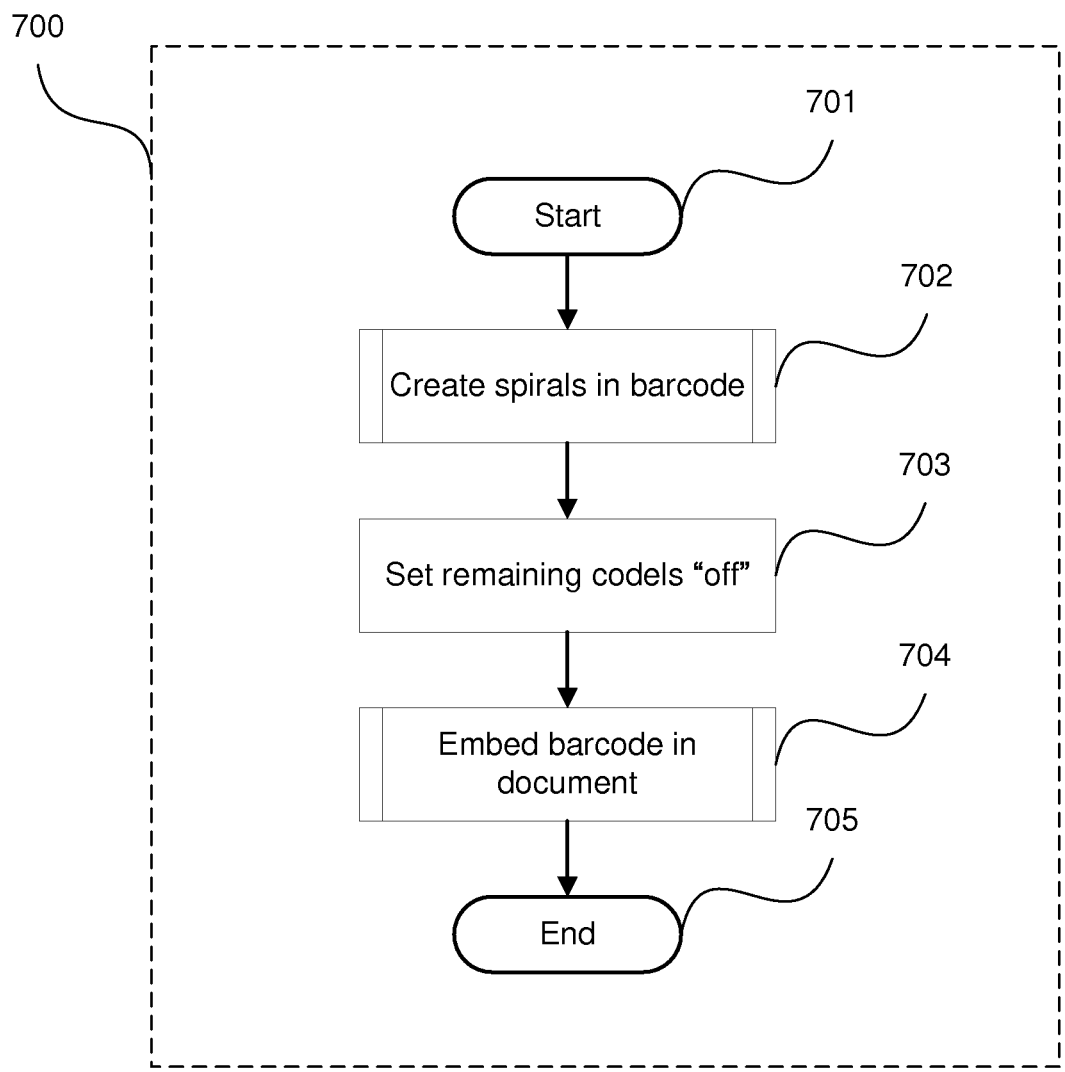
FIG. 7 is a flow diagram showing a method of creating and embedding spirals to form an intermediate document.

A process for authenticating a protected document is now considered. FIG. 6 shows a method to authenticate a protected document.

The method 600 commences at an initial step 601. A following step 602 produces a scanned image by scanning the protected document. A following step 603 applies a yellow color filter to the scanned image to produce a yellow channel intensity image. A following step 604 detects spirals in the yellow channel intensity image and calculates a coarse alignment affine transform. A following step 605 extracts the salt data. Salt data is a relatively small amount of data encoded in the coarse alignment border of the barcode. The salt data could store metadata such as the barcode version. A following step 606 determines a fine alignment warp map. A following step 607 extracts data from the barcode to produce binary data. A following step 608 deserializes the binary data produced in step 607 to form a vector of numerical values. The binary data is deserialized by assigning the first $N_{bits}$ of the binary data to the first element in the vector. The next $N_{bits}$ of binary data is then assigned to the next element in the vector. This is repeated until all $N_v$ elements in the vector is assigned a value. A following step 609 forms a second vector of numerical values by characterising the coarsely-aligned image created during step 606, the data included in this second vector being also indicative of at least one of the inherent characteristics indicated by the data of the first vector. For example this second vector would be again indicative of structural characteristics of the surface, or body, of the paper. Since the two vectors comprise the same characteristic of the same region of the paper sheet, the comparison between the two vectors, performed in the following step 610, is indicative of the authenticity of the substrate, and therefore—of the authenticity of the document. The process of comparing the two vectors will be explained in detail further in the text. The method 600 concludes at a terminating step 611.

Creating and Embedding Spirals

A method 700 for generating spirals in the coarse-alignment border of a barcode, then embedding the barcode in a document is, as executed at step 502, is described in detail. The resulting document with embedded spirals is referred to as an intermediate document. Spirals are embedded by creating a barcode of height $H_{bb}$ and width $W_{bb}$, and generating spirals in appropriate locations in the barcode. These spirals are generated in the barcode since the spirals have distinctive properties that allow the spirals to be easily detected when the barcode is read.

The method 700 commences at an initial step 701. A following step 702 creates six spirals in a barcode. A following step 703 sets all codels in the barcode that are not used for spirals to "off". A following step 704 embeds the barcode in a document. The method 700 concludes at a terminating step 705.

Creating Spirals in a Barcode

Figure 8:
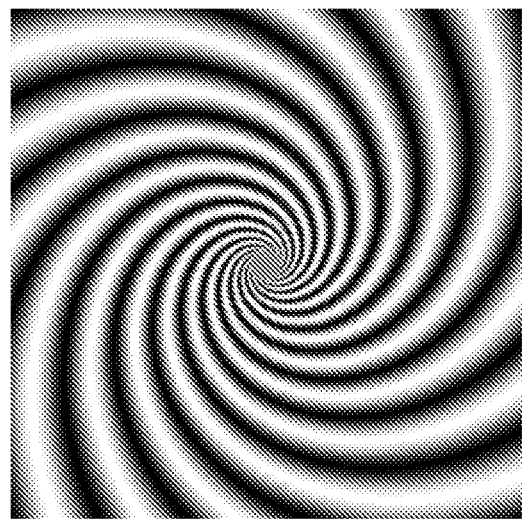
FIG. 8 shows a plot of the real part of a Logarithmic Radial Harmonic Function (LRHF)

The spirals used in the barcode are bitmapped versions of logarithmic radial harmonic functions (LRHF). Mathematically, LRHF are complex valued functions defined on the plane. LRHF have the properties of scale and rotation invariance, which means that if an LRHF is transformed by scaling or rotation it is still an LRHF. FIG. 8 shows a plot of the real part of an LRHF.

An LRHF has three parameters that can be adjusted. They are: first, the Nyquist radius R, which is the radius at which the frequency of the LRHF becomes greater than p radians per pixel; second, the spiral angle s, which is the angle the spiral arms make with circles centred at the origin; and third, the phase offset f. The formula for the function is most easily expressed in polar coordinates (r, θ), as $$l(r,\theta)=e^{j(m\theta+n\ln r+f)} \quad (1)$$

where the values of m and n are given by $$n=Rp \cos s$$

$$m=\lfloor Rp \sin s \rfloor \quad (2)$$

A method for generating six spirals in a barcode, as executed at step 702, is described. The spirals are placed in the coarse-alignment border of the barcode. Each spiral is generated by generating a spiral bitmap, which samples the LRHF with the Nyquist radius R, the spiral angle s and the phase offset f. The spiral bitmap has height and width equal to B pixels.

Figure 9:
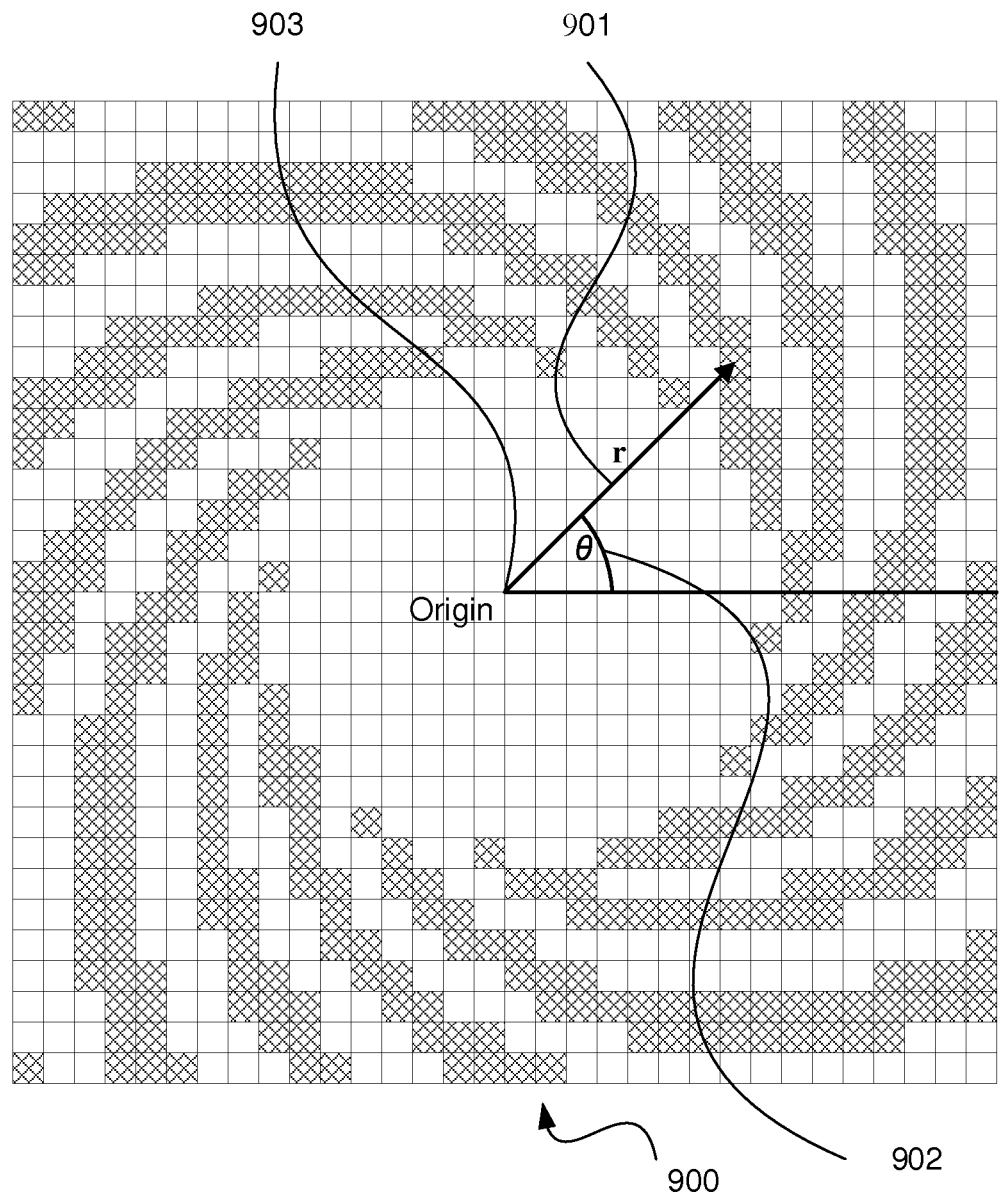
FIG. 9 shows a spiral bitmap.

FIG. 9 shows a spiral bitmap 900. The polar coordinates in the spiral bitmap 900 will now be described. The origin 903 of the coordinate system of the spiral bitmap 900 refers to the centre of the spiral bitmap 900. The radius r 901 of a point in the spiral bitmap 900 is the distance from that point to the origin 903, measured in pixels. The angle θ 902 of a point in the spiral bitmap 900 is the angle of a ray from the origin 903 through the point. In accordance with this definition of radius r and angle θ, the value of a pixel in the spiral bitmap with coordinates (r, θ) may be determined in accordance with Formula (3) as follows:

$$\begin{cases} 1 & \text{if } r > R \text{ and } \mathrm{Re}(l(r,\theta)) > 0 \\ 0 & \text{otherwise} \end{cases} \quad (3)$$

Squares (e.g., 905) of the spiral bitmap 900 shown in FIG. 9 are shaded where pixel values of the bitmap 900 are equal to one (1). Squares (e.g., 907) of the bitmap 900 are unshaded where the pixel values of the bitmap 900 are equal to zero (0).

Once the spiral bitmap 900 has been generated, the spiral represented by the spiral bitmap 900 may be embedded into the codels of the barcode 300. Pixels of the spiral bitmap 900 equal to zero (0) are encoded into the barcode 300 by setting the state of a corresponding codel to "off". Pixels of the spiral bitmap 900 equal to one (1) are encoded into the barcode 300 by setting the state of a corresponding codel to "on".

Figure 10:
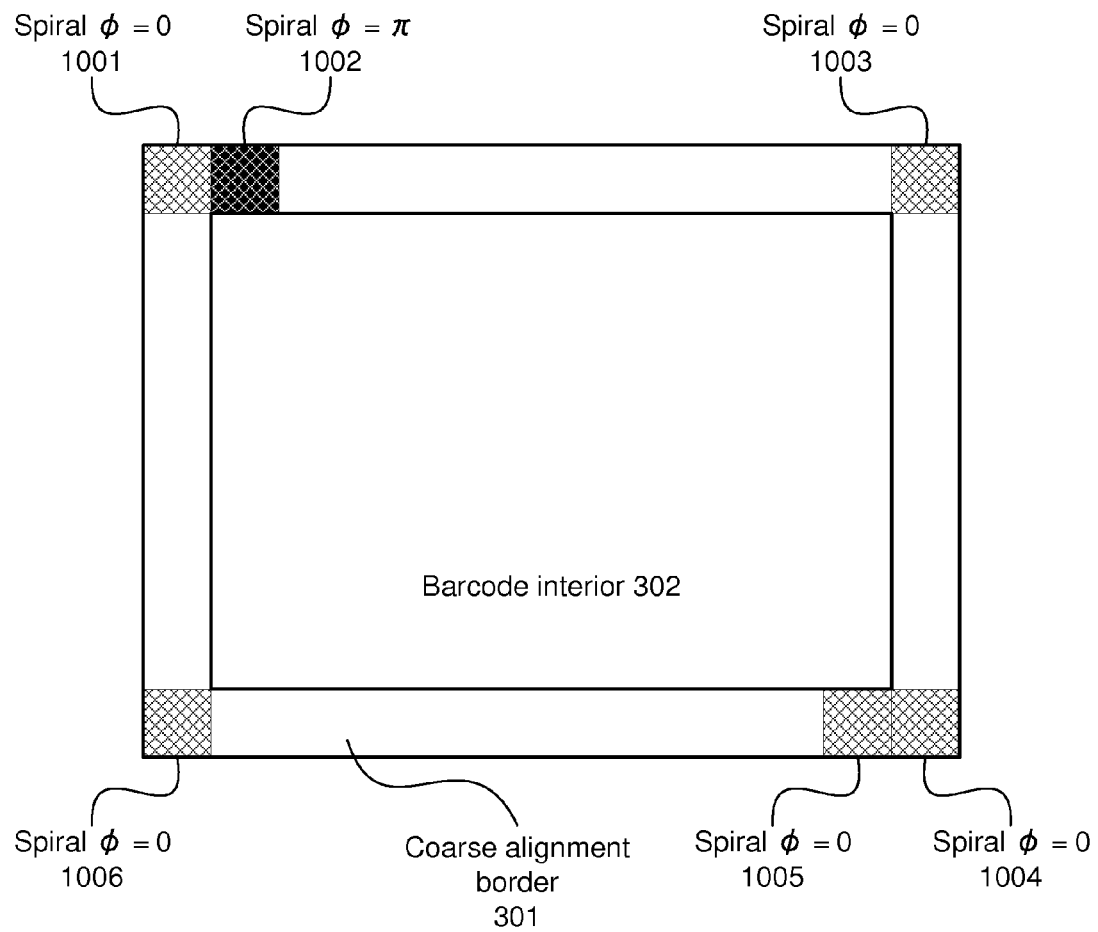
FIG. 10 shows the location of spirals embedded in a barcode.

As seen in FIG. 10, six spirals 1001, 1002, 1003, 1004, 1005 and 1006 may be placed in the coarse alignment border 301 of the barcode 300. Each of these spirals 1001, 1002, 1003, 1004, 1005 and 1006 is B codels wide, and B codels high. As described above, B may be equal to thirty-two (32) meaning that each of the spirals is thirty-two codels wide and thirty-two codels high. Five of the spirals (i.e., spirals 1001, 1003, 1004, 1005 and 1006, as seen in FIG. 10) placed in the barcode 300, have the same value for phase (i.e., f=0), while the remaining spiral (i.e., spiral 1002) has an opposite phase (i.e., f=p). The locations of the six spirals 1001, 1002, 1003, 1004, 1005 and 1006 placed in the coarse alignment border 301 of the barcode 300 will now described with reference to FIG. 10.

As seen in FIG. 10, four spirals 1001, 1003, 1004 and 1006 of the five spirals (i.e., spirals 1001, 1003, 1004, 1005 and 1006, as seen in FIG. 10) with phase f=0 are positioned in the four corners of the barcode 300. The other spiral 1005 with f=0 is positioned immediately to the left of the spiral 1004 in the bottom-right corner of the barcode 300. The spiral 1002 with opposite phase f=p is positioned immediately to the right of the spiral in the top-left corner of the barcode.

Embedding a Barcode in a Document

A method for embedding a barcode in a document in the barcode region specified by $X_{offset}$ and $Y_{offset}$, as executed at step 704, is described in detail.

The barcode to be embedded has a codel resolution ($R_c$) that may be less than the print resolution of the document ($R_p$). Therefore, a scaling factor SF may be calculated from the following equation:

$$SF = R_p/R_c$$

The scaling factor SF will always be an integer since the codel resolution is limited in such a way.

Each pixel ($x_d$, $y_d$) in the document may be referred to a corresponding codel ($x_b$, $y_b$) in the barcode by applying the following equations:

$$x_b = \text{floor}((x_d - X_{offset})/SF)$$

$$y_b = \text{floor}((y_d - Y_{offset})/SF)$$

Each pixel ($x_d$, $y_d$) in the barcode region is set to "yellow" if its corresponding codel ($x_b$, $y_b$) is "on".

Finding and Characterising Document Substrate Region Image

Figure 11:
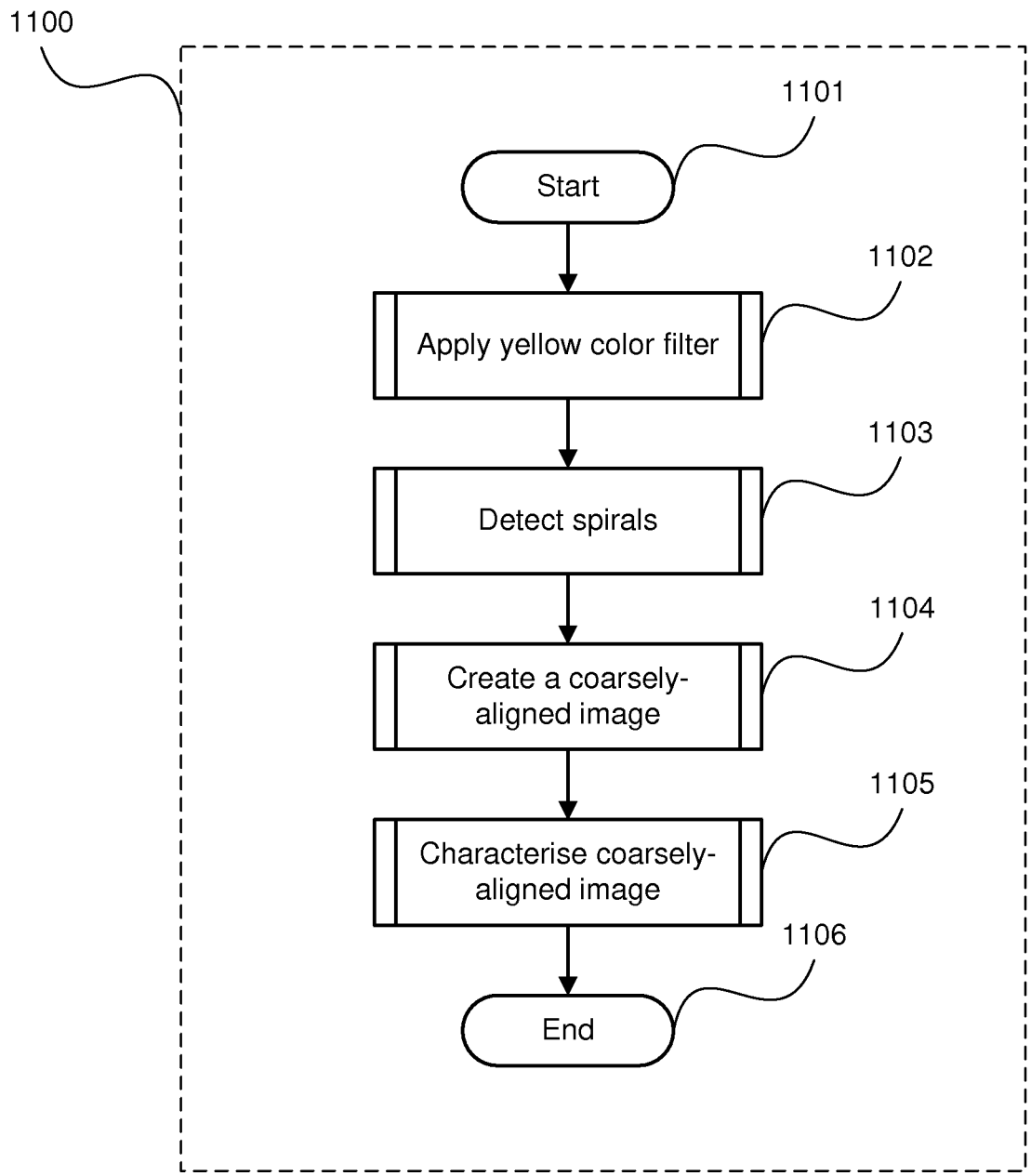
FIG. 11 is a flow diagram showing a method of creating and characterising a coarsely-aligned image.

A method 1100 to locate the document substrate region in a scanned image by detecting spirals in the image, then characterizing the image of the region, as executed at step 505, is now considered in greater detail with reference to FIG. 11.

The method 1100 commences at an initial step 1101. A following step 1102 applies a yellow color filter to the scanned intermediate image to create a yellow channel intensity image. A following step 1103 detects and locates spirals in the created yellow channel intensity image. A following step 1104 makes use of the inverse coarse alignment affine transform to create a coarsely-aligned image. A following step 1105 forms a vector of numerical values that characterises the coarsely-aligned image. Note that the coarsely-aligned image is also an image of the document substrate region in the scanned image. The method 1100 is concluded at a terminating step 1106.

Applying a Yellow Color Filter

A method of creating a yellow channel intensity image by applying a yellow color filter on a scanned image, as executed at step 1102 and 603, is described in detail. A scanned image typically consists of three color channels—red, green and blue. An intensity image, however, consists of only one color channel.

A yellow channel intensity image is formed by first creating an image with the same width and height as the scanned image, but with only one color channel.

Yellow images have the highest contrast in the negative of the blue channel. Thus, the value of the pixel at (x, y), a (x, y), in the new image is then set to one minus the blue value blue(x, y) of the pixel at the same coordinates in the scanned image, where the range of pixel values is between zero and one.

Detecting Spirals

It should be noted that the following description refers to both yellow images or greyscale images.

Figure 12:
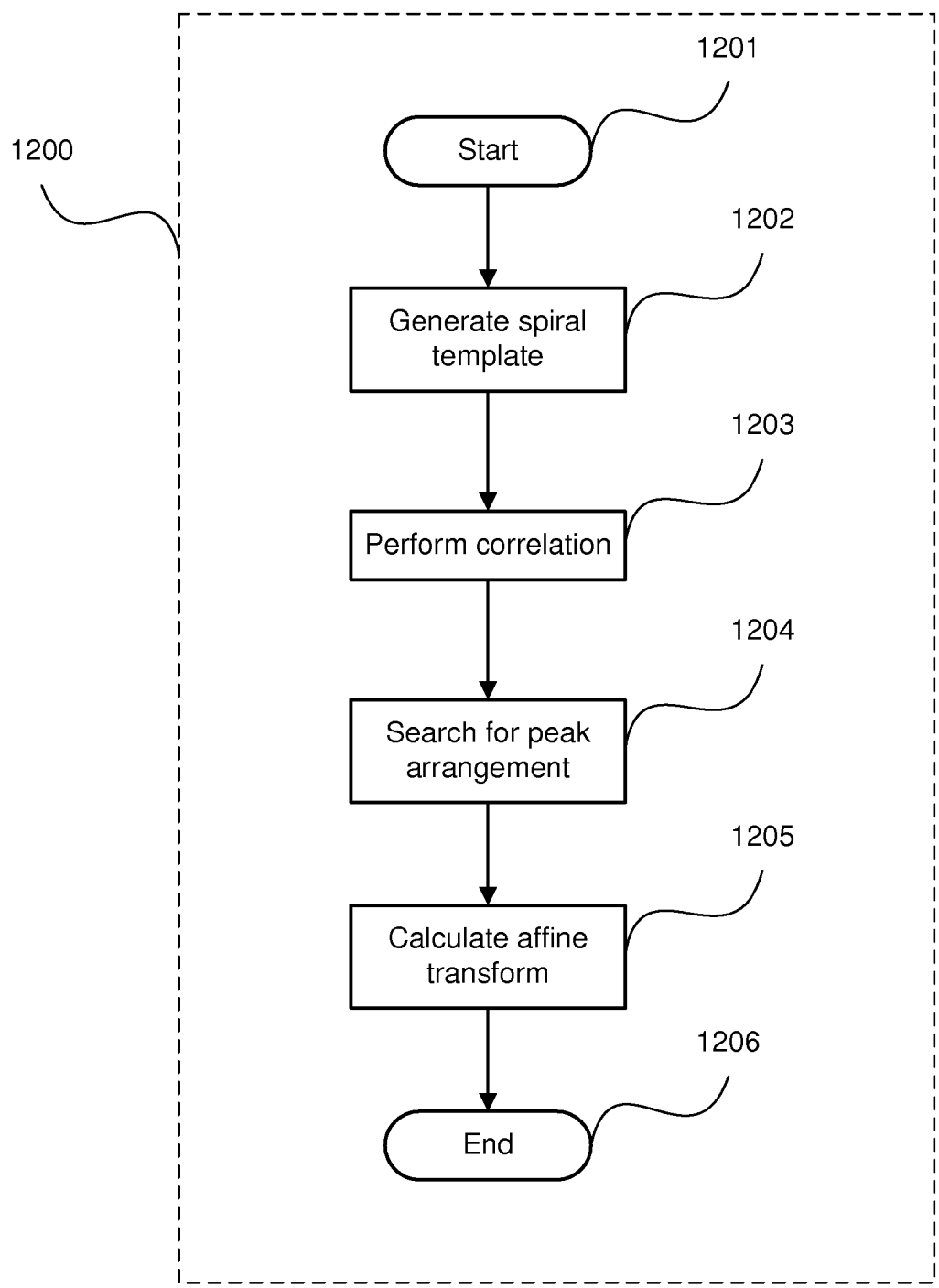
FIG. 12 is a flow diagram showing a method of determining a coarse alignment affine transform.

A method 1200 for examining an intensity image to detect the locations of the spirals, and then using the spiral locations to calculate a coarse-alignment affine transform, as executed at step 1103 and 604, is now described in greater detail with reference to FIG. 12. The detection of spiral locations is achieved by performing a correlation between a spiral template image, and the intensity image.

The method 1200 begins at an initial step 1201. In order to detect spirals using correlation, a spiral template image must first be generated. A following step 1202 creates this spiral template image. The generation of the spiral template image is similar to the generation of the spiral bitmap in step 1203, except that the spiral template image is complex valued, and its size is larger than the spiral bitmap. Each pixel value in the spiral template image is stored as a pair of double-precision floating point numbers, representing the real and imaginary parts of the pixel value. The spiral template image has height and width equal to Ts, the template size. The template size Ts can vary, and in the embodiment being considered Ts=256.

Polar coordinates (r, θ) in the spiral template are defined, with the origin in the centre of the template. The pixel value at polar coordinates (r, θ) in the spiral template image is $$\begin{cases} e^{j(m\theta + n \ln r)} & \text{if } r > R \\ 0 & \text{otherwise} \end{cases} \quad (4)$$

where m and n are defined by (2) and the Nyquist radius R and spiral angle s are the same as they were during the creation of the spirals.

A following step 1203 performs a correlation. The correlation of two images I1 and I2 is an image Ix defined by $$I_x(x, y) = \sum_{x', y'} I_1(x', y') I_2(x' + x, y' + y) \quad (5)$$

The sum ranges over all x' and y' where I1 is defined, and in the image I2, the values of pixels outside the image are considered to be zero. If either of I1 or I2 is complex-valued, Ix may be complex-valued too.

Step 1203 performs a correlation between the intensity image and the complex spiral template image. The resulting correlation image should contain peaks, i.e., pixels with large modulus relative to neighbouring pixels, at the locations of spirals in the scanned image. The phase of the peak's pixel value is related to the phase f of the spiral that was embedded in the coarse alignment border. The five spirals that were generated with f=0 should have peaks with similar phase, while the one spiral that was generated with f=p should have a peak with opposite phase to the other five spirals' peaks.

Note that even if the scanned image is at a different resolution to the print resolution $R_p$ or the barcode codel resolution $R_c$, the spirals will still be detected because the underlying LRHF is scale-invariant.

A following step 1204 examines the correlation image resulting from step 1203, and locates the six peaks that are arranged in a layout consistent with a barcode. In order to do this effectively, it is necessary to know the codel resolution $R_c$, and the scan resolution $R_s$. If either of these resolutions are not known, but there are only a few possibilities for their values, then the six peaks could be located by trying each of the possible resolutions, and looking for six peaks with a layout consistent with the resolution chosen.

There are many ways of looking for six peaks consistent with the layout of a barcode. In one arrangement the following method could be used. First, the correlation image could be searched to find the pair of spirals in the bottom-right corner of the barcode region, that is, the spirals 1004 and 1005 in FIG. 10. These spirals must correspond to a pair of peaks with approximately the same phase and lying approximately $B \times R_s/R_c$ apart (measured in pixels in the scanned image). Denote the coordinates in the intensity image of the two peaks by q4 and q5, (in any order). Second, the correlation image could be searched to find the pair of spirals in the top-left corner of the barcode region, that is, the spirals 1001 and 1002. These spirals would correspond to a pair of peaks lying approximately $B \times R_s/R_b$ apart (measured in pixels in the intensity image), one of which has approximately the same phase as the peaks at q4 and q5 found previously, and the other of which has approximately the opposite phase. Denote the coordinates in the scanned image of the peak with approximately the same phase as the peaks at q4 and q5 found previously by q1, and the coordinates in the intensity image of the peak with approximately the opposite phase by q2. Further, if q4 is closer to q1 than q5, swap q4 and q5.

The locations of the top-right and bottom-left spirals (1003 and 1006) can now be estimated, and the correlation image can be searched to see if peaks with the correct phase are found there. If so, then a barcode with consistent layout has been found. Denote the expected coordinates of the top-right spiral 1003 by q'3. The value of q'3 is given by projecting q4 onto the line joining q1 and q2. Similarly, denote the expected coordinates of the bottom-left spiral 1006 by q'6. The value of q'6 is given by projecting q1 onto the line joining q4 and q5. The correlation image is then searched for peaks and q6 that are close to q'3 and q'6 respectively.

It will be necessary to use some tolerance parameters in the above process, in order to decide whether peaks are approximately the right distance apart, or whether two peaks have approximately the same (or opposite) phase, or whether two peaks are close. In the present embodiment the following tolerances are used. Two peaks are considered to be approximately the correct distance apart if the actual distance between them is within 5% of the correct distance. The peaks q4 and q5 are considered to be the same phase if their phases are within p/3 of each other. The peaks q1 and q2 are considered to be the opposite phase if one phase is within p/3 of the other phase plus p. The peaks q3 and q6 are considered to be close to q'3 and q'6 if the angles q'3q1q3 and q'6q4q6 are less than 5° respectively, and the angles q1q3q4 and q4q6q1 are within 5° of 90° respectively.

It may be that more than one pair of peaks is found when searching for either the peaks with the same or opposite phase. If this is the case, all the different combinations could be tried, in order to find the correct combination.

A following step 1205 determines the dimensions of the barcode and creates the coarse-alignment affine transform.

The dimensions of the barcode are determined by examining the position of these three peaks in the intensity image. The width of the barcode can be calculated as follows. First, calculate the distance between the peaks corresponding to the top-left and top-right spirals (1001 and 1003). This distance is denoted by |q1−q3|. This distance can be converted from scanner resolution pixels to barcode codel resolution by multiplying by $R_c/R_s$. Let the distance measured in protected document pixels be $W_c$, so $$W_c = |q1-q3| \times R_c/R_s \quad (6)$$

Then $W_c$ is approximately the distance between the centres of the two spirals 1001 and 1003 in the original barcode, which is the width of the barcode, minus half the width of the top-left spiral, minus half the width of the top-right spiral. Since the width of the spirals is the border width B, the barcode width W is approximately $W_c$+B. To determine the exact value of W, the value of $W_c$+B is rounded to the nearest multiple of B, since it is known in advance that the width and height of the barcode are both multiples of B.

Similarly, the barcode height H is determined by rounding the value of $$Hc+B = |q1-q6| \times R_c/R_s + B \quad (7)$$

to the nearest multiple of B.

The coarse-alignment affine transform is specified by a matrix A and a vector a. The coarse-alignment affine transform is determined by calculating the affine transform that takes the centres of the three spirals 1001, 1003, and 1006, to the positions of three peaks q1, q3, and q6 in the intensity image. If the elements of the matrix A are denoted by $$A = \begin{pmatrix} a_{00} & a_{01} \\ a_{10} & a_{11} \end{pmatrix} \quad (8)$$

then the matrix A can be calculated via the formulae $$\begin{pmatrix} a_{00} \\ a_{10} \end{pmatrix} = \frac{1}{W-2B}(q_3 - q_1) \quad (9)$$

$$\begin{pmatrix} a_{01} \\ a_{11} \end{pmatrix} = \frac{1}{H-2B}(q_6 - q_1) \quad (10)$$

Then the vector a can be calculated via the formula $$a = q_1 - B \begin{pmatrix} a_{00} + a_{01} \\ a_{10} + a_{11} \end{pmatrix} \quad (11)$$

A following step 906 terminates the execution of process 502.

Creating a Coarsely-Aligned Image

A method of creating coarsely-aligned image from a scanned image, as executed at step 1104 and 1902, is now described in detail. The coarsely-aligned image is created from a scanned image using the given coarse alignment affine transform (specified by the matrix A and the vector a). The dimensions of the coarsely-aligned image are the same as the dimensions of the barcode.

The coarsely-aligned image can be generated using a number of different methods. In one method, each pixel in the coarsely-aligned image is generated as follows. The coordinates in the coarsely-aligned image (x, y) are transformed using the coarse alignment affine transform, resulting in the coordinates A(x, y)T+a in the scanned image. The scanned image is then interpolated at these coordinates, using bi-cubic interpolation, resulting in a pixel value. The resulting value is stored in the coarsely-aligned image. This is repeated for each pixel in the coarsely-aligned image.

In an alternative method, the scanned image is first blurred with a low-pass filter. This may reduce the effects of aliasing introduced when the high-resolution scanned image is transformed to produce a lower-resolution coarsely-aligned image. Methods for designing a low-pass filter are well-known in the art. The choice of filter could be informed by the ratio between the resolution of the scanned image and the barcode codel resolution.

Characterising a Coarsely-Aligned Image

It is important to note that the coarsely-aligned image is also an image of the document substrate region. Therefore, by characterizing the coarsely-aligned image, the image of the document substrate region is also characterized. The coarsely-aligned image is characterized by a representation that requires significantly less storage capacity than the full image representation, so that the characterisation may be encoded and arranged in a barcode occupying the same spatial region as the document substrate region.

A method of characterising a coarsely-aligned image with a vector of numerical values, as executed at step 1105, will now be described in detail.

The coarsely-aligned image input to this method is a color image of the document substrate region. To simplify characterisation of the document substrate region, the coarsely-aligned image is converted to a grey intensity image.

Principal Component Analysis (PCA) is performed on the grey intensity image to generate a vector V of $N_v$ numerical values. PCA is a well-known method of characterising an image by its most significant components.

In this embodiment, the grey intensity image is projected onto $N_v$ orthogonal basis vectors. The set of basis vectors may be chosen beforehand by finding the most critical components of a large data set of document substrate region images. The vector V is formed by finding the residual when the grey intensity image is projected onto each of the $N_v$ basis vectors.

Each element in the vector of numerical values V may be stored as a floating-point number that is $N_{bits}$ in size.

Encoding Document Substrate Region Image

Figure 13:
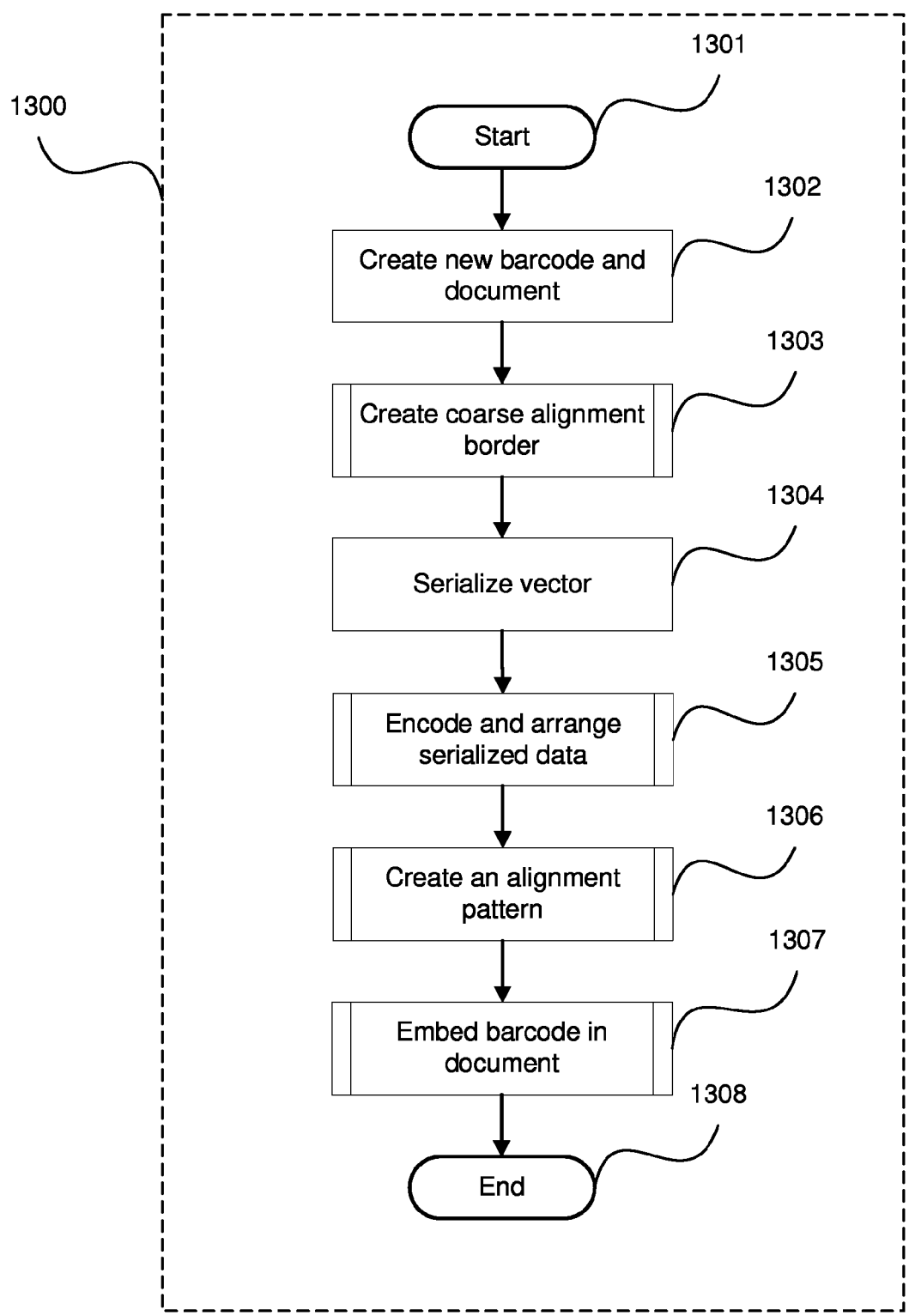
FIG. 13 is a flow diagram showing a method of encoding a vector of numerical values in a barcode.

A method 1300 for encoding characteristics of an image of a document substrate region, as executed at step 506, is now considered in greater detail with reference to FIG. 13.

The method 1300 commences at an initial step 1301. A following step 1302 creates a new barcode and a blank document. The new barcode created also has width $W_{bb}$ and height $H_{bb}$. The blank document is a color image with a resolution $R_p$. The blank document is initially empty. A following step 1303 creates a coarse alignment border in the barcode. A following step 1304 serializes the vector of numerical values, V, which characterizes the image of the document substrate region. The resulting binary data is encoded and arranged in a barcode at step 1305. A following step 1306 creates an alignment pattern in the barcode interior 302. A following step 1307 embeds the barcode in the blank document, in preparation to be printed. The method 1300 is concluded at a terminating step 1308.

Creating the Coarse Alignment Border

These steps have to do with storing a small amount of data in the border of the barcode. This small amount of data is also known as salt data. The salt data could store metadata such as the barcode version.

Figure 14:
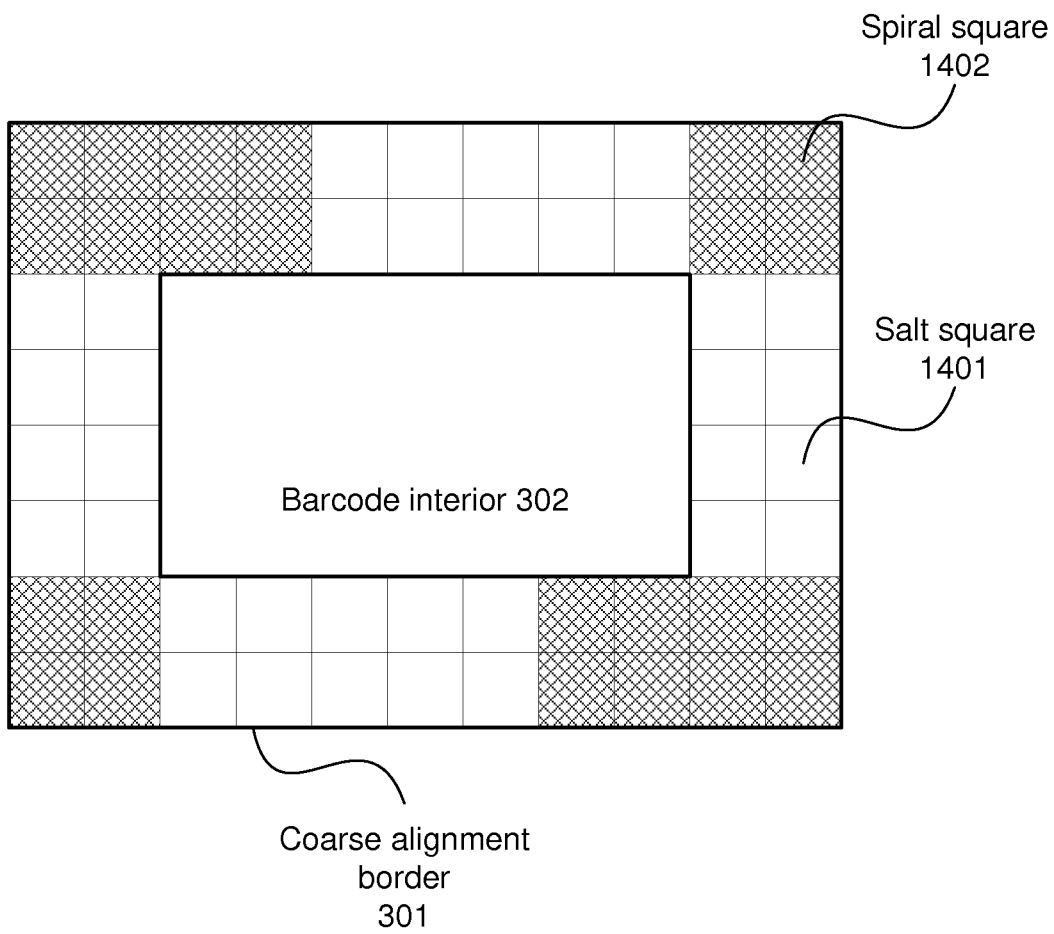
FIG. 14 shows a barcode with its border divided into squares.

For the purposes of storing and reading the salt data, the barcode border is divided into squares, in a manner depicted in FIG. 14. The coarse alignment border 301 has width equal to B, and the barcode has both height and width that are multiples of B. Thus, the border can be divided evenly into squares with width and height equal to B/2. These squares are called salt squares.

Codels in the corners of the coarse alignment border where spirals may be arranged are removed from further consideration and are not considered salt squares. The square 1402 in FIG. 14, is one such square. Each of the remaining squares 1401 will be used to store one bit of salt data.

For the purposes of storing and reading the salt data, two pseudo-random arrays, a0 and a1, are used. Both a0 and a1, at each pair of barcode codel coordinates (x, y), contain a value ai(x, y) that is either 0 or 1. Because the ai are pseudo-random, the values ai(x, y) will appear random, even though the values are predetermined given x and y. There are many pseudo-random number generation algorithms that could be used to generate a0 and a1. In the present embodiment, a0 and a1 are generated using the RC4 algorithm, initialized with known seeds.

Figure 15:
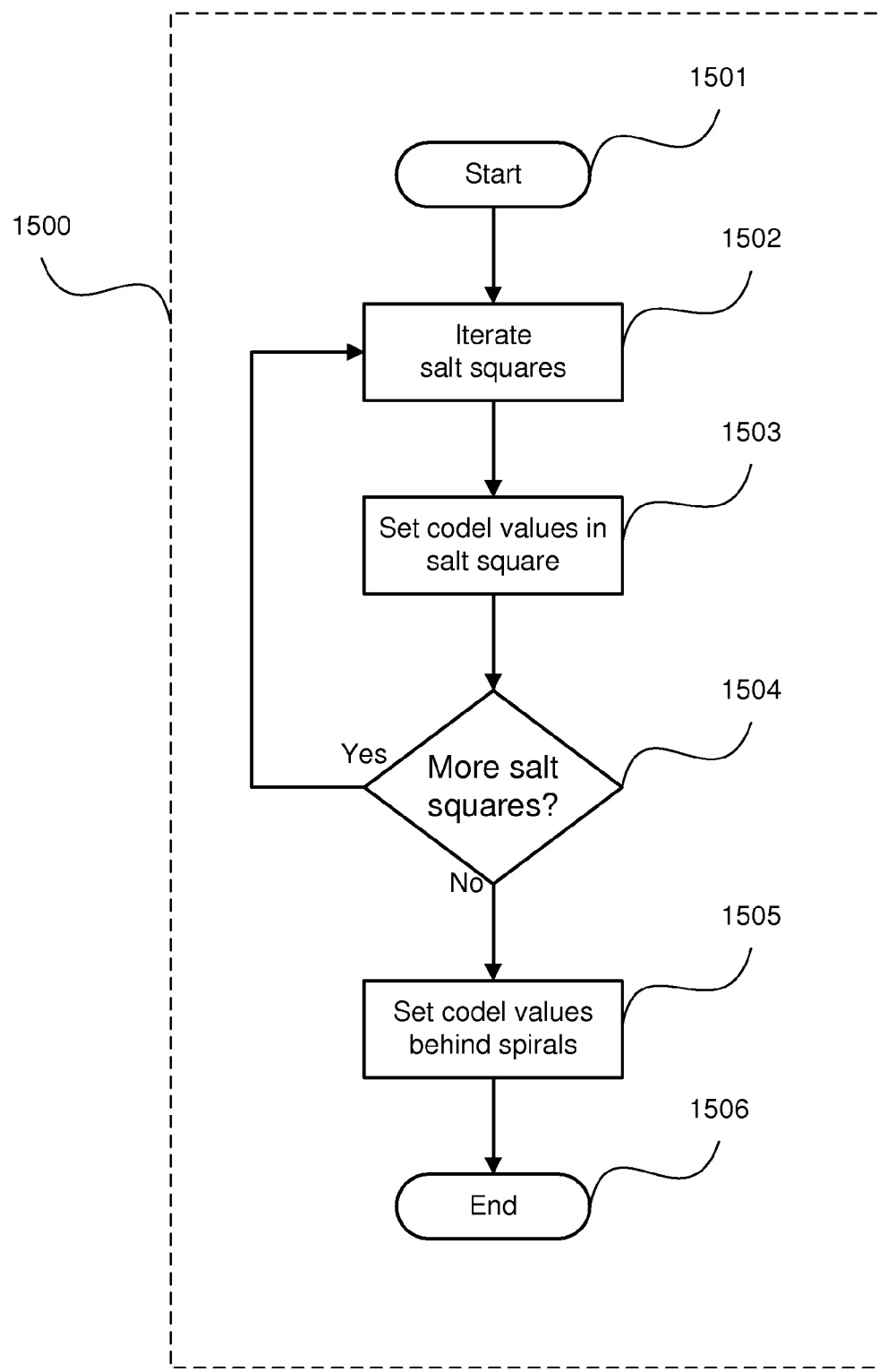
FIG. 15 is a flow diagram showing a method of storing data in border codels of the barcode.

A method 1500 assigning values to the codels in the coarse alignment border of the barcode image, in accordance with the salt data to be encoded, as executed at step 1303, is now described in greater detail with reference to FIG. 15. The number of bits of salt data that can be encoded is equal to the number of salt squares that fit in the coarse alignment border, given the barcode dimensions. Thus, barcode with different dimensions may be able to store different amounts of salt data.

The method 1500 begins at an initial step 1501. A following step 1502 iterates through the salt squares, in a predetermined order. In the present embodiment they are iterated in scanline order. That is, on the first execution of 1502, the leftmost salt square in the top row of salt squares is selected. On subsequent executions of 1502, subsequent salt squares in the topmost row will be selected, and then salt squares in subsequent rows will be selected, row by row. Note, in some rows the salt squares will not all be adjacent.

A following step 1503 sets the values of the pixels in the currently selected salt square. Let n be defined such that this is the n-th salt square to be processed by step 1503, and let i be the value of the n-th bit of the salt data. Step 1503 assigns the values of the pixels in the selected salt square to the corresponding values of ai, i.e., $$a(x,y)=ai(x,y)$$

for all (x, y) in the selected salt square, where i is the n-th bit of the salt data.

A following step 1504 checks whether there are more salt squares. If there are, execution proceeds to 1502 which continues the loop. If there are no more salt squares, execution proceeds to a following step 1505.

A following step 1506 ends method 1500.

Encoding and Arranging Data

As described above, at step 1306 of the method 506, the processor 105 accesses serialized data, encodes and arranges the data in a barcode.

The data may be pre-processed to ensure that the data has a random appearance before the data is stored in the barcode. The data may be pre-processed by encrypting the data with a public key method, for example RSA encryption, which may add an additional $N_{rsa}$ bits to the data. The data may also be pre-processed by compressing the data, or by the addition of error-correction codes.

Error-correction coding may be applied to the pre-processed data, so that imperfections in the printing and scanning of the protected document 200 do not result in corruption of the data stored in the barcode. In this instance, low density parity check (LDPC) coding may be used to apply error-correction coding to the pre-processed data. Alternatively, other error-correction coding methods may also be applied to the pre-processed data. For example, Reed-Solomon (RS) coding or Turbo codes may be applied to the pre-processed data.

Low density parity check (LDPC) coding is a block coding scheme, in which the pre-processed data is first divided into blocks of length K bits, and each block is encoded to produce encoded blocks of length N bits, where N and K are parameters of the particular LDPC code in use. If the length of the pre-processed data is not a multiple of K bits, the pre-processed data may be padded with arbitrary data to make the length a multiple of K bits.

Figure 16:
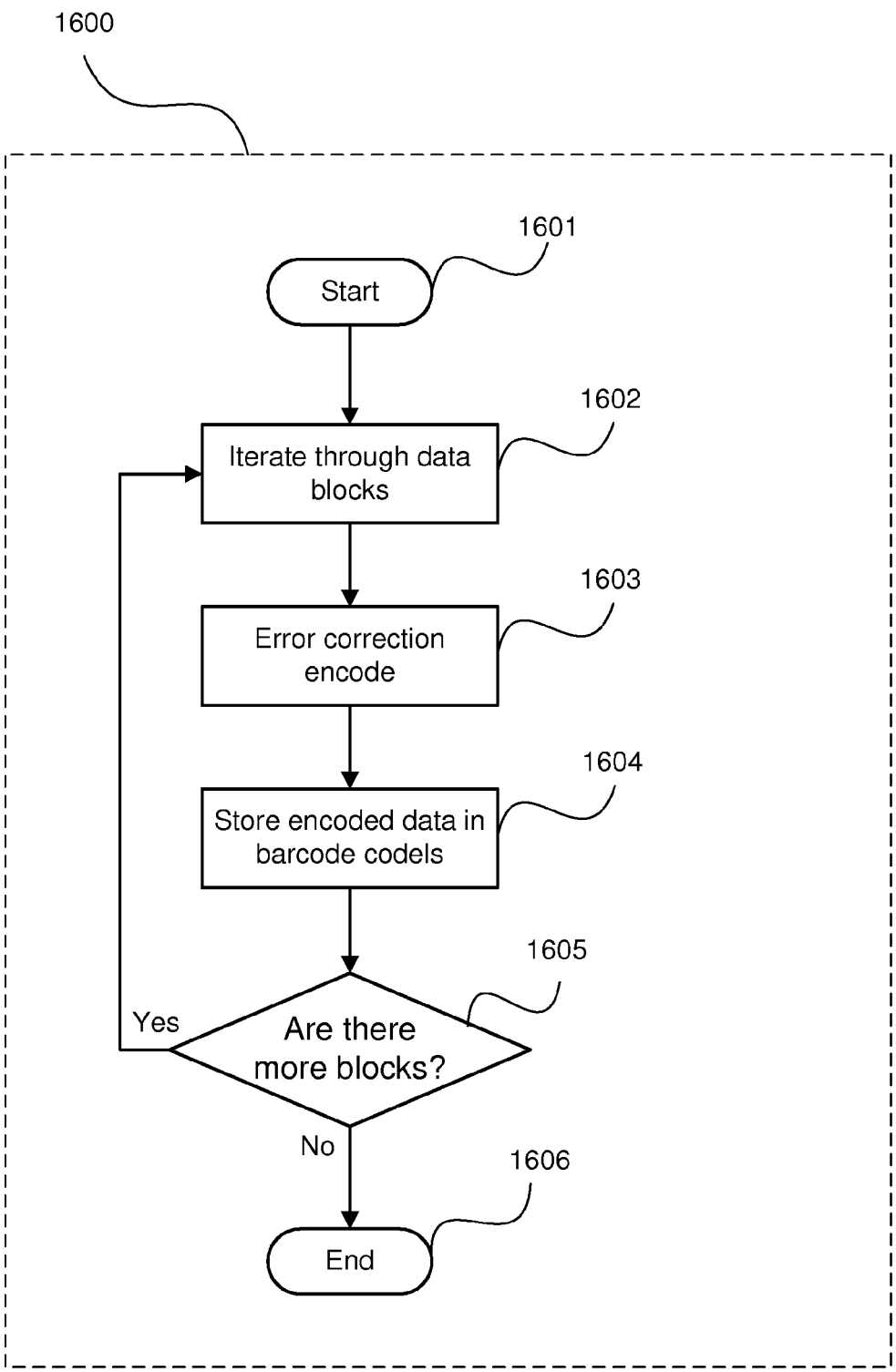
FIG. 16 is a flow diagram showing a method of encoding data in a barcode.

A method 1600 of encoding data and arranging the encoded data in the barcode 300, as executed at step 1305, will now be described with reference to FIG. 16.

The method 1600 accesses the data to be stored in the barcode 300, and encodes codels into the barcode 300. The data may be accessed from memory 106, for example. The method 1600 begins at step 1602, where the processor 105 iterates through blocks of the data. On the first execution of step 1602, the first K bits of the data are selected for processing. On subsequent executions of step 1602, the following K bits of the data are selected.

At the next step 1603, the processor 105 performs error correction encoding of the K bits of data selected in step 1602. Step 1603 produces N bits of encoded data. Then at the next step 1604, the processor 105 stores the N bits of encoded data in the codels (e.g., 301) of the barcode 300. Each bit in the encoded data is stored in one data codel in the barcode 300. At step 1604, the N bits of encoded data are mapped to data codels in the barcode 300.

A mapping function v may be defined to map encoded data bits to data codels, based on an ordering idea. An ordering of the encoded data bits may be referred to as a "bit-wise order". In bit-wise ordering, all of the first bits of all blocks come before all the second bits of all blocks, which come before all the third bits of all blocks, and so on. Within all of the encoded data bits in the same position in their blocks, the bits from the first block come before the bits from the second block, which come before the bits from the third block, and so on. This defines an order in which to consider the encoded data bits.

One possible order of the data codels of the barcode 300 is referred to as "scanline order". In scanline ordering, the codels in the top row come before the codels in the second row, which come before the codels in the third row, and so on. Within each row, the data codels are ordered from left to right. This defines an order in which to consider the data codels.

In the mapping ψ between encoded data bits and data codels, the first data bit (i.e., using the bit-wise ordering) is mapped to the first data codel (i.e., using the scanline ordering). The second data bit is mapped to the second data codel and so on. The value of each encoded bit may be stored in the codel that the encoded bit maps to under ψ.

Once the encoded data for each bit in the current block of N encoded data bits has been stored in the data codels of the barcode 300, at the next step 1605, if the processor 105 determines that there are more blocks of data to be processed, the method 1605 returns to step 1602. Otherwise, the method 1600 concludes.

Some data codels may not have been mapped to by an encoded data bit. These data codels will not have been assigned a value. Values may be assigned at random to these data codels that were not mapped to in order to ensure that all data codels in the barcode 300 have been assigned a value. For example, values from the random array $a_0$ may be assigned to the data codels that were not mapped to.

Creating an Alignment Pattern

Figure 17:
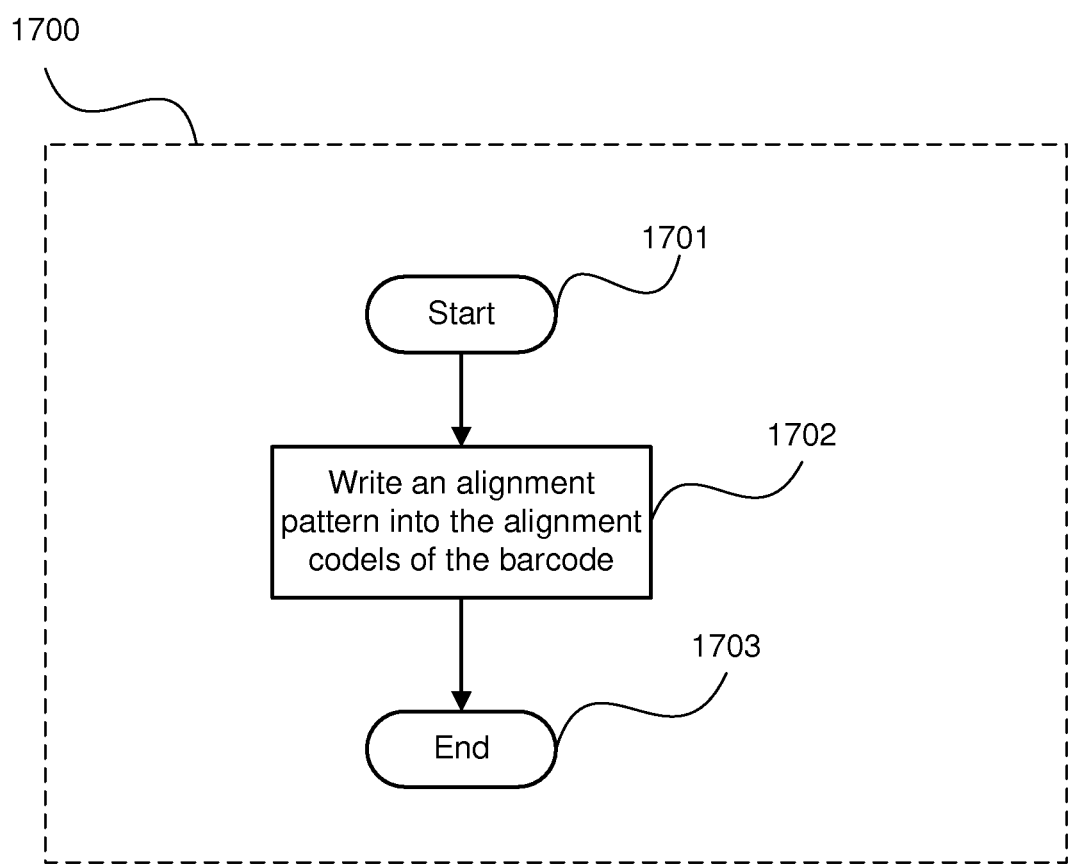
FIG. 17 is a flow diagram showing a method of generating an alignment pattern in the barcode.

A method 1700 of generating an alignment pattern in the alignment codels (e.g., 305) of the barcode 300, as executed at step 1306, will now be described in more detail with reference to FIG. 17.

The method 1700 may be implemented as software resident on the hard disk drive 110 and being controlled in its execution by the processor 105. The method 1700 comprises one step 1702, where the processor 105 encodes an alignment pattern into the data codels (e.g., 303) of the barcode 300. The alignment pattern used may be represented as a pseudo-random (i.e., noise) array of bits. For example, the pseudo-random array of bits $a_0$ described above may be used at step 1401. At step 1702, the processor 105 sets the value of each alignment codel (x, y) (e.g., 305) of the barcode 300 to $a_0(x, y)$.

Extracting the Salt Data

Figure 18:
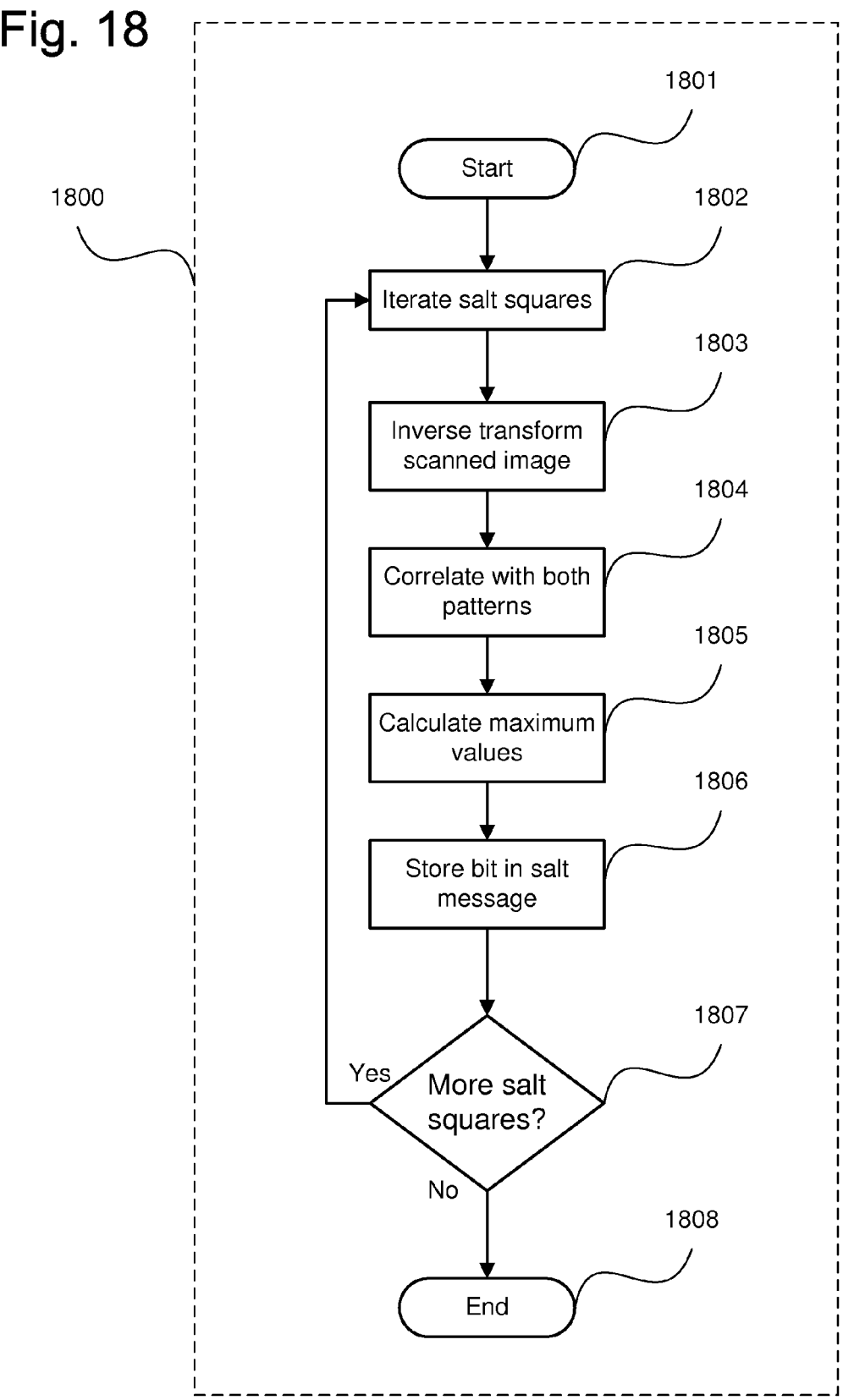
FIG. 18 is a flow diagram showing a method of extracting salt data from the coarse alignment border of the barcode.

The method 1800 of extracting salt data from the coarse alignment border 301 of the barcode 300, as executed at step 605, will now be described with reference to FIG. 18. The method 1800 may be implemented as software resident on the hard disk drive 110 and being controlled in its execution by the processor 105.

In the method 1800, the processor 105 uses the coarse-alignment affine transform determined at step 604 and the scanned image of the protected document 200 to extract the salt data from the coarse alignment border 301 of the barcode 300.

The method 1800 begins at step 1802, where the processor 105 iterates through the salt squares (e.g., 1401) of the barcode 300. For example, the processor 105 may iterate through the salt squares in the same predetermined order used in step 1502 described above. The following steps 1803 to 1806 of the method 1800 determine which of the two salt patterns represented by the pseudo-random arrays $a_0$ or $a_1$ occur in a selected salt square 1401. This may be achieved by correlating both salt patterns with the selected salt square, and determining which of the salt patterns provides a larger result. Knowing which of the salt patterns correlate with the selected salt square enables the value of the data bit encoded in the selected salt square to be determined.

At step 1803, a coarsely-aligned image of the red color channel of the currently selected salt square is generated by the processor 105. The coarsely aligned image may be generated by interpolating the scanned image, in order to determine values for the coarsely aligned image at non-integer coordinates. The scanned image may be interpolated using bicubic interpolation. A vector of RGB values interpolated from the scanned image at the coordinates (x, y) in the scanned image coordinate system may be denoted as s(x, y).

The coarsely-aligned image of the red color channel of the currently selected salt square may be denoted by $U_s$. The image $U_s$ has both height and width equal to half the border width (i.e., B/2). As an example, if the currently selected salt square has a top-left codel at coordinates $(x_s, y_s)$, then pixels in $U_s$ correspond to the codels with x-coordinates between $x_s$ and $x_s+B/2-1$, and y-coordinates between $y_s$ and $y_s+B/2-1$. If the x- and y-coordinates of $U_s$ range from 0 to B/2-1, then the image $U_s$ may be generated in accordance with Formula (12) as follows:

$$U_s(x, y) = \text{the red component of } s\left(A\begin{pmatrix} x + xs \\ y + ys \end{pmatrix} + a\right) \quad (12)$$

That is, the codel coordinates are transformed using the coarse alignment affine transform, resulting in coordinates in the scanned image. The scanned image may then be interpolated at these coordinates, and the red component may be encoded into the coarsely-aligned image $U_s$.

Two images, $U_0$ and $U_1$, may also be generated at step 1803. The images $U_0$ and $U_1$ contain the expected salt patterns, as represented by the arrays $a_0$ and $a_1$. The images $U_0$ and $U_1$ may be generated as follows:

$$U_0(x,y)=a_0(x+x_s,y+y_s)$$

$$U_1(x,y)=a_1(x+x_s,y+y_s) \quad (13)$$

The method 1800 continues at the next step 1804, where the processor 105 performs two circular correlations. The circular correlation of two images $I_1$ and $I_2$ with the same dimensions generates a third image $I_x$ with the same dimensions, according to Formula (14) below:

$$I_x(x, y) = \sum_{x',y'} I_1(x', y')I_2(x' + x, y' + y) \quad (14)$$

The sum of Formula (14) ranges over all x' and y' where $I_1$ is defined, and in the image $I_2$, the values of pixels outside the image $I_x$ may be obtained by considering $I_2$ to be periodic.

Two circular correlations are performed at step 1804 in accordance with the Formula (14). The first of these circular correlations is the correlation of $U_s$ and $U_0$, resulting in a correlation image $U_{X0}$. The second of these correlations is the correlation of $U_s$ and $U_1$, resulting in a correlation image $U_{X1}$.

At the next step 1805, the processor 105 determines maximum values in the correlation images $U_{X0}$ and $U_{X1}$. Then at the next step 1806, the processor 105 stores a salt bit in a buffer containing salt data, using the maximum values determined at step 1805. If the maximum value in image $U_{X0}$ is greater than the maximum value in image $U_{X1}$, then the salt bit stored in the buffer is a zero (0). Otherwise, the largest value in $U_{X1}$ is greater than the largest value in $U_{X0}$, and the salt bit stored in the buffer is a one (1). The buffer containing the salt data may be configured within memory 106. At the next step 1807, if the processor 105 determines that there are more salt squares to be processed, then the method 1800 returns to step 1802. Otherwise, the method 1800 concludes.

Fine Alignment

A method 1900 of determining a fine alignment warp map for the scanned image of the protected document, as executed at step 606, will be described with reference to FIG. 19. The fine alignment warp map is determined in the method 1900 using the alignment pattern generated in accordance with the method 1700.

The method 1900 of determining a fine alignment warp map for the scanned image of the protected document 200 will now be described with reference to FIG. 19. The method 1900 may be implemented as software resident in the hard disk drive and being controlled in its execution by the processor 105.

The method 1900 uses the intensity image of the protected document 200, and the coarse alignment affine transform specified by the matrix A and the vector a according to Formula (11) and determines the fine alignment warp map. The method 1900 begins at step 1902 where the processor 105 generates a coarsely-aligned image of the intensity image.

Figure 20:
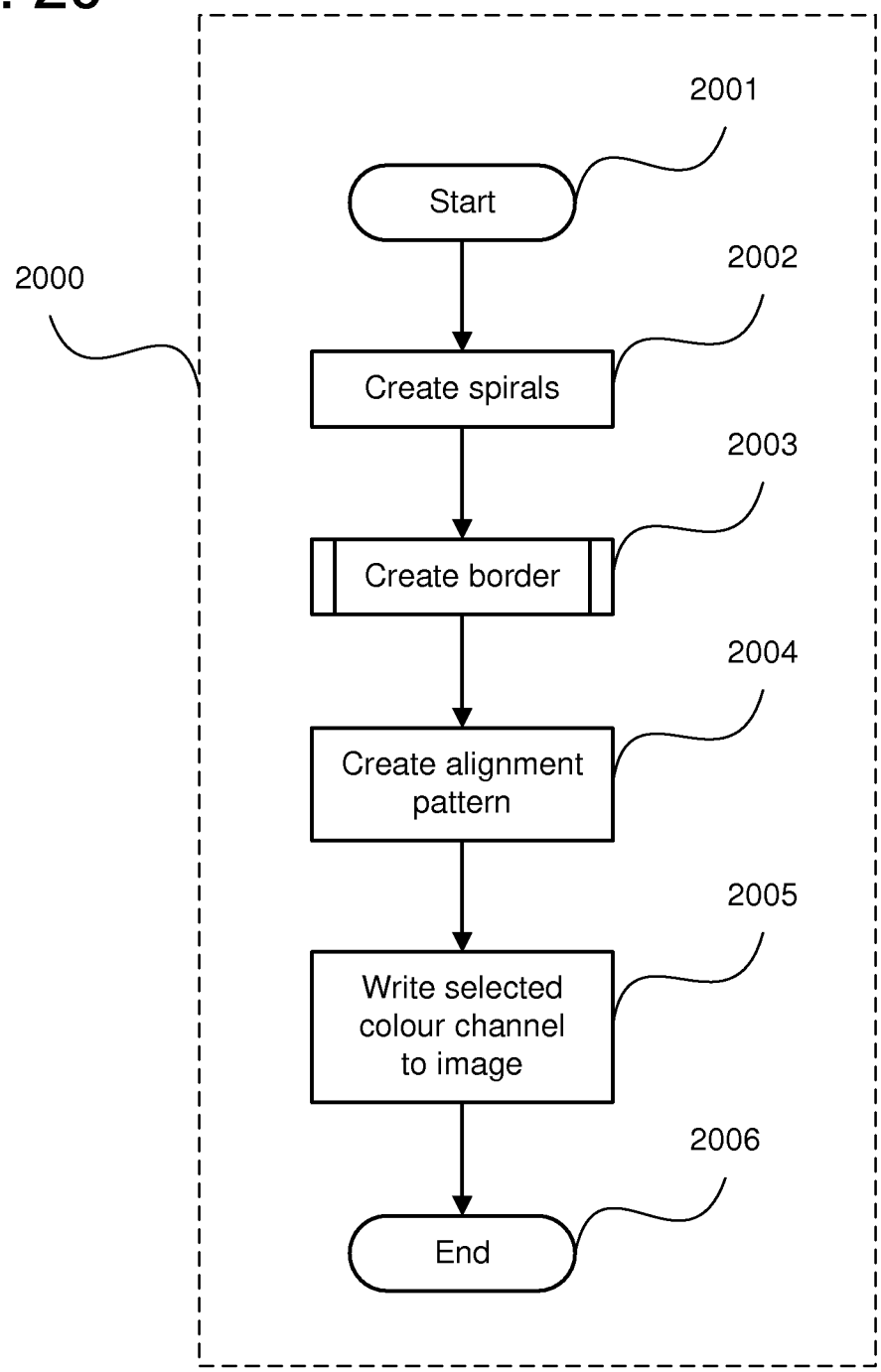
FIG. 20 is a flow diagram showing a method of generating a reference image.

Following step 1902 of the method 1900, at the next step 1903, the processor 105 generates a reference image. A method 2000 for generating a reference image, as executed at step 1903, will now be described with reference to FIG. 20. The method 2000 may be implemented as software resident on the hard disk drive 110 and being controlled in its execution by the processor 105.

The method 2000 generates a temporary barcode with the same parameters (i.e., dimensions and salt value) as the barcode 300. The temporary barcode may be configured within memory 106. The temporary barcode may be used to generate the reference image. The barcode dimensions and salt value used in the method 2000 have been determined previously in steps 604 and 605 of the method 600.

The method 2000 begins at step 2001, where the processor 105 generates spirals for the corners of the temporary barcode. At the next step 2003, the processor 105 generates a border pattern for the temporary barcode, storing data in the border codels of the temporary barcode, in a similar manner to the generation of the border pattern for the barcode 300 at step 1303 of the method 1300. Then at the next step 2004, the processor 105 generates an alignment pattern in the alignment codels of the temporary barcode, in a similar manner to the generation of the alignment pattern at step 1306 of the method 1300 for the barcode 200. Accordingly, at step 2004, all of the codels in the temporary barcode have been assigned values, except for the data codels.

The method 2000 continues at the next step 2005 where the processor 105 generates the reference image, within memory 106, using the temporary barcode. Initially the reference image is empty. When the codels in the temporary barcode are "on", a corresponding pixel in the reference image is set to a value of +1, and when the codels are "off", the corresponding pixel in the reference image is set to a value of −1. For the data codels which have not been assigned values previously, the corresponding pixel in the reference image is given a value of 0. The method 2000 concludes following step 2005.

At the next step 1904 of the method 1900, the processor 105 uses the coarsely-aligned image and the reference image to generate a displacement map $d_c$. The displacement map $d_c$ stores displacement vectors. Each displacement vector stored is associated with a location in the reference image, and measures the amount of shift between the reference image and the coarsely-aligned image at that location.

The displacement map $d_c$ may be generated at step 1904 using a tiled correlation method. The generation of the displacement map $d_c$ involves selection of a tile size 2Q and a step size P. The tile size and step size may be varied. Larger values of Q give more measurement precision, at the expense of averaging the increased precision over a larger spatial area, and possibly more processing time. Smaller values of step size P give more spatial detail. However, again using smaller values of step size P may increase processing time. As an example, Q=64, and P=32. This represents a tile of 128 pixels high by 128 pixels wide, stepped along the reference image and the coarsely-aligned image, in both horizontal and vertical directions, in 32 pixel increments.

Figure 21A:
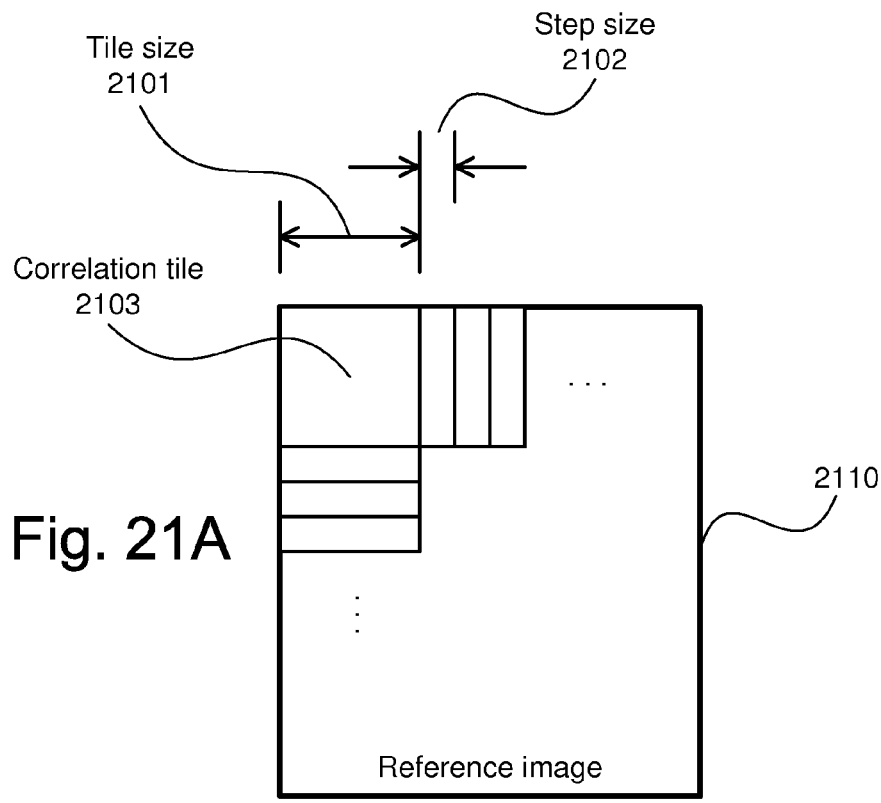
FIG. 21A shows a correlation tile of the reference image.
Figure 21B:
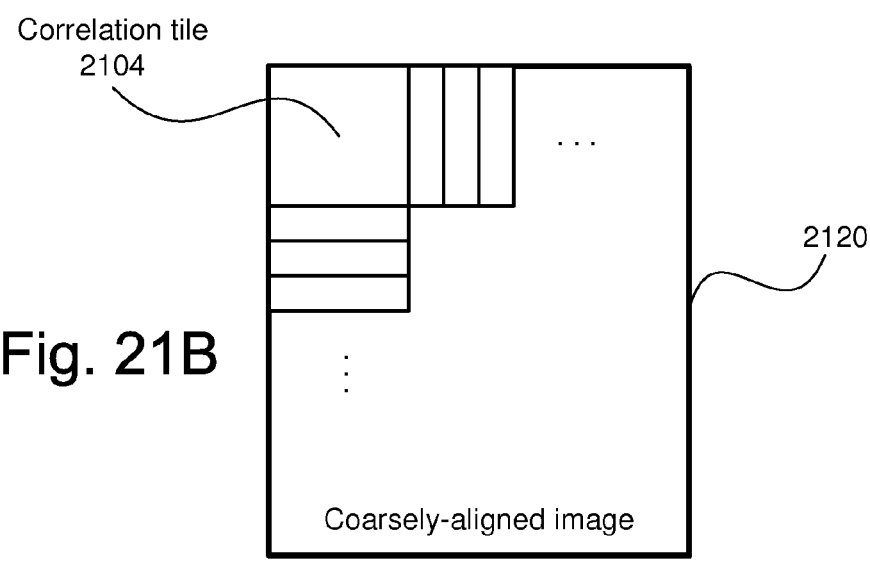
FIG. 21B shows a correlation tile in the coarsely-aligned image.

FIG. 21A shows a correlation tile 2103 of the reference image 2110, which may be used in step 1304. The correlation tile 2103 has a corresponding correlation tile 2104 in the coarsely-aligned image 2120, as seen in FIG. 21B. Both of the correlation tiles 2103 and 2104 have vertical and horizontal dimensions equal to 2Q, shown as 2101. The correlation tiles 2103 and 2104 are stepped in horizontal and vertical increments according to the step size P, shown as 2102.

A method 2200 of generating a displacement map $d_c$, as executed at step 1304, will now be described with reference to FIG. 22. The method 2200 may be implemented as software resident in the hard disk drive 110 and being controlled in its execution by the processor 105.

The method 2200 begins at step 2202, where the processor 105 divides the reference image 2110 and the coarsely-aligned image 2120 into overlapping tiles as described with reference to FIG. 16 and iterates through the tiles in both images 2110 and 2120. On a first execution of step 2202, top-left corner tiles 2103 and 2104 from both the reference image 2110 and the coarsely-aligned image 2120, respectively, are selected. On subsequent executions of step 2202, subsequent pairs of corresponding tiles are selected, from left to right in each row of tiles, starting with a first row of tiles (e.g., 2115), and finishing at a bottom row of tiles. The tile 2103 selected at step 2202 from the reference image may be denoted as $T_1$, and the selected tile 2104 from the coarsely-aligned image may be denoted $T_2$. Furthermore, the coordinates of the centre of the tiles 2103 and 2104 may be denoted as (x, y).

Figure 28:
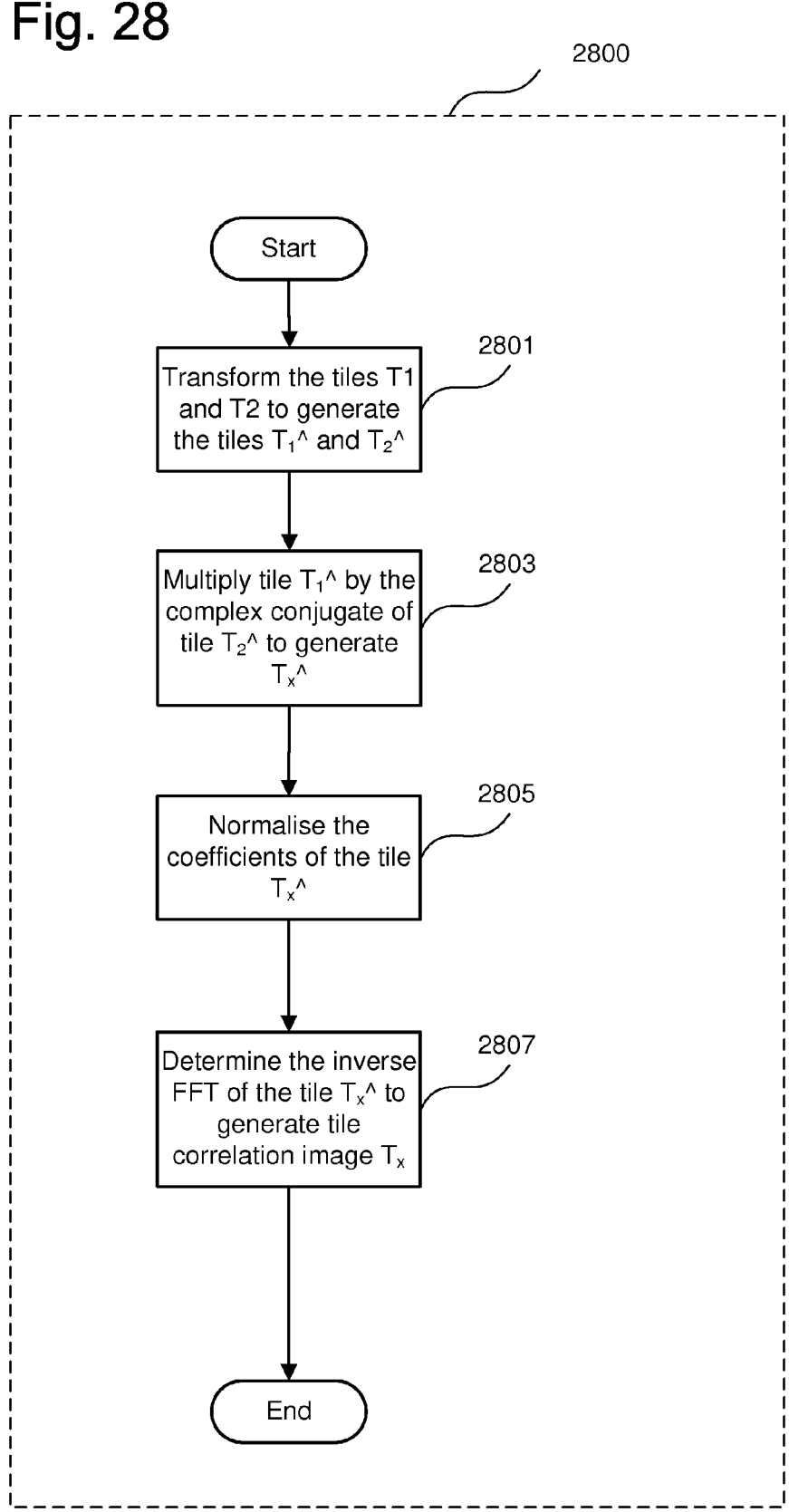
FIG. 28 is a flow diagram showing a method of generating a correlation image.

Once the pair of corresponding tiles T1 and T2 has been selected at step 2202, at a next step 2203, the selected tiles $T_1$ and $T_2$ are windowed. The tiles $T_1$ and $T_2$ may be windowed at step 2203 by a Hanning window in a vertical direction, and a Hanning window in a horizontal direction. At the next step 2204, the selected tiles $T_1$ and $T_2$ are then circular phase correlated to generate a correlation image for the selected tiles. The correlation image for the selected tiles may be configured within memory 106. The circular phase correlation is performed at step 2204 via the frequency domain. A method 2800 of generating a correlation image for the selected tiles as executed at step 2204 will now be described with reference to FIG. 28.

The method 2800 begins at the first step 2801, where the processor 105 transforms the selected tiles $T_1$ and $T_2$ using a Fast Fourier Transform (FFT), to generate tiles $T_1\hat{}$ and $T_2\hat{}$. At the next step 2803, the processor 105 multiplies the tile $T_1\hat{}$ by the complex conjugate of tile $T_2\hat{}$ to generate tile $T_x\hat{}$. Then at the next step 2805, the processor 105 normalises the coefficients of the tile $T_x\hat{}$, so that each coefficient has unit magnitude. The method 2800 concludes at the next step 2807, where the inverse FFT of the tile $T_x\hat{}$ is determined, to generate the correlation image $T_x$, for the tiles $T_1$ and $T_2$ selected at step 2202. The correlation image $T_x$ is an array of dimensions 2Q by 2Q of real values and may be configured within memory 106.

Returning to the method 2200, at the next step 2205, the processor 105 processes the correlation image $T_x$ to determine a displacement vector representing the location, denoted $(\Delta x, \Delta y)^T$, of a highest peak in the correlation image $T_x$, to sub-pixel accuracy. A method 2600 of determining the location of the highest peak in the correlation image $T_x$ to sub-pixel accuracy, as executed at step 2205, will be described below with reference to FIG. 26. The location of the peak represented by the displacement vector $(\Delta x, \Delta y)^T$, in the correlation image $T_x$ measures the amount of shift between the tiles $T_1$ and $T_2$, and hence the displacement, or warping, between the reference image and the coarsely-aligned image in the vicinity of $T_1$ and $T_2$.

The method 2200 continues at the next step 2206, where the processor 105 stores the location of the highest peak $(\Delta x, \Delta y)^T$ in the displacement map $d_c$ at the location of the centre of the selected tiles. At step 2206, the processor 105 assigns $d_c(x, y) = (\Delta x, \Delta y)^T$, where $(x, y)$ represents the coordinates of the centre of the tiles $T_1$ and $T_2$. However, if a peak in the correlation image $T_x$ could not be determined at step 2205, no peak location is stored in the displacement map $d_c(x, y)$.

At the next step 2207, if the processor 105 determines that there are more tiles in the reference image and the coarsely-aligned image to be processed, then the method 2200 returns to step 2202. Otherwise, the method 2200 concludes.

The displacement map $d_c$ generated in accordance with the method 2200 is defined at some locations $(x, y)$, where the possible locations $(x, y)$ are the centres of correlation tiles. Since the tiles were stepped with a horizontal and vertical increment of step size P, the displacement map $d_c$ may be defined at a set of points lying in a regular grid with spacing P.

Since the tiles (e.g., 2103, 2104) used for correlations in the method 2200 are overlapping, some of the calculations performed in determining the FFT of previous tiles, may be reused when calculating the FFT of subsequent tiles. This may increase the speed of the fine alignment. An alternative method 2400 for determining the Fast Fourier Transform (FFT) of correlation tiles, as executed at steps 2203 and 2204, will now be described with reference to FIGS. 23 and 24.

Figure 22:
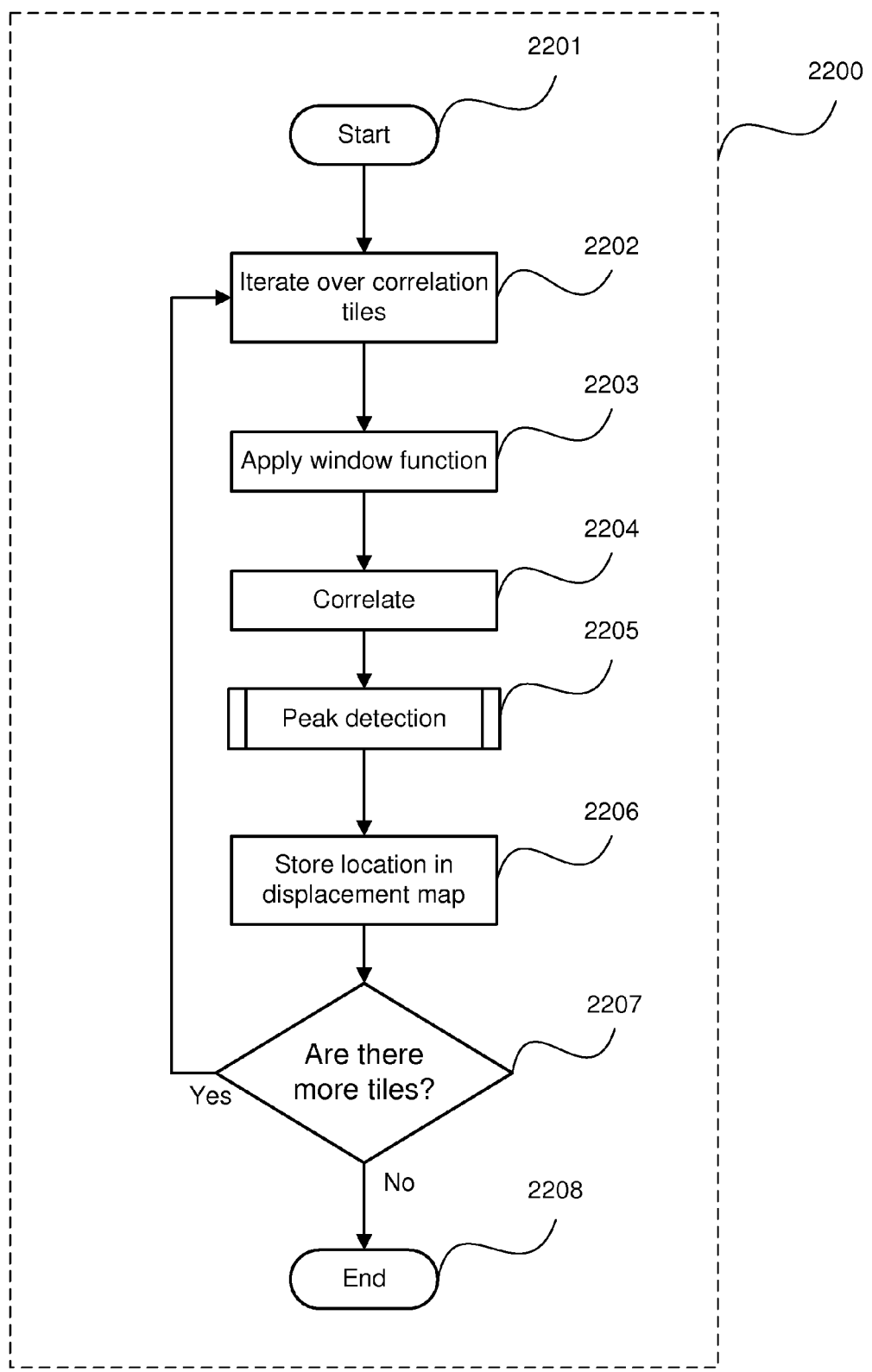
FIG. 22 is a flow diagram showing a method of generating a displacement map for the color channel.
Figure 23:
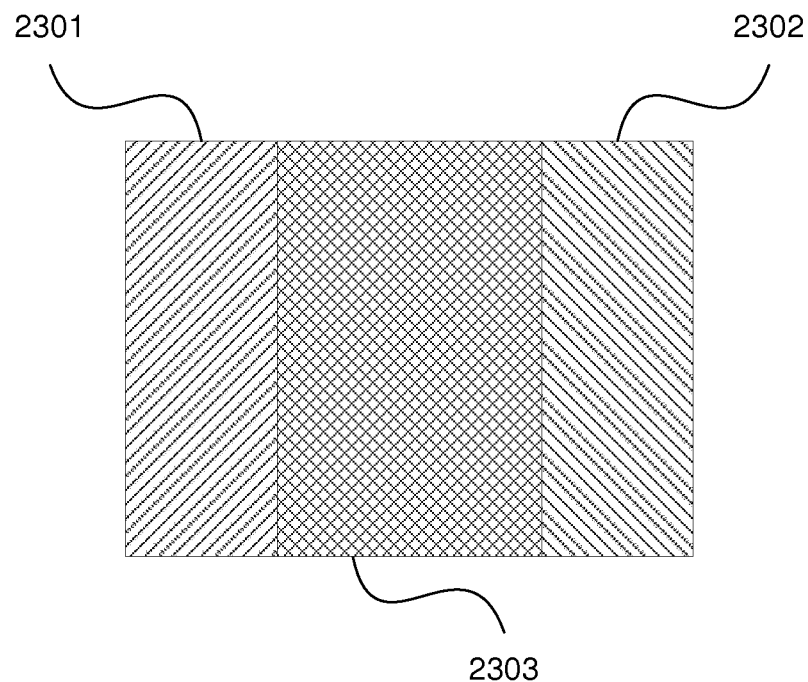
FIG. 23 shows an example of two overlapping correlation tiles.
Figure 24:
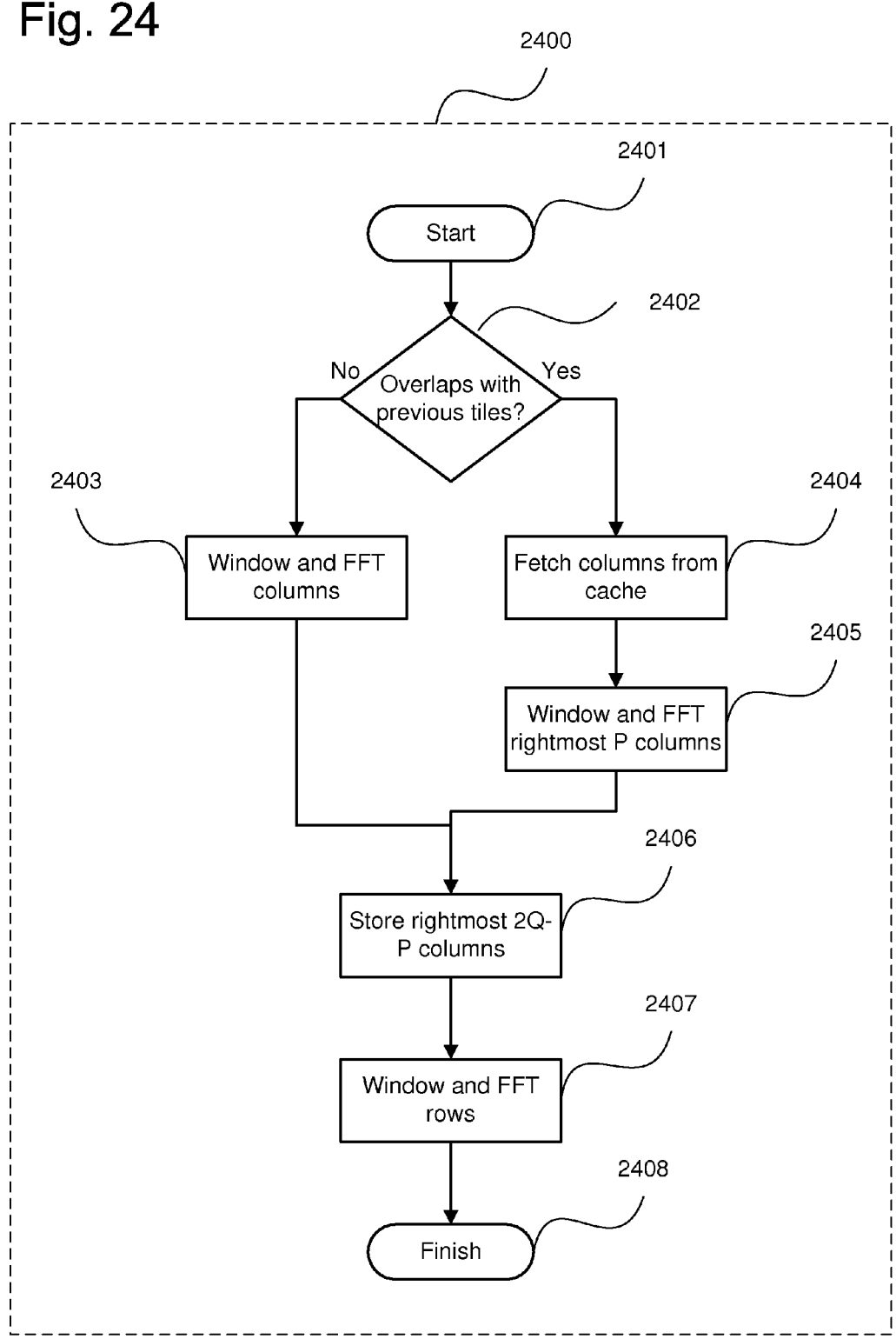
FIG. 24 is a flow diagram showing an alternative method for determining the Fast Fourier Transform (FFT) of correlation tiles.

FIG. 22 shows two overlapping tiles 2301 and 2302. The tile 2301 is shaded with north-easterly lines and the tile 2302 is shaded with south-easterly lines. A region 2303 as shown in FIG. 23 represents the overlap of the tiles 2301 and 2302. The amount of overlap of the tiles 2301 and 2302 represented by the region 2303 is equal to 2Q−P columns, where 2Q represents the tile size and P represents the step size as described above.

The method 2400 may be implemented as software resident on the hard disk drive 110 and being controlled in its execution by the processor 105. The method 2400 begins at step 2402, where if the processor 105 determines that the tiles $T_1$ and $T_2$ overlap with the tiles $T_1$ and $T_2$ from a previous execution of the loop (i.e., defined by steps 2202 to 2207) of the method 2200, the method 2400 proceeds to step 2404. Otherwise, the method 2400 proceeds to step 2403. At step 2403, each column of the tiles $T_1$ and $T_2$ is windowed vertically, and then a vertical FFT is applied to the tiles $T_1$ and $T_2$, resulting in processed data for $T_1$ and $T_2$. At the next step 2406, the method 2400 stores right-most one of the 2Q−P columns of processed data from both of the tiles $T_1$ and $T_2$ in a cache of processed columns configured within memory 106. Any data in the cache may be overwritten at step 2406. The method 2400 concludes at the next step 2407 where the processor 105 windows and applies a horizontal FFT to each row of the processed data for the tiles $T_1$ and $T_2$. Data resulting from step 2407 represents a two-dimensional windowed FFT of the tiles $T_1$ and $T_2$.

At step 2404, there is no need to determine the leftmost 2Q−P columns of processed data. Rather these columns of data may be copied out of the cache of processed columns configured within memory 106. Then at the next step 2405, the processor 105 applies the window and vertical FFT to each of the remaining P columns of the tiles $T_1$ and $T_2$. Following step 2405, the method 2400 proceeds to the step 2406 and the method 2400 concludes.

Figure 19:
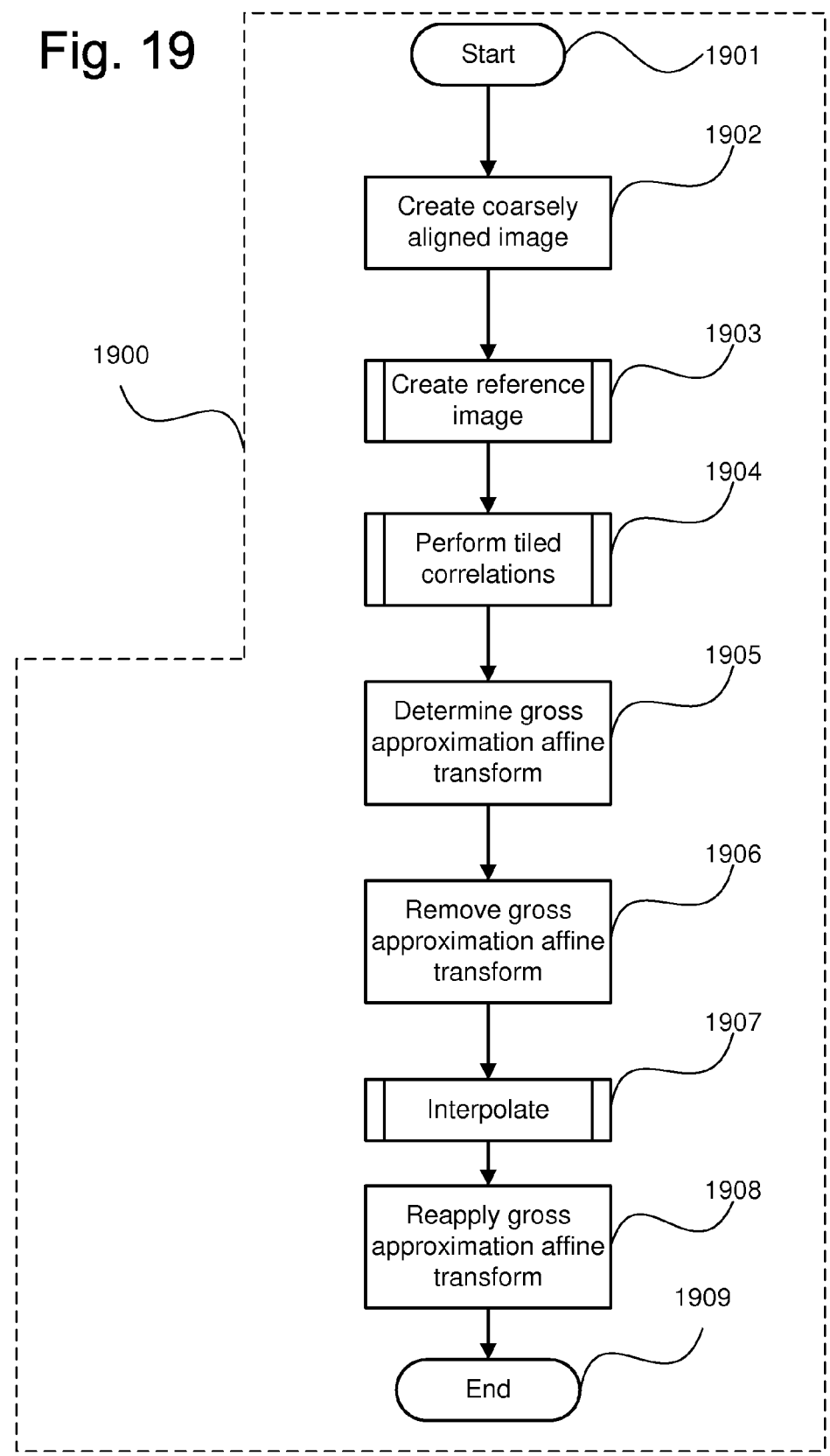
FIG. 19 is a flow diagram showing a method of determining a fine alignment warp map for a scanned image of the barcode.

Returning to the method 1900 of FIG. 19, following the generation of the displacement map $d_c$ at step 1904, the following steps of the method 1900 may use the displacement map $d_c$ to generate a warp map $w_c$. The warp map $w_c$ maps each codel of the barcode 300 to a location in the coordinate space of the scanned image of the protected document 200. Some parts of the warp map $w_c$ may map codels in the barcode 300 to coordinates outside the scanned image, since the scanner 119 may not have scanned the entire barcode 300.

If $(x, y)$ are the coordinates of a pixel in the reference image, then the displacement map $d_c(x, y)$ represents the shift to a corresponding location in the coarsely-aligned image. Therefore, the corresponding coordinates in the coarsely-aligned image may be determined as $(x, y)^T + d_c(x, y)$. Applying the coarse alignment affine transform to the reference image provides the coordinates in the scanned image. The warp map $w_c$ maps each codel $(x, y)$ of the barcode 300 to a location in the coordinate space of the scanned image of the barcode 300 in accordance with Formula (16) as follows:

$$w_c(x,y) = A((x,y)^T + d_c(x,y)) + a \qquad (15)$$

However, the displacement map $d_c(x, y)$ is only defined at a few places, namely the locations of the centres of some correlation tiles (e.g., 2103 and 2104). In order to determine a value for Formula (16) at the locations of all codels of the barcode 300, the displacement map $d_c$ is interpolated.

The method 1900 continues at the next step 1905, where the processor 105 determines an affine transform defined by a matrix G and vector g. The affine transform determined at step 1905 may be referred to as a gross approximation affine transform. The gross approximation affine transform approximates the warp map $w_c$ with an affine transform. The error function to be minimized in determining the affine transform is the Euclidean norm measure E that may be defined according to Formula (17) as follows:

$$E = \sum_{(x,y)} \left\| G\binom{x}{y} + g - w_c(x, y) \right\|^2 \quad (16)$$

Formula (17) may be solved using least squares minimisation methods to determine the affine transform in accordance with Formula (18) as follows:

$$(G \mid g) = \left( \sum_{(x,y)} w_c(x, y) \binom{x}{y}{1}^T \right) \left( \sum_{(x,y)} \binom{x}{y}{1} \binom{x}{y}{1}^T \right)^{-1} \quad (17)$$

For both Formulae (16) and (17), the sums are taken over all coordinate pairs (x, y) where the displacement map $d_c(x, y)$ is defined, and hence the warp map $w_c(x, y)$ is defined, via Formula (15).

At the next step 1906 of the method 1900, the processor 105 removes the gross approximation affine transform from the warp map $w_c$ to generate a modified warp map $w_c'$ in accordance with Formula (19) as follows:

$$w_c'(x,y) = w_c(x,y) - G(x,y) - g \quad (18)$$

where the modified warp map $w_c'$ is defined at coordinates (x, y) at which $d_c(x, y)$ is defined. Thus, the modified warp map $w_c'$ is defined at some points (x, y) that lie on the grid formed by the centres of the correlation tiles (e.g., 2103, 2104).

The method 1900 continues at the next step 1907, where the processor 105 interpolates the modified warp map $w_c'$, so that the modified warp map $w_c'$ is defined at all codel coordinates (x, y, c) in the barcode 200. A method 2500 of interpolating a mapping, as executed at step 1907, will be described in detail below with reference to FIG. 25.

At the next step 1908, the processor 105 then reapplies the previously removed gross approximation affine transform to the modified warp map $w_c'$ to generate the warp map $w_c$ in accordance with Formula (20) as follows:

$$wc(x,y) = wc'(x,y) + G(x,y)T + g \quad (19)$$

The warp map is now defined at all codels in the barcode 300.

Map Interpolation

Figure 25:
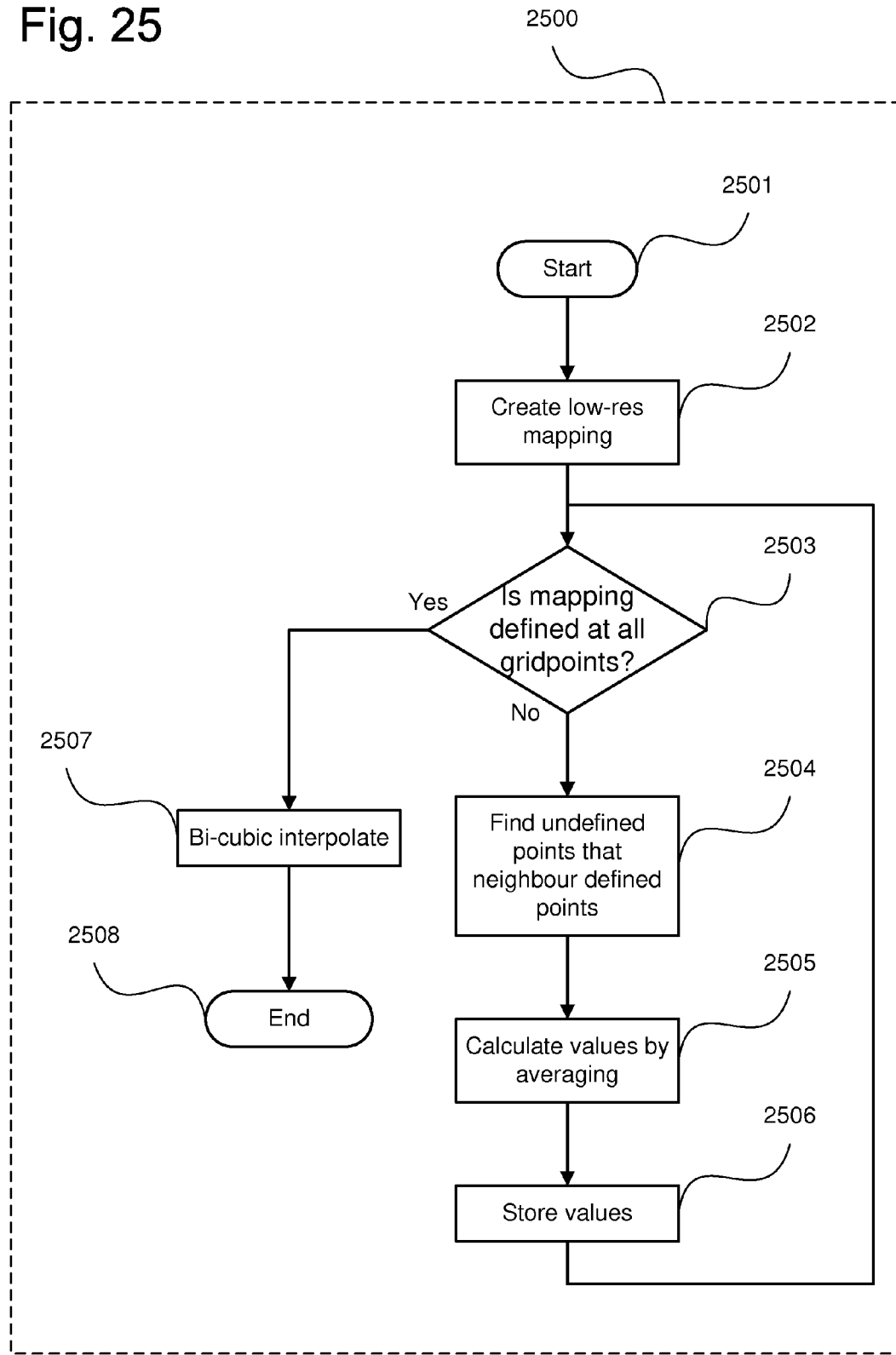
FIG. 25 is a flow diagram showing a method of interpolating a mapping.

The method 2500 of interpolating a mapping, as executed in relation to the modified warp map $w_c'$, and as executed in relation to the displacement map $d_c$, will be described in detail below with reference to FIG. 25. The method 2500 may be implemented as software resident in the hard disk drive 110 and being controlled in its execution by the processor 105.

The method 2500 uses a mapping m defined at the centre of one or more correlation tiles (e.g., 2103 and 2104). The mapping m is either the modified warp map $w'_c$ as determined at step 1306, or the displacement map $d_c$ as determined at step 1312. The mapping m is interpolated in accordance with the method 2500 to be defined at coordinates (x, y) for all codels (x, y) in the barcode 200.

The method 2500 begins at step 2502 where the processor 105 generates a low-resolution mapping $m_L$ within memory 106 and initializes the values of the mapping $m_L$. At step 2502, the mapping $m_L$ is defined at coordinates (x, y) where m is defined, and is assigned the same values as m at those points. Thus, the mapping $m_L$ is defined at some of the points at the centres of correlation tiles. The centres of the correlation tiles form a grid with a spacing equal to the tile step size, P.

A set of points referred to as "gridpoints" may be defined. The gridpoints comprise the points that are the centres of correlation tiles, and additionally include other points which are not at the centre of a correlation tile. These other points may be obtained by extending the regular grid formed by the tile centres. Gridpoints may be defined as those points (x, y) in the extended grid whose coordinates lie in the range as follows:

$$-2P < x < W + 2P \quad (20)$$

$$-2P < y < H + 2P \quad (21)$$

With gridpoints defined as above, the coordinates of the gridpoints may be determined in accordance with Formula (27) as follows:

$$(x,y) = (Q+XP, Q+YP) \quad (22)$$

where X and Y are integers, and X and Y lie in the following ranges:

$$\left\lfloor -\frac{Q}{P} - 1 \right\rfloor \leq X \leq \left\lceil \frac{W-Q}{P} + 1 \right\rceil \quad (23)$$

$$\left\lfloor -\frac{Q}{P} - 1 \right\rfloor \leq Y \leq \left\lceil \frac{H-Q}{P} + 1 \right\rceil \quad (24)$$

The value of points in the mapping $m_L$ at each of the gridpoints (x, y) may be determined in accordance with steps 2503 to 2507 described below. The mapping $m_L$ was defined where m is defined in step 2502. At step 2503, the method 2500 begins a loop (i.e., defined by steps 2503 to 2506) that determines the remaining values of the mapping $m_L$. At step 2503, if the processor 105 determines that the mapping $m_L$ has been defined at all gridpoints (x, y) then the method 2500 continues at the next step 2507. Otherwise, the method 2500 proceeds to step 2504. At step 2504, the processor 105 determines the coordinates of all undefined gridpoints that are adjacent to (i.e., neighbour) defined gridpoints. Then at step 2505, the processor 105 determines values for each of the gridpoints found in step 2504. The value for adjacent gridpoints is set to the average of the values of the low resolution mapping $m_L$ at adjacent defined gridpoints. Then at the next step 2506, the values determined at step 2505 are stored in the low resolution mapping $m_L$ configured within memory 106. The method 2500 then returns to step 2503.

As described above, at step 2503, if the processor 105 determines that the low resolution mapping $m_L$ has been defined at all gridpoints (x, y) then the method 2500 continues at the next step 2507. At step 2507, the low resolution mapping $m_L$ has been determined at all gridpoints, and may be used to interpolate the mapping m. At step 2507, the mapping m is interpolated at all codel coordinates (x, y) using bi-cubic interpolation on the mapping $m_L$.

Peak Detection

Figure 26:
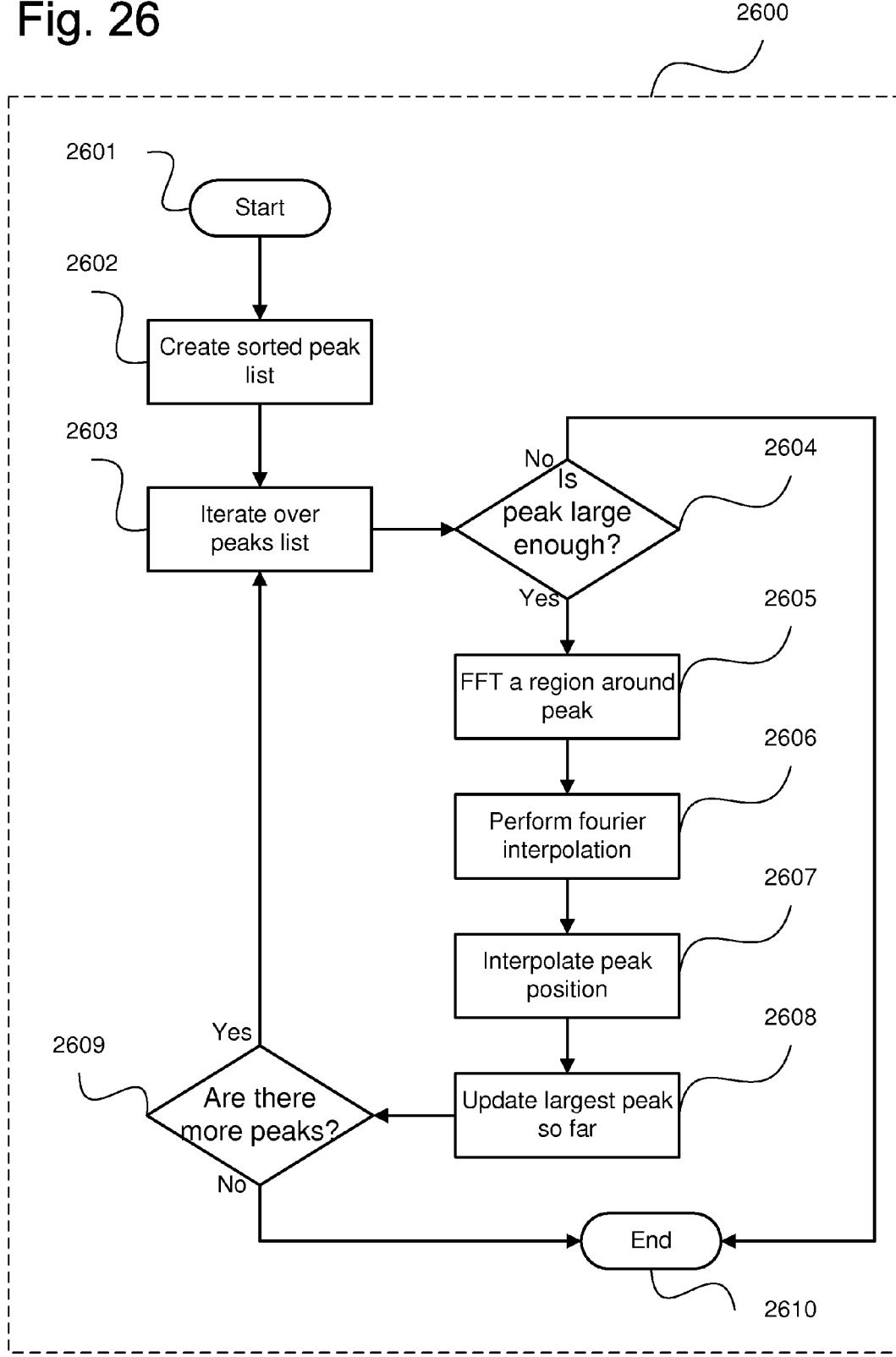
FIG. 26 is a flow diagram showing a method of determining the location of a highest peak in a correlation image to sub-pixel accuracy.

The method 2600 of determining the location ($\Delta x$, $\Delta y$) of a highest peak in the correlation image $T_x$, to sub-pixel accuracy, as executed at step 2205, will now be described with reference to FIG. 26. The location ($\Delta x$, $\Delta y$) of the highest peak in the correlation image $T_x$ represents the shift between the two tiles $T_1$ and $T_2$ being correlated. The method 2600 may be implemented as software resident in the hard disk drive 110 and being controlled in its execution by the processor 105.

The method 2600 analyses the correlation image $T_x$ and determines the location ($\Delta x$, $\Delta y$) of the highest peak in the correlation image $T_x$ to sub-pixel accuracy. The method 2600 selects an initial peak height threshold $H_t$ and a peak height ratio $H_r$. The initial peak height threshold $H_t$ and the peak height ratio $H_r$ parameters may be varied. Increasing the initial peak height threshold $H_t$ decreases the number of peaks considered acceptable. Decreasing the peak height ratio $H_r$ increases the speed of execution of the method 2600 and also increases the chance that a wrong peak will be selection as the highest peak. The initial peak height threshold $H_t$ and the peak height ratio $H_r$ parameters may be set to $H_t$=0.1 and $H_r$=4.

The method 2600 begins at step 2602, where the processor 105 determines all "peaks" in the correlation image $T_x$. A "peak" is a pixel in the correlation image $T_x$ with coordinates ($x_0$, $y_0$), whose pixel value $T_x(x_0, y_0)$ is larger than the values of eight neighbouring pixels of the pixel. This means that pixels on the edges of the correlation image $T_x$ may be regarded as having eight neighbours, since the correlation image $T_x$ uses periodic boundary conditions. Pixels on the left edge may be regarded as adjacent to the corresponding pixels on the right edge, and similarly the pixels on the top edge may be regarded as adjacent to the corresponding pixels on the bottom edge. The peaks in the correlation image $T_x$ may be stored in a list configured within memory 106. The peaks may be stored in the list in decreasing order of peak pixel value.

Each peak in the peak list has integer coordinates ($x_0$, $y_0$). These coordinates ($x_0$, $y_0$) provide a good first approximation to the shift between the reference and coarsely-aligned images. However, to obtain sub-pixel accurate coordinates ($\Delta x$, $\Delta y$) for the location of the highest peak, the correlation image $T_x$ is interpolated in the vicinity of each peak. The method 2600 processes each peak in the peak list, and interpolates the correlation image $T_x$ to determine the sub-pixel accurate peak location.

Also at step 2602, a variable $H_t$ is initialized to an initial value of the initial peak height threshold $H_i$. At the next step 2603, the processor 105 iterates over all of the peaks in the peak list. On the first execution of step 2603, a first peak in the peak list is selected. On subsequent executions of step 2603 subsequent peaks in the peak list are selected. At step 2604, the value of the peak pixel $T_x(x_0, y_0)$ selected at step 2603 is analysed by the processor 105 to determine whether the peak pixel value $T_x(x_0, y_0)$ multiplied by the peak height ratio $H_r$ is larger than the current peak height threshold $H_t$. That is, the processor 105 determines whether:

$$T_x(x_0, y_0) \times H_r > H_t \qquad (25)$$

If the peak pixel value $T_x(x_0, y_0)$ multiplied by the peak height ratio $H_r$ is larger than the current peak height threshold $H_t$, then the method 2600 proceeds to step 2605. Otherwise, the method 2600 concludes. At step 2605, the processor 105 selects a sub-region, h, of the correlation image $T_x$. The sub-region, h, has width and height of $2Z$ pixels, where $Z=8$. The sub-region h is also centred at the coordinates ($x_0$, $y_0$) of the peak selected at step 2603. The value of the sub-region, h, may be determined in accordance with Formula (31) as follows:

$$h(x,y) = T_x(x_0+x-Z, y_0+y-Z) \qquad (26)$$

for x and y in the range 0 to $2Z-1$, where the values of the correlation image $T_x$ outside the image are obtained by again applying periodic boundary conditions to the correlation image $T_x$. That is, the values of the correlation image $T_x$ outside the image are obtained by making the correlation image periodic. At step 2605, the selected sub-region, h, is then transformed with the Fast Fourier Transform (FFT) to determine a transformed image $\hat{h}$.

The transformed image, $\hat{h}$, is then used at the next step 2606, where the processor 105 interpolates the correlation image $T_x$ in the vicinity of the peak ($x_0$, $y_0$) to determine an approximation ($x_1$, $y_1$) of the location of the peak. The correlation image $T_x$ may be interpolated at twenty-five (25) points, where x and y coordinates may be determined as follows:

$$x \in \{x_0-0.5, x_0-0.25, x_0+0, x_0+0.25, x_0+0.5\}$$

$$y \in \{y_0-0.5, y_0-0.25, y_0+0, y_0+0.25, y_0+0.5\}$$

The interpolation performed at step 2606 is Fourier interpolation and is executed using Formula (32) as follows:

$$C(x_0+dx, y_0+dy) = h(Z+dx, Z+dy) \qquad (27)$$

$$= \sum_{k=-Z}^{Z} \sum_{n=-Z}^{Z} \hat{h}(k,n) \beta_k(Z+dx) \beta_n(Z+dy)$$

where $\beta$ is defined as follows:

$$\beta_k(x) = \begin{cases} e^{jpkx/Z} & \text{if } k \neq \pm Z \\ \frac{1}{2} e^{jpkx/Z} & \text{if } k = \pm Z \end{cases} \qquad (28)$$

A better approximation to the peak location may be found using the value of ($x_1$, $y_1$) at which the interpolated value $T_x(x_1, y_1)$ is largest.

At the next step 2607, the processor 105 determines a sub-pixel accurate estimate of the location ($x_2$, $y_2$) of the selected peak. The interpolated correlation image $T_x$ may be approximated by a bi-parabolic function, f, in a region close to ($x_1$, $y_1$). A bi-parabolic function f has a form in accordance with Formula (34) as follows:

$$f(x,y) = a_1 x^2 + a_1 xy + a_2 y^2 + a_3 x + a_4 y + a_5 \qquad (29)$$

The coefficients ($a_0$, $a_1$, ..., $a_5$) that make $f(x-x_1, y-y_1)$ approximately equal to the interpolated image $T_x(x, y)$ when x and y are close to $x_1$ and $y_1$, respectively, may be determined in order to determine the sub-pixel accurate estimate of the location of the selected peak. Equivalently, the function $f(x, y)$ may be approximated to $T_x(x+x_1, y+y_1)$ when x and y are small. The coefficients ($a_0$, $a_1$, ..., $a_5$) may be determined in accordance with Formula (36) below in order to minimize E in accordance with Formula (35) as follows:

$$E = \int_{-0.125}^{0.125} \int_{-0.125}^{0.125} (f(x,y) - T_x(x_1+x, y_1+y))^2 dx\,dy \qquad (30)$$

$$\begin{pmatrix} a_0 \\ a_1 \\ a_2 \\ a_3 \\ a_4 \\ a_5 \end{pmatrix} = \sum_{k=-Z}^{Z} \sum_{n=-Z}^{Z} \hat{h}(k,n) \exp(jp(kx_h + ny_h)) v_{k,n} \qquad (31)$$

where $x_h = x_1 - x_0 + Z$ and $y_h = y_1 - y_0 + Z$, and where the $v_{k,n}$ are constant vectors. The constant vectors $v_{k,n}$ may be determined in accordance with a method 3100, which will now be described with reference to FIG. 31.

The method 3100 of determining the constant vectors $v_{k,n}$ as executed at step 2607 may be implemented as software resident in the hard disk drive 110 and being controlled in its execution by the processor 105.

The method 3100 begins at step 3101, where the processor 105 determines the matrix V defined in accordance with Formula (37) as follows:

$$V = \int_{-0.125}^{0.125} \int_{-0.125}^{0.125} \begin{pmatrix} x^2 \\ xy \\ y^2 \\ x \\ y \\ 1 \end{pmatrix} \begin{pmatrix} x^2 \\ xy \\ y^2 \\ x \\ y \\ 1 \end{pmatrix}^T dx\,dy \qquad (32)$$

Each element in the matrix V is the integral of a polynomial in x and y, and may be determined analytically. Then at the next step 3103, the processor 105 determines the values of the constant vectors $v_{k,n}$ in accordance with the Formula (38) as follows:

$$v_{k,n} = \frac{1}{(2Z)^2} V^{-1} \int_{-0.125}^{0.125} \int_{-0.125}^{0.125} \beta_k(x)\beta_n(y) \begin{pmatrix} x^2 \\ xy \\ y^2 \\ x \\ y \\ 1 \end{pmatrix} dx\,dy \qquad (33)$$

Each element in the constant vectors $v_{k,n}$ is the integral of an exponential in x and y multiplied by a polynomial in x and y, and may be evaluated analytically. The method 3100 concludes after step 3103.

The sub-pixel accurate peak location $(x_2, y_2)$ may be set to the position of the maximum value of the bi-parabolic function f. The sub-pixel accurate peak location $(x_2, y_2)$ may be determined in accordance with Formula (39) as follows:

$$\begin{pmatrix} x_2 \\ y_2 \end{pmatrix} = \begin{pmatrix} x_1 \\ y_1 \end{pmatrix} + \frac{1}{a_1^2 - 4a_0 a_2} \begin{pmatrix} 2a_2 a_3 - a_1 a_4 \\ 2a_0 a_4 - a_1 a_3 \end{pmatrix} \qquad (34)$$

The height of the selected peak, H, in the interpolated correlation image $T_x$ is also determined at step 2607 in accordance with Formula (40) as follows:

$$H = f(x_2 - x_1, y_2 - y_1) \qquad (35)$$

The method 2600 continues at the next step 2608, where the processor 105 determines whether the height of the selected peak, H, at the location $(x_2, y_2)$ determined at step 2607 is the largest peak determined in a current execution of the method 2600. If the height of the selected peak, H, at the location $(x_2, y_2)$ is larger than the current peak height threshold $H_t$, then the location $(x_2, y_2)$ represents the location of the highest peak found in the current execution of the method 2600. In this instance, the current peak height threshold $H_t$ is assigned a new value of the selected peak H, and the sub-pixel accurate coordinates $(\Delta x, \Delta y)$ representing the location of the highest peak in the correlation image $T_x$ is assigned the value of the location $(x_2, y_2)$ determined at step 2607. Otherwise, if the height of the selected peak H is not larger than the current peak height threshold $H_t$, no highest peak location was found in the current iteration of the loop defined by steps 2603 to 2608.

The method 2600 continues at the next step 2609, where if the processor 105 determines that there are more peaks in the peak list, then the method 2600 returns to step 2603. Otherwise, the method 2600 concludes.

During the execution of the method 2600, no highest peak may be found. For example, if at every execution of step 2608 the height of the selected peak, H, at the location $(x_2, y_2)$ is not larger than the current peak height threshold $H_t$ then the sub-pixel accurate coordinates $(\Delta x, \Delta y)$ will not be set to any given values. However, if step 2608 did find a highest peak, then the values of the sub-pixel accurate coordinates $(\Delta x, \Delta y)$ represent the location of the highest peak.

Extracting Data from a Barcode

Figure 27:
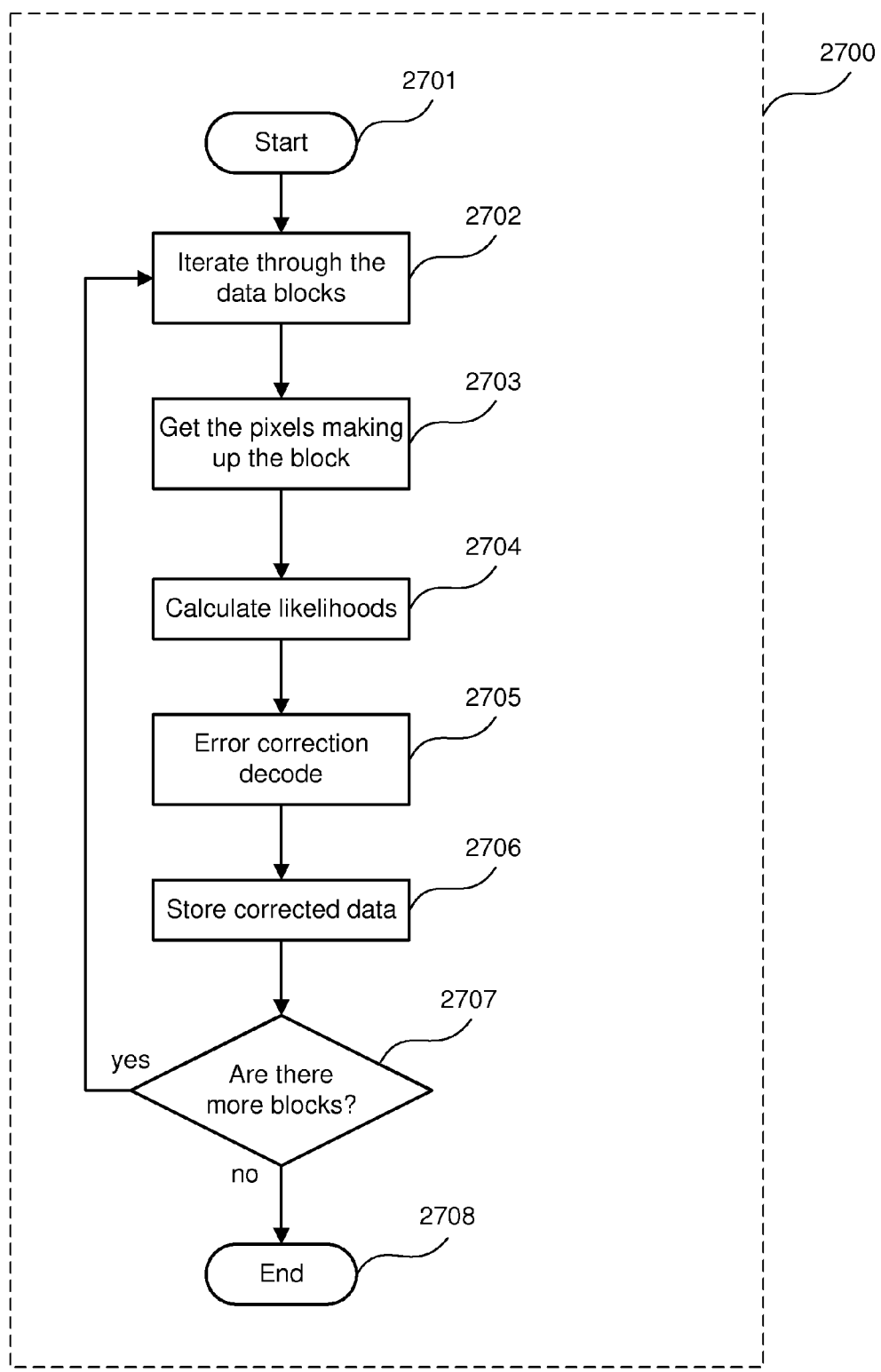
FIG. 27 is a flow diagram showing a method of extracting data from a barcode of the type presented in FIG. 3, and decoding the extracted data.

The method 2700 of extracting data from the barcode 300 and decoding the extracted data, as executed at step 607, will now be described with reference to FIG. 27. The method 2700 may be implemented as software resident in the hard disk drive 110 and being controlled in its execution by the processor 105. The method 2700 extracts the data from the data codels (e.g., 303) of the embedded barcode 201.

Figure 29:
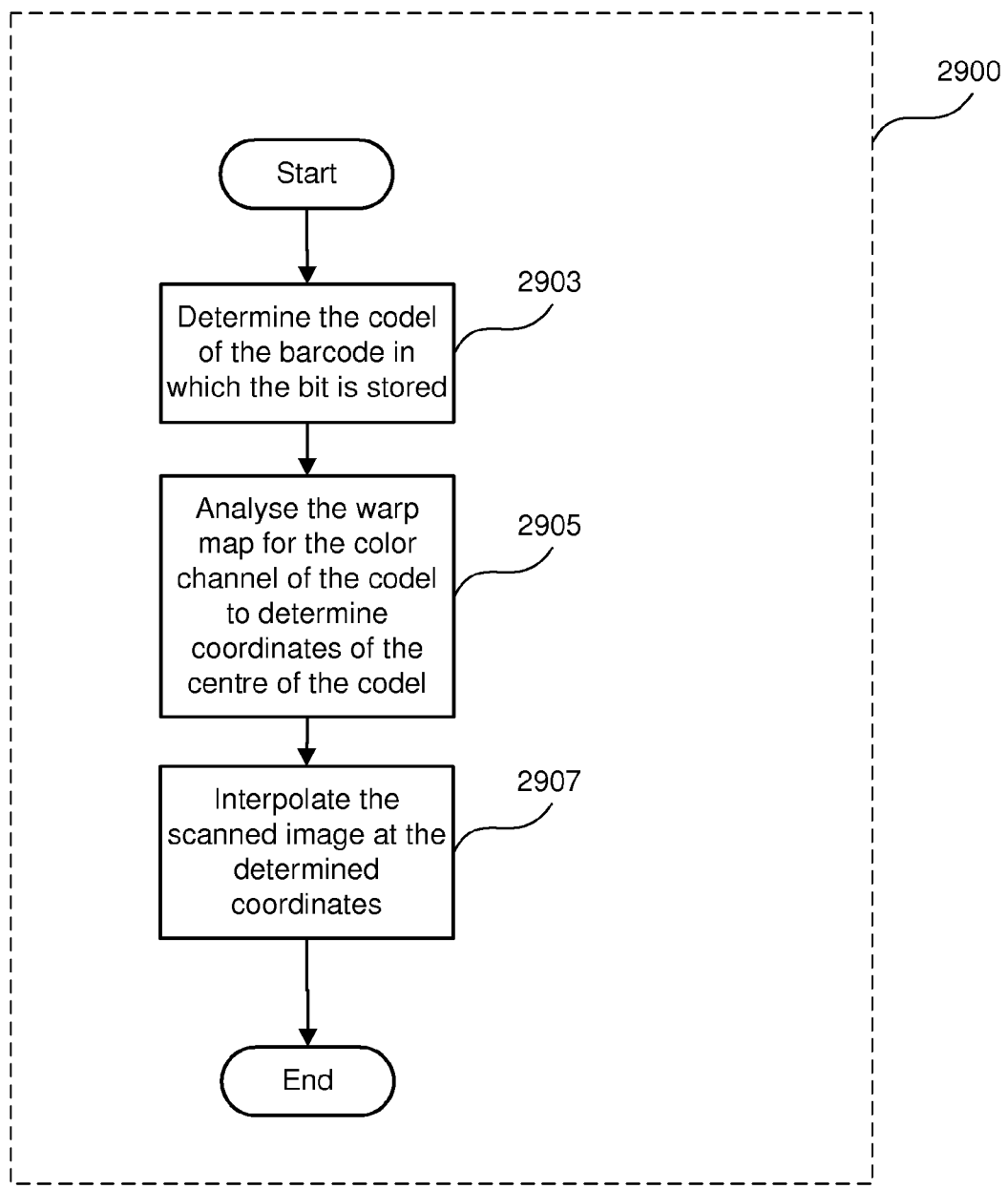
FIG. 29 is a flow diagram showing a method of determining pixel values from the scanned image of the protected document of FIG. 2.

The method 2700 begins at step 2702, where the processor 105 iterates through blocks of the encoded data. On a first execution of step 2702, the first block of data is selected for processing. On subsequent executions of step 2702, the following blocks are selected. The number of blocks that are iterated through is equal to a maximum number of blocks that may be stored in the barcode 300 in accordance with the dimensions determined for the barcode 300, as described above. At the next step 2703, for each bit of encoded data for a current block, the processor 105 determines pixel values from the scanned image of the barcode 300 at the centres of the codels in which data for the current block is stored. A method 2900 of determining pixel values from the scanned image of the barcode, as executed at step 2703, will be described in detail below with reference to FIG. 29.

The method 2900 may be implemented as software resident in the hard disk drive 110 and being controlled in its execution by the processor 105. The method 2900 begins at step 2903, where the processor 105 uses the mapping ψ to determine the codel of the barcode 300 in which the bit is stored. The codel coordinates may be represented as (x, y).

The method 2900 continues at the next step 2905, where the processor 105 analyses the warp map determined at step 2903, to determine the coordinates $w_c(x, y)$ of the centre of that codel in the scanned image of the barcode 200. Then at the next step 2907, the processor 105 interpolates the scanned image at the coordinates $w_c(x, y)$, to determine an RGB pixel value $s(w_c(x, y))$ for the current data bit.

The method 2700 continues at the next step 2704, where the processor 105 uses the pixel value(s) determined at step 2703 to determine likelihood values λ for the N bits in the encoded block, in accordance with Formula (43) or Formula (51) above. Then at the next step 2705, the processor 105 performs error-correction decoding, using the N likelihood values λ determined at step 2704 to determine K corrected bits. The method 2700 continues at the next step 2706, where the processor 105 stores the corrected K bits in memory 106. At the next step 2707, if the processor 105 determines that there are more blocks of data to be processed, then the method 2700 returns to step 2702. Otherwise, the method 2700 concludes.

If the binary data encoded in the barcode in accordance with method 1600 is pre-processed by encrypting the data, then the data may be decrypted after execution of method 2700 at step 607.

Comparing Vectors of Numerical Values

A method of comparing two vectors of numerical values to determine the authenticity of a protected document, as executed at step 610 of method 600, will be described in detail.

One vector of numerical values is generated at step 608 where data extracted from a barcode is deserialized. This vector may be denoted as refV. A second vector of numerical values is generated at step 609 by characterising an image of the document substrate region. This vector may be denoted as subV.

To compare the two vectors, refV and subV, the normalized dot-product of the two vectors is taken. The normalized dot-product between vectors indicates how closely-related one vector is to another. A normalized dot-product close to one (1) indicates a strong relationship between the two vectors, whereas a normalized dot-product close to zero (0) or less than zero (0) indicates a weak relationship. The normalized dot-product of refV and subV is defined by the following formula:

$$refV \cdot subV = \sum_{i=1}^{N_v} \frac{refV_i}{\|refV\|} \frac{subV_i}{\|subV\|}$$

In order to determine authenticity, the normalized dot-product result is compared to a threshold value $T_{auth}$. If the result is greater than $T_{auth}$ then the protected document is determined to be authentic, otherwise, the protected document is determined to be a forgery.

In this embodiment, $T_{auth}$=0.5 though other values of $T_{auth}$ may be determined from analysis of falsely-positive authentic results and falsely-negative forgery results. Any method of determining a suitable of $T_{auth}$ may be used, including but not limited to machine-learning methods and methods of adjusting $T_{auth}$ by specifying a required ratio between false-positive and false-negative results.

Second Embodiment

In a second embodiment of this invention, a barcode similar to the barcode of the first embodiment is embedded into a document to form a protected document. In this embodiment, it is a requirement that the print resolution $R_p$ be higher than the barcode codel resolution $R_c$, but must still be an integer multiple of the barcode codel resolution.

In the first embodiment, a barcode is embedded in the yellow channel of a document. Although the barcode is printed over the document substrate region, the yellow ink does not contribute substantially to the grey intensity image of the document substrate region. Therefore, the document substrate region may still be characterized accurately despite the yellow barcode.

In a second embodiment, barcode data codels and alignment codels are embedded in the document in an arrangement that allows a significant portion of the document substrate region to be visible in spite of the black barcode, and therefore, allows characterization of the document substrate region.

In this embodiment, alternative methods of embedding a barcode, authenticating a protected a document and characterising a coarsely-aligned image are required. These alternative methods are described in detail below.

Embedding a Barcode in a Document

An alternative method of embedding a barcode in a document, as executed at step 1307 of method 1300, is described.

The barcode to be embedded has a codel resolution ($R_c$) that may be less than the print resolution of the document ($R_p$). Therefore, a scaling factor SF may be calculated from the following equation:

$$SF = R_p / R_c$$

The scaling factor SF will always be an integer since the codel resolution is limited in such a way.

The barcode region in the document is divided into a two-dimensional grid of embedded codels. An embedded codel is formed by a SF-by-SF square of pixels. Each embedded codel in the barcode region of the document may be referred to by an embedded codel coordinate system similar to the coordinate system used to refer to codels in a barcode. Thus, a pair of coordinates (x, y) specifies an embedded codel where x refers to the embedded codel's column and y refers to the embedded codel's row. Hence, each embedded codel has a corresponding barcode codel with the same coordinates (x, y).

Figure 30:
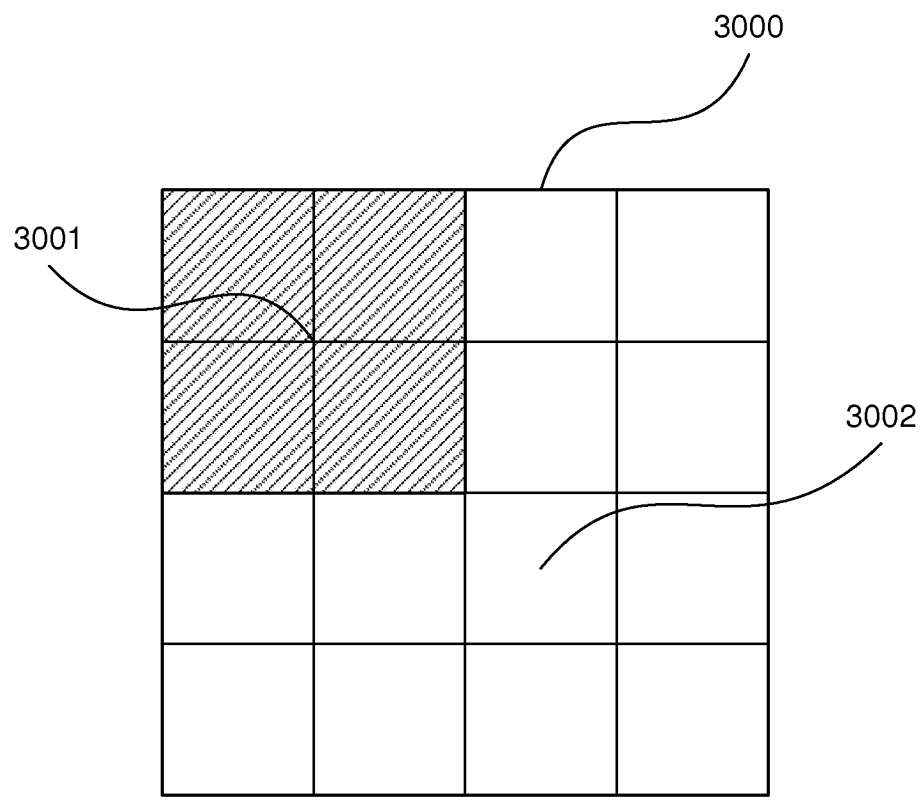
FIG. 30 shows an embedded codel corresponding to a barcode codel set to "on" according to a second embodiment of the invention.

If a barcode codel is set to "on", then an arrangement of pixels of the corresponding embedded codel is set to "black". As shown in FIG. 30, in which SF=4, the pixels of an embedded codel set to "black" 3001, is a subset of the pixels forming the embedded codel 3000. Thus, some pixels, such as 3002, forming the embedded barcode are left unset so that when the document is printed, and scanned, the document substrate may be still be imaged. Although the example in FIG. 30 shows a square group of pixels of the embedded pixel set to "black", any other arrangement of pixels being set to "black" may be used.

Authenticating a Protected Document

Figure 31:
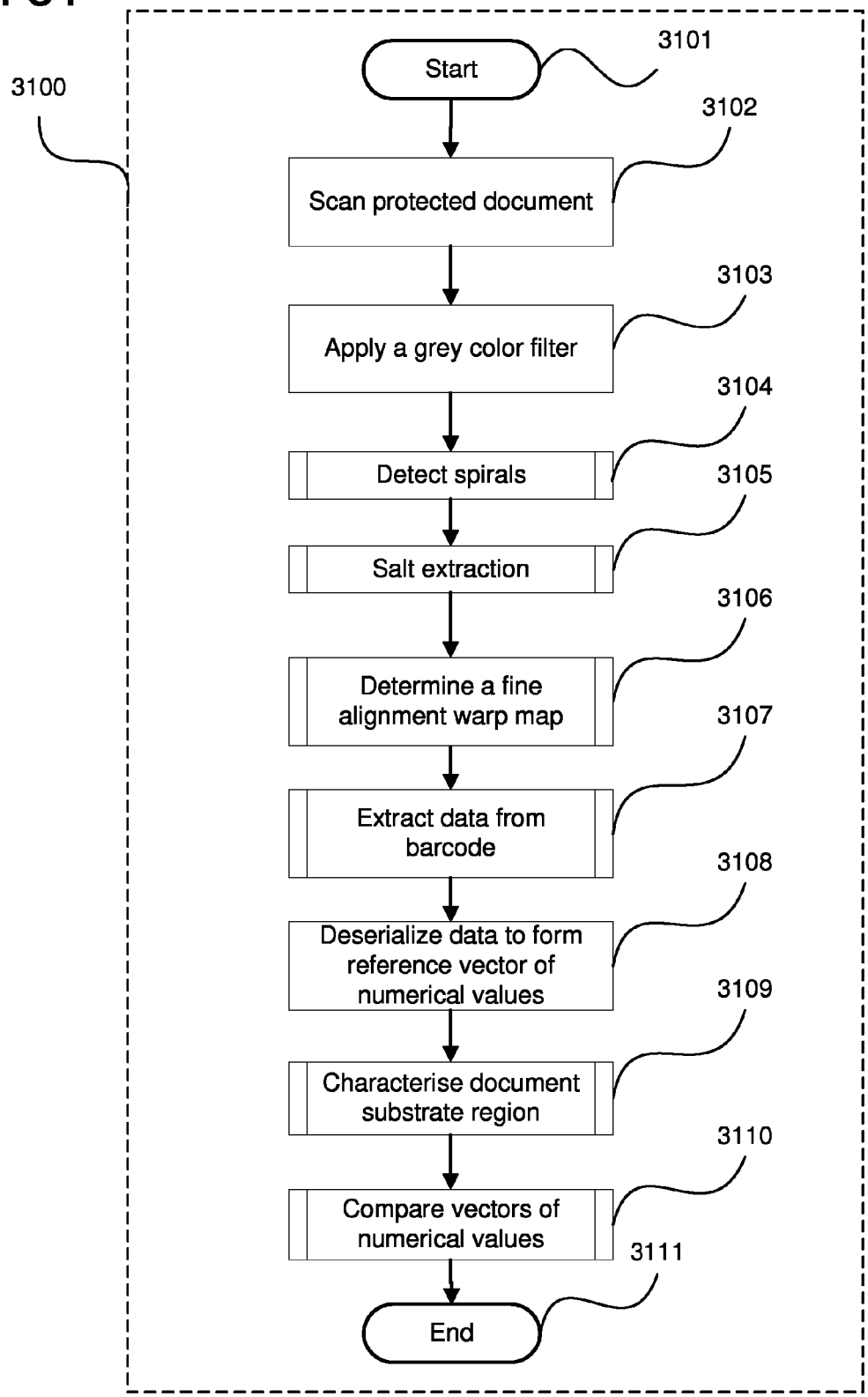
FIG. 31 is a flow diagram showing a method of authenticating a protected document according to a second embodiment of the invention.
Figure 32:
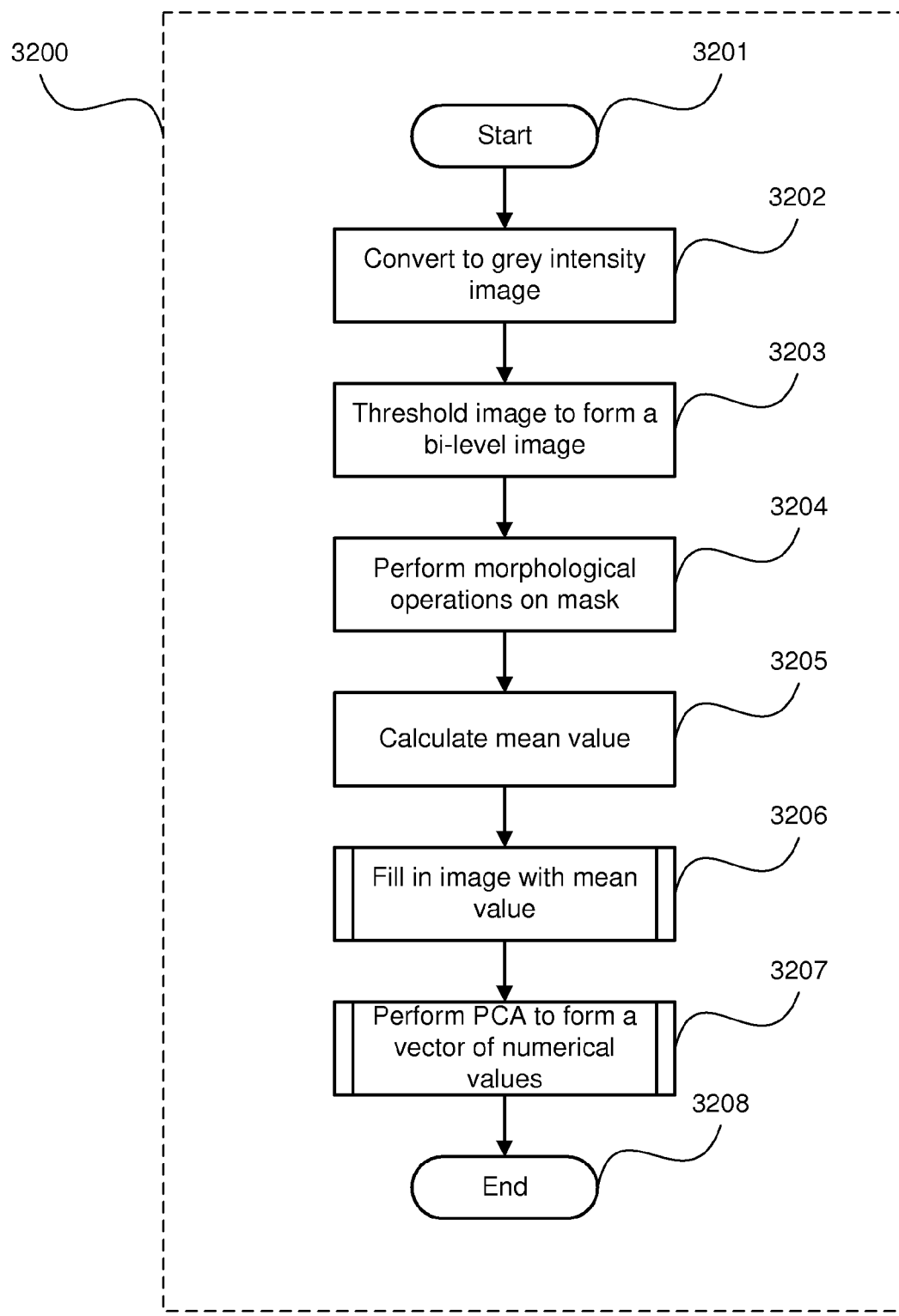
FIG. 32 is a flow diagram showing a method of characterising a coarsely-aligned image according to a second embodiment of the invention.

An alternative method 3100 for authenticating a protected document is described with reference to FIG. 31.

The method 3100 commences at an initial step 3101. A following step 3102 produces a scanned image by scanning the protected document. A following step 3103 applies a grey color filter to the scanned image to produce a grey channel intensity image. A following step 3104 detects spirals in the grey channel intensity image and calculates a coarse alignment affine transform. The method 1200 as described above is performed at step 3104. A following step 3105 extracts the salt data encoded in the coarse alignment border of the barcode. The method 1800 as described above is performed at step 3105. A following step 3106 determines a fine alignment warp map. The method 1900 as described above is performed at step 3106. A following step 3107 extracts data from the barcode to produce binary data. The method 2700 as described above is performed at step 3107. A following step 3108 deserializes the binary data produced in step 3107 to form a vector of numerical values. The binary data is deserialized by assigning the first $N_{bits}$ of the binary data to the first element in the vector. The next $N_{bits}$ of binary data is then assigned to the next element in the vector. This is repeated until all $N_v$ elements in the vector is assigned a value. A following step 3109 forms a second vector of numerical values by characterising the coarsely-aligned image during step 3106. The method 3200 as described below is performed at step 3109. A following step 3110 compares the two vectors generated in 3108 and 3109 to determine the authenticity of the protected document. The method performed at step 610 is used at step 3110. The method 3100 concludes at a terminating step 3111.

Characterising a Coarsely-Aligned Image

In this embodiment, the barcode 300 is printed in black ink occluding the document substrate region. Black pixel values in the image of the document substrate region represents missing image data due to the occluding barcode. If Principal Component Analysis (PCA) is applied directly to the image of the document substrate region, this results in an inaccurate characterisation of the image. Therefore, in this embodiment, black (or sufficiently dark) pixel values in the image, representing missing image data, are first filled-in with a mean value before PCA characterisation. Alternative methods of in-filling missing image data may be used instead of the method described below.

An alternative method 3200 of characterising a coarsely-aligned image, as executed at step 3109 is described.

The method 3200 commences at an initial step 3201. At a following step 3202 the coarsely-aligned image created at step 3106 is converted to a grey intensity image. At a following step 3203 the grey intensity image is thresholded to form a bi-level image differentiating dark regions and light regions. The bi-level image has the same dimensions as the grey intensity image with dark regions being represented with pixels set to one (1) and light regions being represented by pixels set to zero (0). Light regions in the grey intensity image are representations of the document substrate, whereas the dark regions are representations of printed black dots. At a following step 3204 a binary morphological operation, well-known in the art, is performed on the bi-level image such that regions of pixels set to one (1) are dilated. At a following step 3205 the mean value of pixels in the grey intensity image that have corresponding pixels in the bi-level image set to zero (0) is calculated. At a following step 3206 each pixel in the grey intensity image that have corresponding pixels in the bi-level image set to one (1) is set to the mean value as calculated at step 3205. The resulting image may be referred to as an adjusted grey intensity image. At a following step, Principal Component Analysis (PCA) is performed on the adjusted grey intensity image, as generated at step 3206, to generate a vector V of $N_v$ numerical values. PCA is a well-known method of characterising an image by its most significant components.

In this embodiment, the adjusted grey intensity image is projected onto $N_v$ orthogonal basis vectors. The set of basis vectors may be chosen beforehand by finding the most critical components of a large data set of document substrate region images. The vector V is formed by finding the residual when the adjusted grey intensity image is projected onto each of the $N_v$ basis vectors. Each element in the vector of numerical values V may be stored as a floating-point number that is $N_{bits}$ in size.

Thus, one way to match the paper substrate scan with data comprising a previous (known) image is by filling-in the dark printed barcode dots with the average value of the surrounding pixels, before performing the correlation. Other methods for dealing with the problem of printed dots obscuring the paper signature in particular regions of the underlying paper, is by ignoring these regions. This is effected by:

- detecting the scanned pixels with printed dots. This may be done by simply measuring the darkness of the pixel, and if it exceeds a threshold, marking it as a printed region;
- arranging for the correlation algorithm to skip these pixels, where the image of the substrate has been modified by subsequently printed dots, and
- normalising the result of the correlation by the ratio of skipped dots.

An alternate embodiment may use a mean square error metric for "similarity comparison" instead of correlation.

Third Embodiment

In a third embodiment, an alternative method for creating and authenticating a protected document is employed. In this embodiment, a similar barcode to that of the first embodiment is used. However, whereas the first embodiment embedded spirals in a document so that the document substrate region could be easily found, this embodiment uses a pre-determined or user-specified document substrate region. The barcode is then embedded in the same region and printed.

Ideally, the document substrate region in a scanned image is the same region as the barcode region, and therefore the document substrate region may be found by detecting barcode spirals. However, due to printing and scanning processes, the document substrate region may be slightly misaligned. Therefore, to compensate for these misalignments, a tiled comparison step, as described below, is employed.

Creating and Authenticating a Protected Document

Figure 33A:
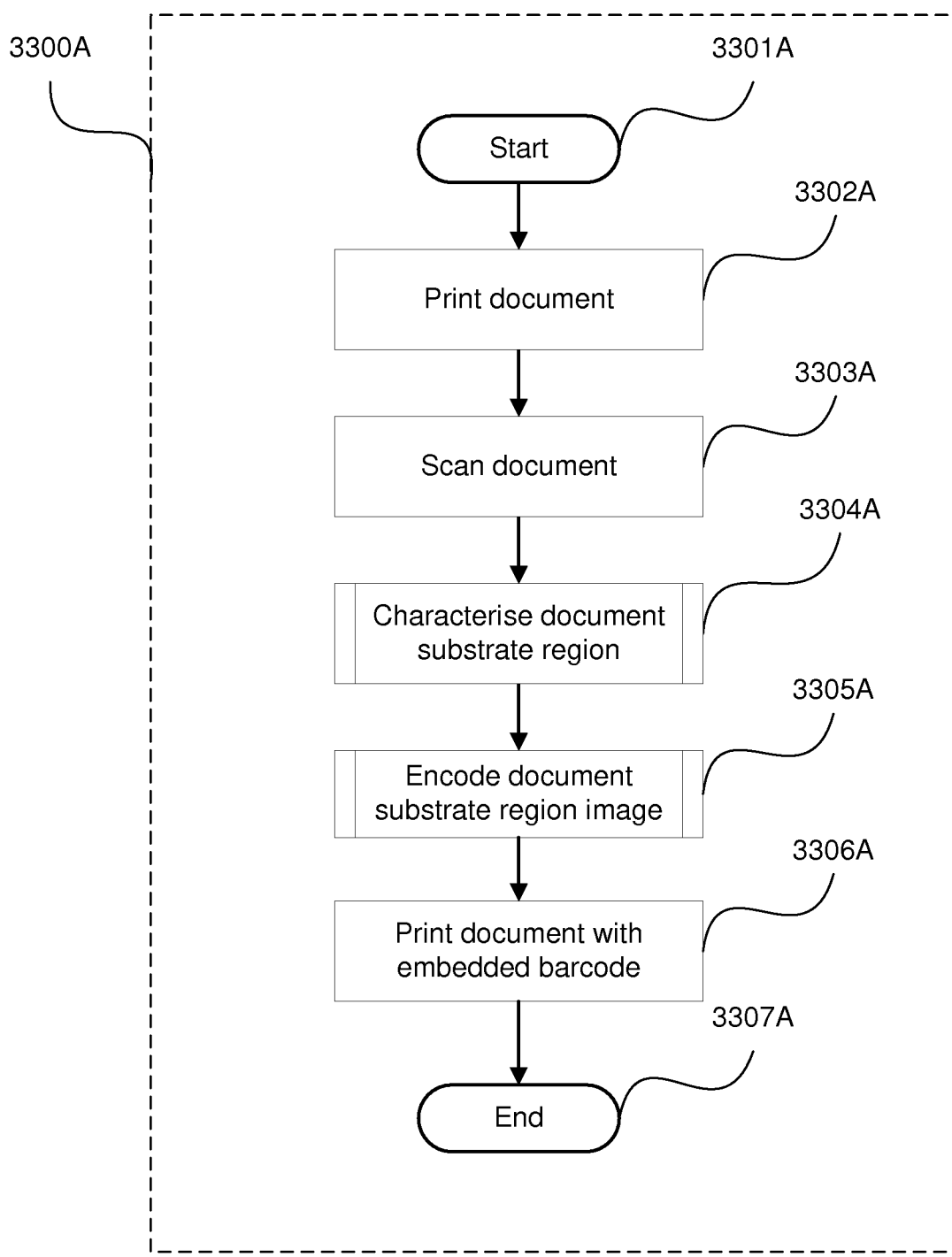
FIG. 33A is a flow diagram showing a method of creating a protected document according to a third embodiment of the invention.
Figure 34:
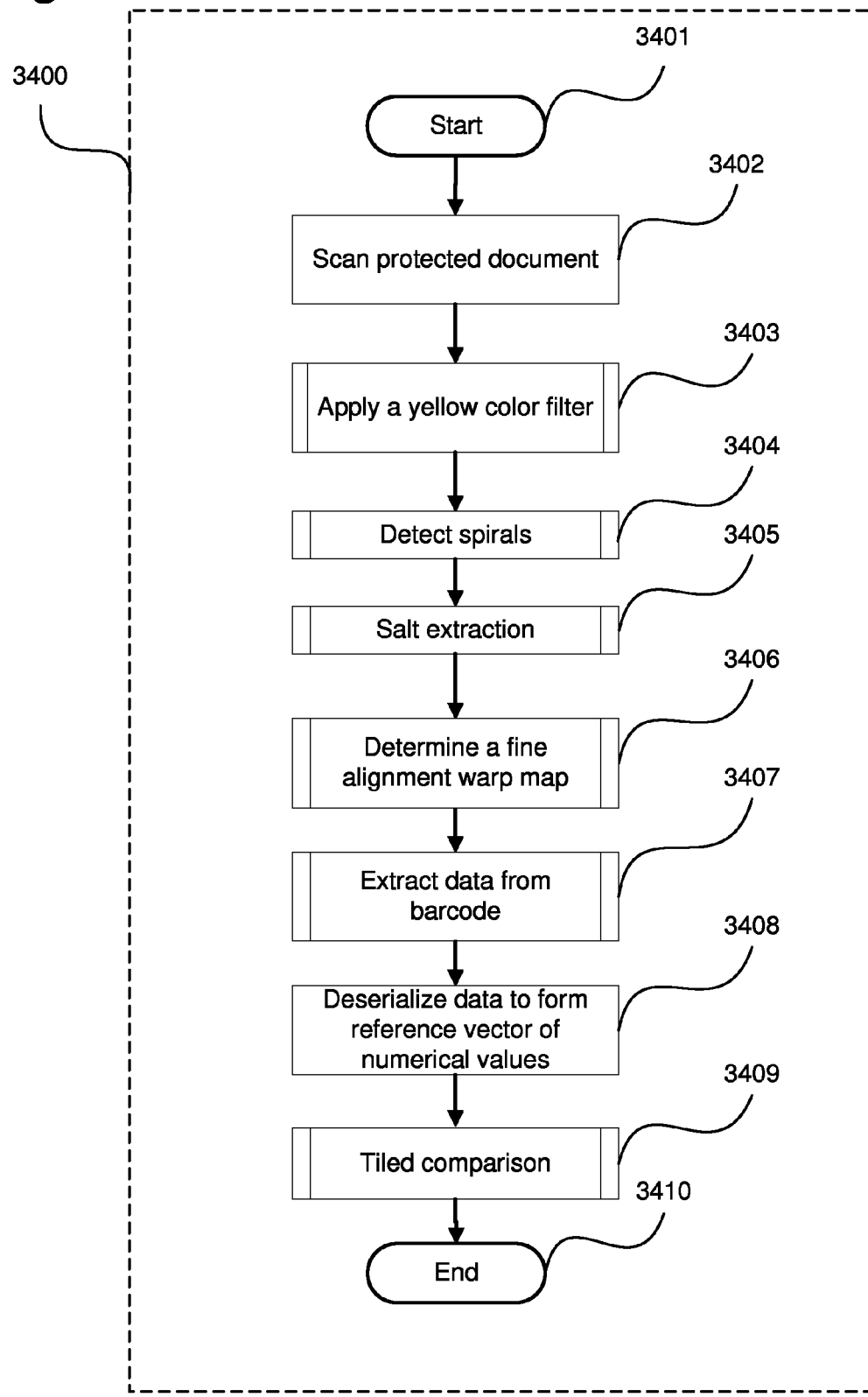
FIG. 34 is a flow diagram showing a method of authenticating a protected document according to a third embodiment of the invention.

An alternative method of creating and authenticating a protected document, relevant to this embodiment, is described below with reference to FIG. 33A and FIG. 34.

A method for creating a protected document 3300A commences at an initial step 3301A. A following step 3302A prints a document without any embedded protection features. A following step 3303A scans the document printed at step 3302A to create a scanned image of the document. A following step 3304A characterizes the document substrate region, specified by a pre-determined $X_{offset}$ and $Y_{offset}$, with a vector of numerical values. A method of characterizing the document substrate region in a scanned image, as described below, is employed in this embodiment. A following step 3305A encodes the vector of numerical values that characterizes the document substrate region image in a barcode, and embeds the barcode into a blank document for printing. A method for encoding and embedding a barcode, as executed at step 3305A, is described below. A following step 3306A prints the blank document with embedded barcode onto the document printed at step 3302 to form a protected document. The method 3300A concludes at a terminating step 3307A.

The method 3400 for authenticating a protected document commences at an initial step 3401. A following step 3402 produces a scanned image by scanning the protected document. A following step 3403 applies a yellow color filter, according to the method used at step 603 of method 600, to the scanned image to produce a yellow channel intensity image. A following step 3404 detects spirals in the yellow channel intensity image, according to the method used at step 604 of method 600, and calculates a coarse alignment affine transform. A following step 3405 extracts the salt data encoded in the coarse alignment border of the barcode according to the method used at step 605 of method 600. A following step 3406 determines a fine alignment warp map according to the method used at step 606 of method 600. A following step 3407 extracts data from the barcode to produce binary data according to the method used at step 607 of method 600. A following step 3408 deserializes the binary data produced in step 3407 to form a reference vector of numerical values. The binary data is deserialized by assigning the first $N_{bits}$ of the binary data to the first element in the vector. The next $N_{bits}$ of binary data is then assigned to the next element in the vector. This is repeated until all $N_v$ elements in the vector is assigned a value. A following step 3409 performs a tiled comparison in which tiles of images are characterized and compared to the reference vector of numerical values formed at step 3408. The method of performing a tiled comparison is described in detail below. The method 3400 then concludes at a terminating step 3411.

Characterizing a Document Substrate Region

In the first and second embodiment, an image of the document substrate region may be found by creating a coarsely-aligned image with the coarse alignment affine transform. However, in this embodiment, a document substrate region is pre-determined or user-specified.

In order to characterize the document substrate region in a scanned image, the region is first down-sampled by a factor of $R_p/R_c$. This will result in a barcode codel resolution image of the document substrate region.

The down-sampled image is then converted to a grey intensity image.

Principal Component Analysis (PCA) is performed on the grey intensity image to generate a vector V of $N_v$ numerical values. PCA is a well-known method of characterizing an image by its most significant components.

The grey intensity image is projected onto $N_v$ orthogonal basis vectors. The set of basis vectors may be chosen beforehand by finding the most critical components of a large data set of document substrate region images. The vector V is formed by finding the residual when the grey intensity image is projected onto each of the $N_v$ basis vectors.

Each element in the vector of numerical values V may be stored as a floating-point number that is $N_{bits}$ in size.

Encoding Document Substrate Region Image

In previous embodiments, barcode spirals are embedded and printed at a prior stage to the rest of the barcode (e.g. barcode data codels, etc). However, in this embodiment, the barcode is generated and printed in its entirety.

Figure 33B:
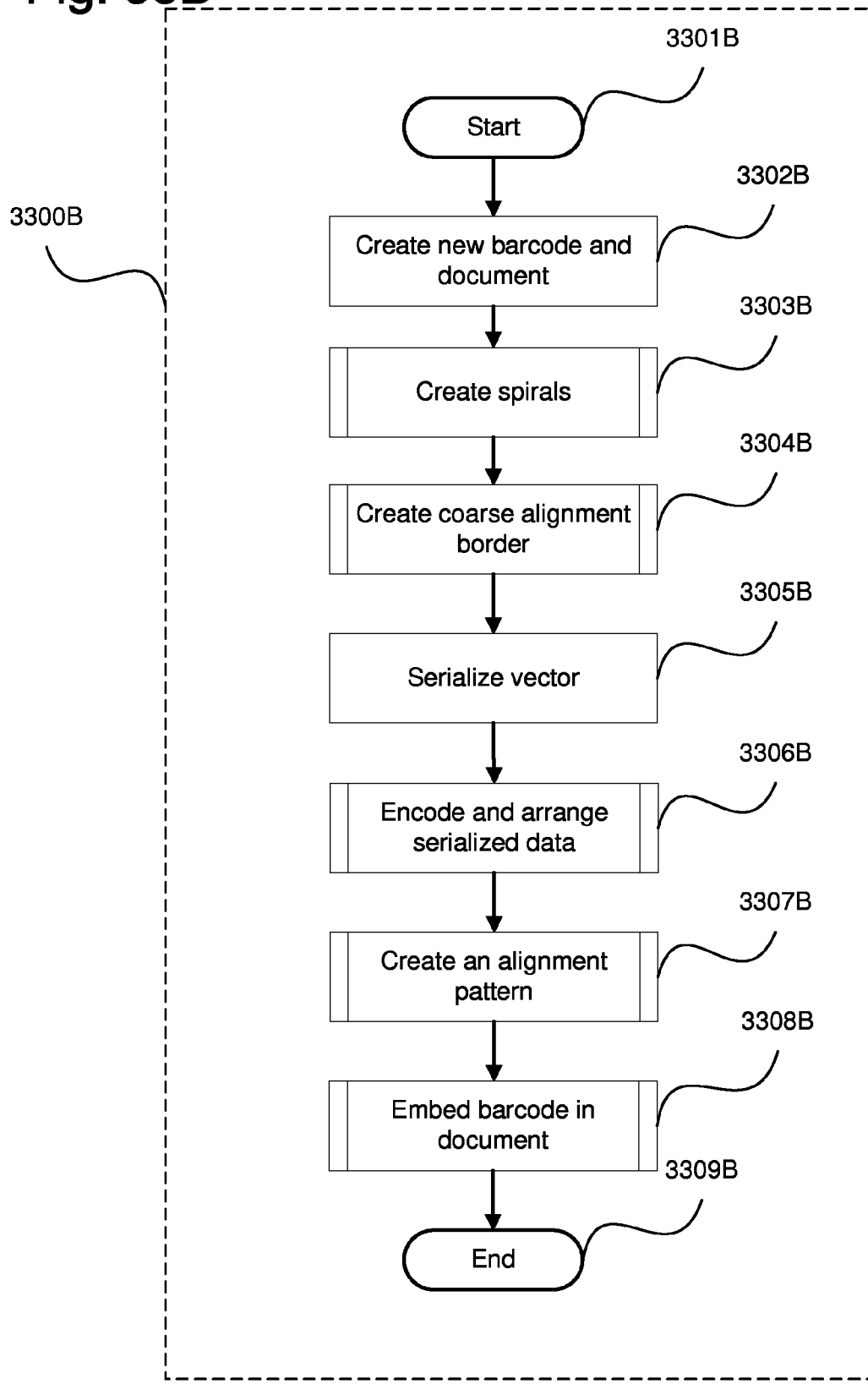
FIG. 33B is a flow diagram showing a method of encoding document substrate characteristics in a barcode according to a third embodiment of the invention.

Therefore, an alternative method 3300B of encoding a document substrate region image in a barcode, as executed at step 3305A, is described with reference to FIG. 33B.

The method 3300B commences at an initial step 3301B. A following step 3302B creates a new barcode and a blank document. The new barcode created also has width $W_{bb}$ and height $H_{bb}$. The blank document is a color image with a resolution $R_p$. The blank document is initially empty. A following step 3303B creates spirals in the barcode in accordance with the method used at step 702 in method 700. A following step 3304B creates a coarse alignment border in the barcode according to the method used at step 1303 of the method 1300B. A following step 3305B serializes the vector of numerical values, V, which characterizes the image of the document substrate region. The resulting binary data is encoded and arranged in a barcode at step 3306B according to the method used at step 1305 of method 1300. A following step 3307B creates an alignment pattern in the barcode interior 302 according to the method used at step 1306 of method 1300. A following step 3308B embeds the barcode in the blank document in the barcode region also specified by $X_{offset}$ and $Y_{offset}$, according to the method used at step 1307 of method 1300, in preparation to be printed. The method 3300B is concluded at a terminating step 3309B.

Tiled Comparison

The authenticity of a protected document is determined, in this embodiment, by a tiled comparison method.

In a tiled comparison, candidate document substrate regions in the vicinity of the barcode region are characterized, and the resulting vectors of numerical values are compared to the reference vector of numerical values formed in 3407.

The method of tiled comparison involves setting parameters of a tile width $W_t$, tile height $H_t$, a step size S and a number of steps $N_s$. The tile width $W_t$ and tile height $H_t$ are equal to the width $W_{bb}$ and height $H_{bb}$ of the barcode. The step size S and number of step $N_s$ may be varied. Larger values of step size S will increase the risk of falsely classifying a protected document as a forgery. Larger values of $N_s$ will be required if there are large misalignments from the printing process. However, larger values of $N_s$ will increase computation time.

Figure 35:
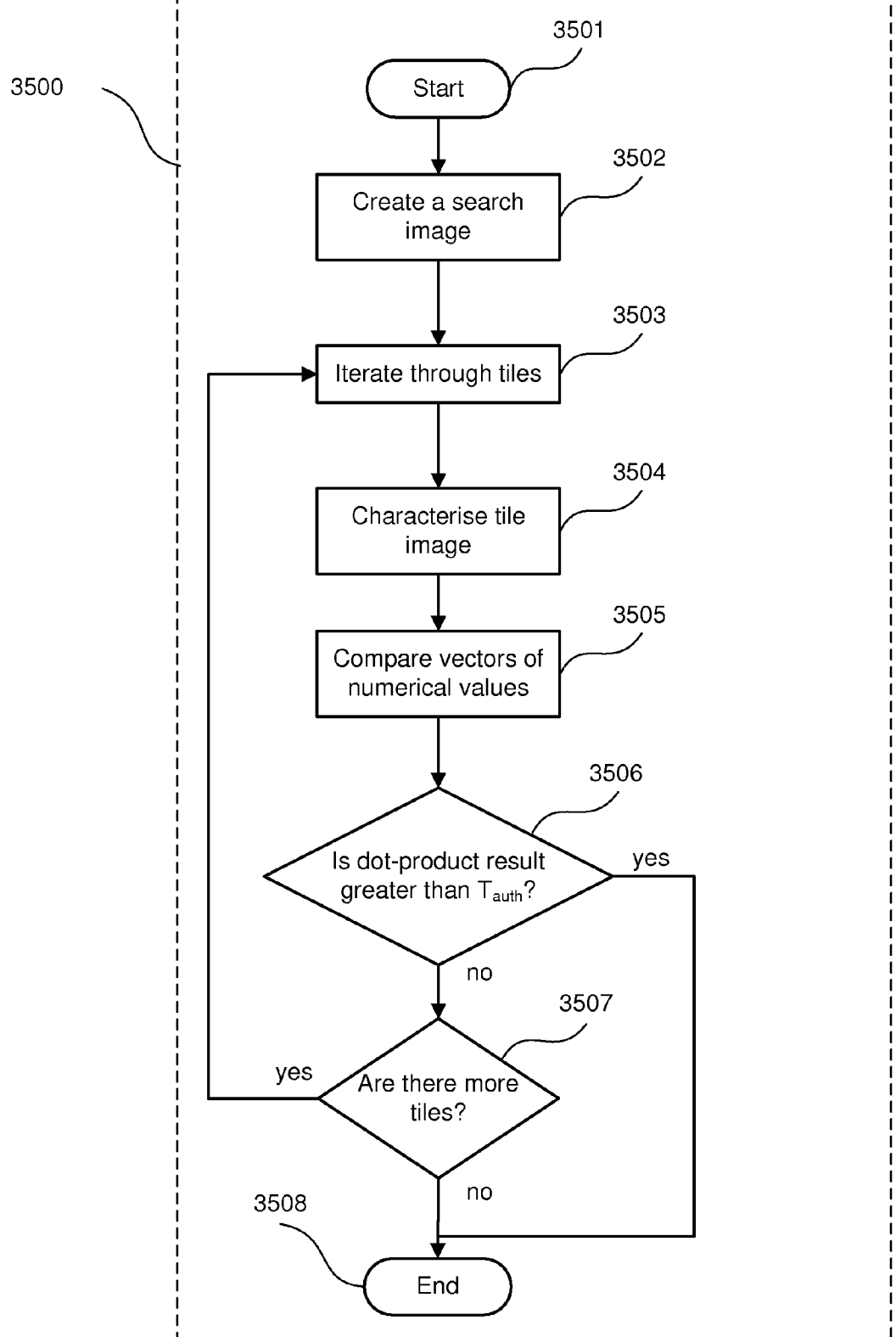
FIG. 35 is a flow diagram showing a method of tiled comparison according to a third embodiment of the invention.

The method 3500 for performing a tiled comparison, as executed at step 3409 is described in detail with reference to FIG. 35.

Figure 36:
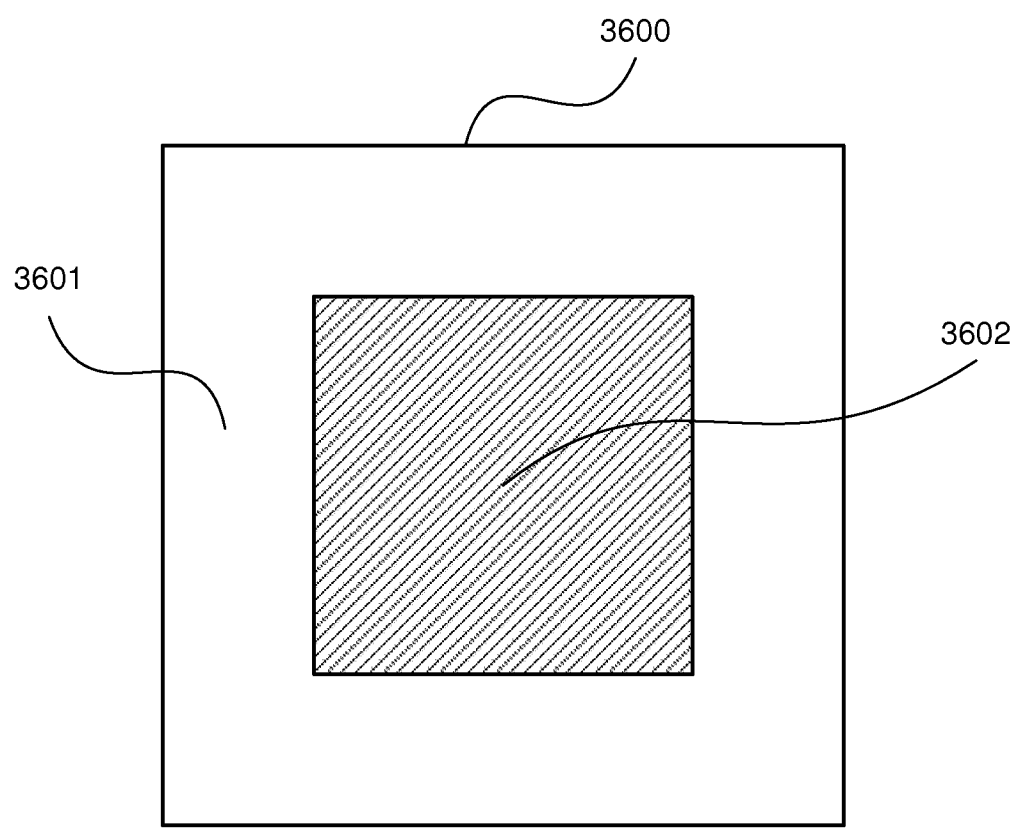
FIG. 36 shows the region in a scanned image represented by a search image, including the barcode region and surrounding border region.

The method 3500 commences at an initial step 3501. A following step 3502 creates a search image using the coarse alignment affine transform from the scanned image that is larger than the document substrate region, but centred on the document substrate region. The width of the search image $W_{search}$ may be set to $W_t+(N_s \times S)$ and the height of the search image $H_{search}$ is similarly set to $H_t+(N_s \times S)$. In this embodiment, $N_s=40$ and $S=1$. The search image will be a coarsely-aligned image of the barcode region with a surrounding border. This is shown in FIG. 36 in which the region in the scanned image to be represented by the search image 3600 includes the barcode region 3602 and a surrounding border 3601.

The coarse alignment affine transform may be used to map coordinates in the search image to coordinates in a scanned image. However, since the region in the scanned image to be represented by the search image 3600 is larger than the barcode region 3602, the coordinates in the search image will need to be pre-transformed before using the coarse alignment affine transform to map into coordinates of the scanned image. The coordinates ($x_{search}$, $y_{search}$) in each pixel in the search image is pre-transformed into coordinates (x, y) suitable for use with the coarse alignment affine transform by the following equations:

$$x = (x_{search} - \text{ceil}((N_s \times S)/2))$$

$$y = (y_{search} - \text{ceil}((N_s \times S)/2))$$

Figure 37:
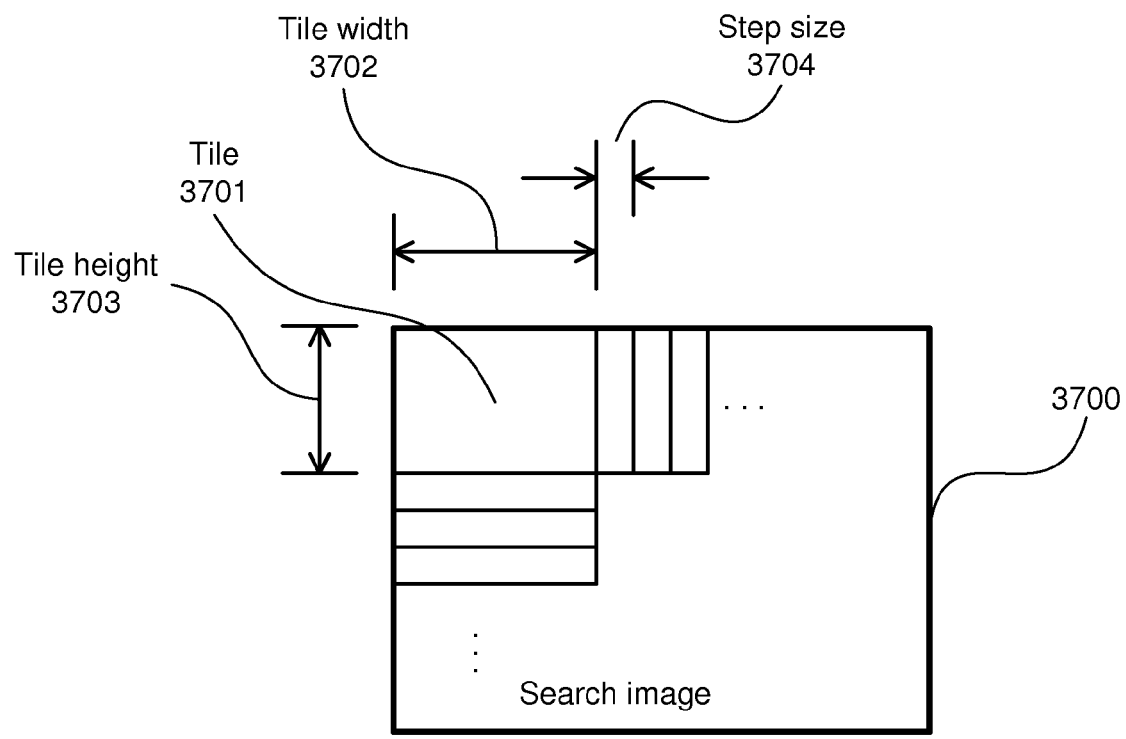
FIG. 37 shows a tile in the search image.
Figure 38:
FIGS. 38 to 42 show a QR code, a DataGlyph barcode, a DataMatrix barcode, dot code and a linear bar code, respectively, each of which may be substituted for the barcode of FIG. 3 in the described methods for generating and/or authenticating security documents.
Figure 39:
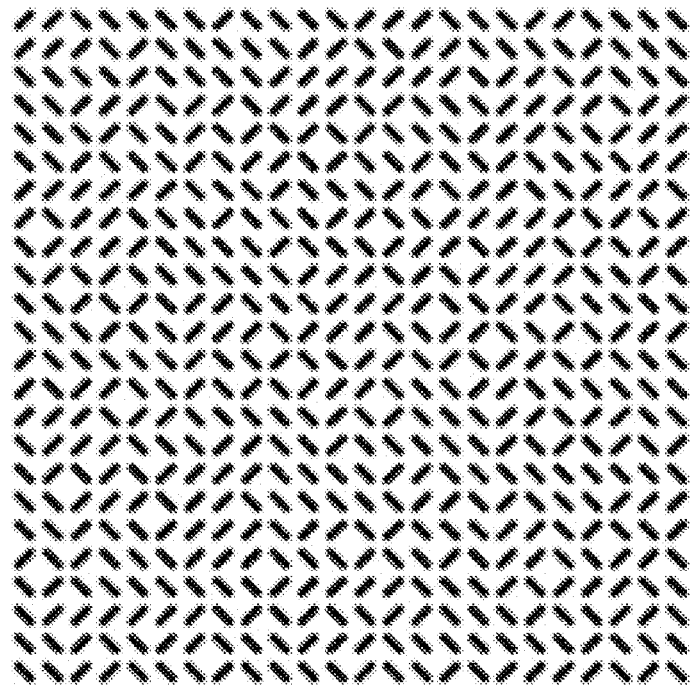
Figure 40:
Figure 41:
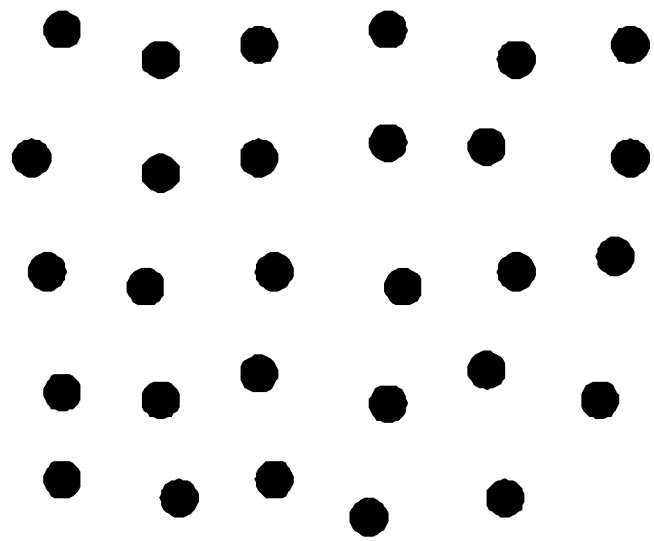
Figure 42:
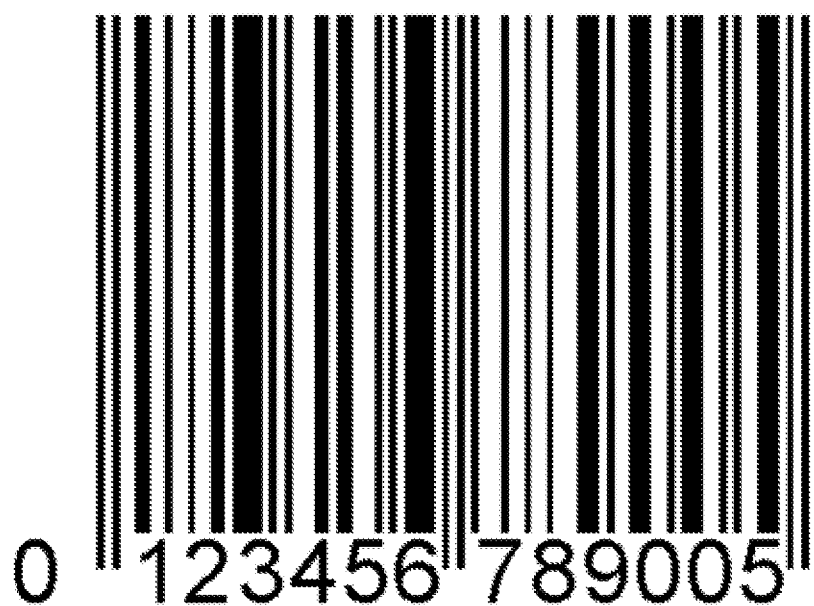

The search image is divided into overlapping tiles prior to characterization and comparison. FIG. 37 depicts the choice of tiles and is an illustration of tile width $W_t$ and height $H_t$, and of the step size S. A tile 3701 is shown in the search image 3700 and has a width $W_t$ 3702 and height $H_t$ 3703. The tile 3701 is stepped in horizontal increments of S, as shown as 3704.

A following step 3503 iterates through the tiles as just described. On the first execution of 3503 the top-left corner tile is selected. On subsequent executions of step 3503, tiles are selected from left to right in each row of tiles, starting at the top row of tiles and finishing at the bottom row of tiles.

A following step 3504 characterizes the tile image according to the method similar to the method used at step 1105 of method 1100 to produce a vector of numerical values subV for that tile.

A following step 3505 compares the vector of numerical values subV found at step 3504 with the reference vector of numerical values found at step 3408. The reference vector of numerical values found at step 3408 may be denoted as refV. To compare the two vectors, refV and subV, the normalized dot-product of the two vectors is taken. The normalized dot-product between vectors indicates how closely-related one vector is to another. A dot-product close to one (1) indicates a strong relationship between the two vectors, whereas a dot-product close to zero (0) or less than zero (0) indicates a weak relationship. The normalized dot-product of refV and subV is defined by the following formula:

$$refV \cdot subV = \sum_{i=1}^{N_v} \frac{refV_i}{\|refV\|} \frac{subV_i}{\|subV\|}$$

At a following step 3506, the result of the normalized dot-product, calculated at step 3505, is compared to a threshold value $T_{auth}$. If the result is greater than $T_{auth}$ then the protected document is determined to be authentic and the method 3500 is concluded at a terminating step 3508.

If the normalized dot-product result is less than $T_{auth}$ then a following step 3507 determines if there are more tiles to be processed. If there are no tiles, the protected document is deemed to be a forgery and the method 3500 concludes at a terminating step 3508. Otherwise, the method returns to step 3503.

Similar to the first and second embodiments, $T_{auth}=0.5$, though other values of $T_{auth}$ may be determined from analysis of falsely-positive authentic results and falsely-negative forgery results. Any method of determining a suitable of $T_{auth}$ may be used, including but not limited to, machine-learning methods and methods of adjusting $T_{auth}$ by specifying a required ratio between false-positive and false-negative results.

Fourth Embodiment

In a fourth embodiment, an alternative method for creating and authenticating a protected document is employed. In this embodiment, a red channel intensity image of the document substrate region is obtained by scanning the sheet. The red channel intensity image is then processed and printed back onto the sheet in yellow ink. The red channel is used because it is not affected by a yellow ink overprint. Unlike the previous embodiments, a barcode is not required, nor are spirals required for alignment.

The document is authenticated by scanning and performing a phase correlation on the yellow channel intensity image (formed by the ink pattern) and the red channel intensity image (formed by the document substrate, unaffected by the ink pattern). The presence of a positive peak in the correlation result above a predetermined threshold authenticates the sheet, and also indicates the spatial offset between the yellow printed image and the document substrate region.

Creating and Authenticating a Protected Document

Figure 43:
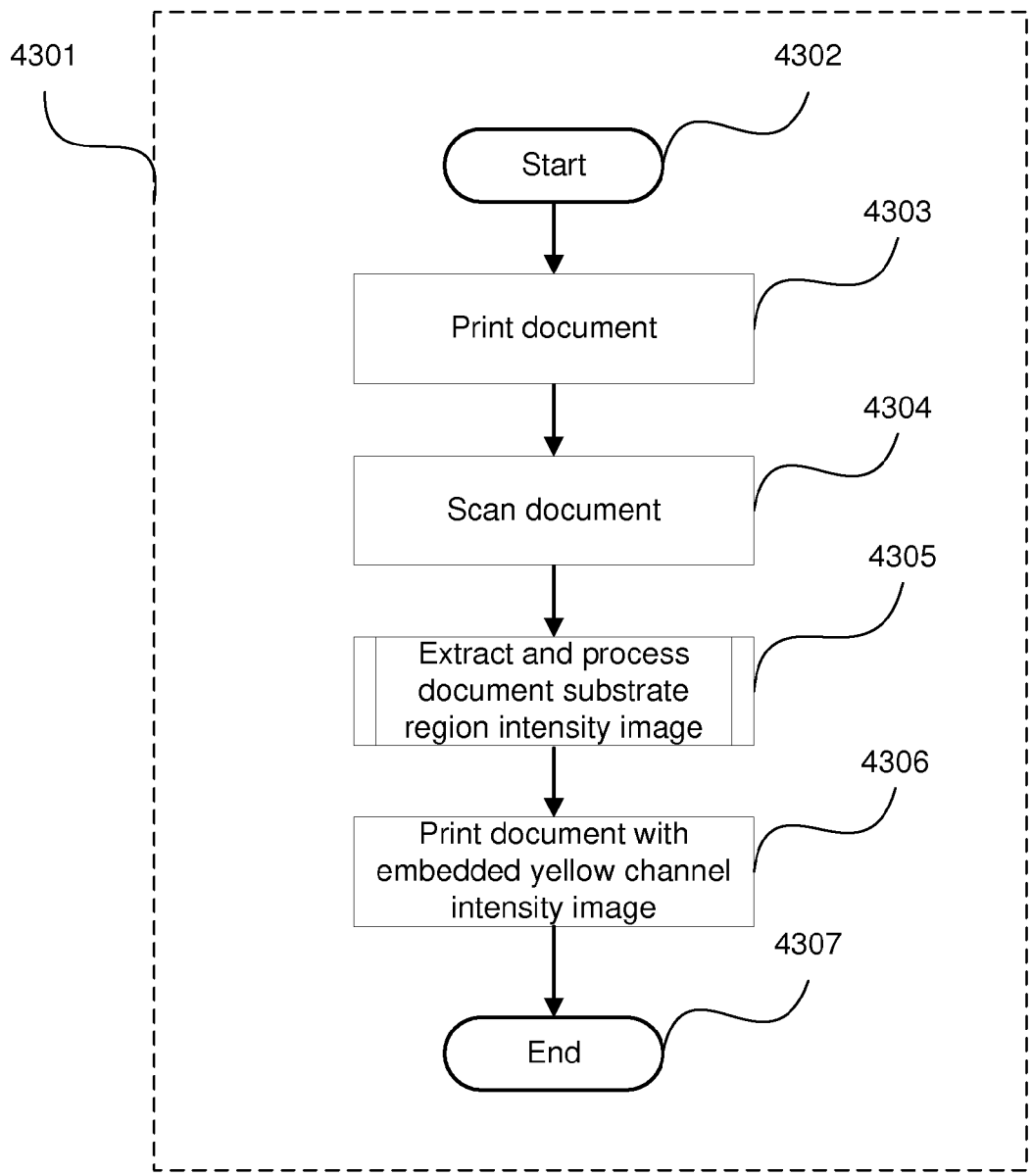
FIG. 43 is a flow diagram showing a method of creating a protected document according to a forth embodiment of the invention.
Figure 44:
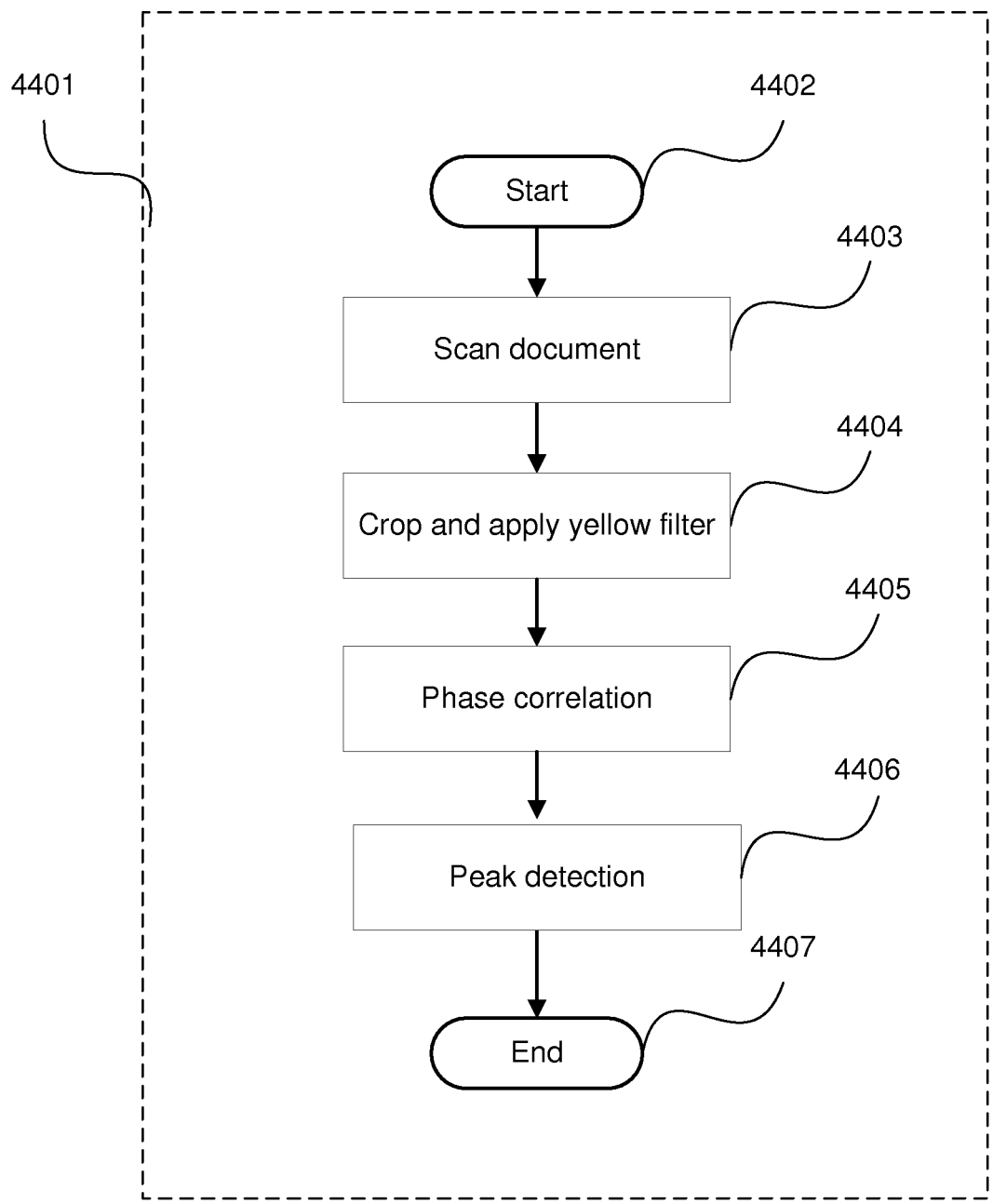
FIG. 44 is a flow diagram showing a method of authenticating a protected document according to a forth embodiment of the invention.

An alternative method of creating and authenticating a protected document, relevant to this embodiment, is described below with reference to FIG. 43.

A method 4301 for creating a protected document begins at initial step 4302.

A following step 4303 prints a document without any embedded protection features.

A following step 4304 scans the document printed at step 4303 to create a scanned image of the document.

A following step 4305 extracts the document substrate region image from the red channel of the scan obtained in step 4304, specified by a pre-determined $X_{offset}$, $Y_{offset}$, $X_{size}$ and $Y_{size}$, and processes the document substrate region image to create a greyscale channel intensity image for subsequent printing over the document substrate region. A method of processing the document substrate region image, as described below, is employed in this embodiment.

A following step 4306 prints the document with the greyscale channel intensity image created by step 4305 at a predetermined location on the sheet in yellow ink. The predetermined location is preferably the document substrate region specified in step 4305 but can be any other location on the sheet.

The method 4301 concludes at terminating step 4307.

A method 4401 for authenticating a protected document begins at an initial step 4402.

A following step 4403 scans the protected document to create a scanned image of the document.

A following step 4404 extracts the yellow channel intensity image printed by step 4306 of the method 4301. The scanned image is cropped to the predetermined position and size where the yellow channel intensity image was printed. A yellow filter is then applied to the image to obtain the yellow channel intensity image. This is performed by inverting the blue channel of the scan and discarding the red and green channels.

A following step 4405 performs a phase correlation operation on the red channel of the scan obtained in step 4403 (the document substrate intensity image), using the yellow intensity image as a kernel.

A following step 4406 performs a peak detection operation on the correlation result of step 4405. A negative peak shall be present in the result due to the presence of the document substrate pattern in both images. However, the presence of a positive peak above a predetermined threshold indicates that the yellow ink image correlates with the document substrate region, and therefore the sheet is authentic. The absence of a positive peak indicates that the sheet is not authentic.

The method 4401 concludes at terminating step 4407.

Processing an Intensity Image to Increase Contrast

The greyscale intensity image of the document substrate region is processed before printing in order to use the full dynamic range of the printer. The mean and standard deviation of the greyscale intensity image pixel values are obtained. The pixel values are then shifted by the negative of the mean, such that the mean value becomes zero. The image pixel values are then multiplied by the following value:

$$R/(5s),$$

where R is the range of printable pixel values (for example, 256 for an 8-bit dynamic range) and s is the standard deviation of the pixel values. The pixel values are then shifted by (R/2) such that the mean value becomes the centre value of the allowable pixel values. Pixel values outside the range of printable values are then clipped to the maximum or minimum.

Other Arrangements

The foregoing text describes only some embodiments of the disclosed coding/decoding methods, and modifications and/or changes can be made thereto without departing from the scope and spirit of the method, the discussed embodiments being illustrative and not restrictive.

For example, in the described first and third embodiments, barcodes are embedded in the yellow channel of a document, and printed in yellow ink to form a protected document. Subsequently, yellow color filters are applied to recover and decode the barcode. In these embodiments, yellow is chosen because yellow does not contribute significantly when an image is converted to a grey intensity image. Therefore, in characterization steps, the yellow barcode does not contribute significantly to the resulting vector of numerical values.

Alternative colors of barcodes may be used such that the textural variations in the document substrate region may still be imaged under the colored barcode.

The barcode discussed in the previous sections is a dense grid of codels with aligning features. However, any barcode may be used instead to encode the characteristics of an image of a document substrate region. For example, the QR codes, the DataGlyphs, the DataMatrix code, linear bar code and a simple dot code, as shown in FIGS. 38 to 42, may also be used.

In embodiments discussed in the previous sections, Principal Component Analysis (PCA) is used to characterize a grey intensity image of the document substrate region. PCA delivers a high compression ratio so that the characteristics of the image of the document substrate region may be encoded in a barcode format.

Other characterization or compression methods may be employed instead of PCA. For example, JPEG compression may be used to reduce the storage size of an image of the document substrate region. Also, the image may be encoded in a barcode without compression or characterization, if a barcode with sufficient data storage capacity is used.

Also, in embodiments discussed in the previous sections RSA encryption may be used prior to encoding and arranging binary data in a barcode. However, alternative public/private key encryption techniques may be substituted for RSA encryption.

Despite the protection measures described in the previous embodiments, a determined forger might still be able to copy a protected document. A method of circumventing the protection measures is to obtain an image of the original document substrate region and printing the image onto a second document substrate which is smooth and bleached white. When scanned, the printed image of the document substrate region will be prominent. Therefore, upon authentication, the printed image of the document substrate region is characterized and will match the characteristics encoded in the barcode.

However, the printed image of the document substrate region will be darker than the original document substrate. Therefore, forgeries created in the above-mentioned manner may be foiled by additionally encoding the relative intensity between the original document substrate region and a reference intensity value in the barcode.

For example, the average intensity value of the original document substrate may be obtained by averaging the intensity values of an image of the original document substrate region. A reference intensity value may be found by averaging intensity values of printed black ink regions in a scanned image of the document. Another reference intensity value may be found by averaging intensity values of empty regions in a scanned image of the document. Any intensity value that is not dependent on the intensity values of the document substrate region may be used as a reference intensity value. The difference between the average intensity value of the original substrate and the reference intensity value may then be encoded in the barcode. Thus, apart from comprising data associated with at least one characteristics of the image of the document substrate region, the barcode will also comprise coded data indicative of the difference between the average intensity value of the original substrate and the reference intensity value.

When the protected document is scanned and authenticated, the average intensity value of the document substrate and the reference intensity value are recovered from the scanned image of the protected document. The recovered intensity values are then differenced, and compared with the value encoded in the barcode. If the recovered difference value is sufficiently close to the encoded difference value, then the document may be deemed authentic. Otherwise, the document may be deemed a forgery.

Alternatively, the document may be deemed "suspicious" and the user is notified to examine the document in greater detail.

INDUSTRIAL APPLICATIONS

The invention, at least in its preferred embodiments, may be applied to determine the authenticity of a printer ink cartridge. A label comprising a fibrous substrate layer, such as paper, may carry a barcode such as the barcode described in previous embodiments of the invention. The barcode may encode an image of a region on the surface of the label. The label is then affixed to the printer cartridge so that authentication may be carried out at a later stage, according to the methods described hereinbefore.

Another potential industrial application is associated with determining the authenticity of pharmaceutical products. The packaging of many pharmaceutical products is often in metal foil and plastic blister packs. The metal foil substrate may carry a barcode such as the barcode described hereinbefore. The barcode may be printed directly onto the metal foil substrate and encode structural of otherwise characteristics of a region of the substrate. Authentication may be carried out at a later stage, according to the authentication methods described in the previous sections.

It is apparent from the above description that the described arrangements are applicable to many industries related to printing, data encoding/decoding, data processing and document security.

The invention claimed is:

1. A method for printing a security document on a substrate, comprising the steps of:
    locating a reference region on a substrate based on at least one location identification arrangement printed on the substrate, the reference region being distinct from and in a predetermined spatial arrangement with respect to the at least one location identification arrangement;
    generating a first reference image of the reference region of the substrate, the first reference image being indicative of an inherent characteristic of the substrate in the reference region;
    generating encoded data indicative of the inherent characteristic of the substrate, wherein the encoded data comprises a red channel intensity image of the reference region of the substrate; and
    printing the encoded data over the reference region of the substrate to enable the encoded data to be located on the substrate using the at least one location identification arrangement printed on the substrate.

2. The method for printing a security document on a substrate of claim 1, wherein the encoded data is overlaid on the reference region of the substrate in a manner which allows a second reference image of the reference region to be generated, the second reference image being indicative of the inherent characteristic of the underlying substrate, such that a comparison between data of the inherent characteristic of the substrate in the reference region, obtained from the encoded data and from the second reference image, is indicative of the authenticity of the substrate.

3. The method for printing a security document on a substrate of claim 2, wherein the encoded data is printed on the underlying substrate in a color substantially different from one or more colors associated with the inherent characteristic of the substrate, so that data associated with the inherent characteristic of the substrate is extracted from the second reference image by filtering out the image of the encoded data.

4. The method for printing a security document on a substrate of claim 3,
    wherein the encoded data is printed on the substrate in a yellow color.

5. The method for printing a security document on a substrate of claim 2 wherein, when data of the second reference image is compared with the encoded data, data of one or more sections of the reference region, modified as a result of dots being printed after the first reference image has been taken, is removed from consideration.

6. The method for printing a security document on a substrate of claim 2 wherein, when data of the second reference image is compared with the encoded data, data of one or more sections of the reference region, modified as a result of dots being printed after the first reference image has been taken, is filled-in on the basis of the color of sections of the second reference image adjacent to the respective modified sections.

7. The method for printing a security document on a substrate of claim 1, the method further comprising the steps of:
generating a bitmap of an intermediate document, the bitmap comprising the at least one location identification arrangement;
printing the intermediate document on the substrate;
scanning the printed intermediate document;
locating on the scanned intermediate document a reference region of the substrate that is located in a predetermined spatial arrangement with respect to the at least one location identification arrangement;
generating the encoded data comprising the inherent characteristic of the substrate in the reference region;
including the encoded data in the bitmap of the intermediate document, thus forming a bitmap of the security document; and
printing the security document on the substrate of the printed intermediate document, such that the encoded data is overlaid on the reference region of the substrate.

8. The method for printing a security document on a substrate of claim 1, wherein the encoded data also comprises data indicative of the relative difference in the intensity of the reference region and a reference intensity of the printed encoded data.

9. The method of printing a security document on a substrate according to claim 7, wherein the at least one location identification arrangement comprises at least three spirals defining an area of a predetermined shape for enclosing the reference region of the substrate.

10. The method of printing a security document on a substrate according to claim 1, wherein the substrate is a paper sheet.

11. The method of printing a security document on a substrate according to claim 9, wherein the inherent characteristic of the paper sheet is a structural characteristic.

12. A method for authenticating a security document, the security document being printed on a substrate by:
locating a reference region on a substrate based on at least one location identification arrangement printed on the substrate, the reference region being distinct from and in a predetermined spatial arrangement with respect to the at least one location identification arrangement;
generating a first reference image of the reference region of the substrate, the first reference image being indicative of an inherent characteristic of the substrate in the reference region;
generating encoded data indicative of the inherent characteristic of the substrate, wherein the encoded data comprises a red channel intensity image of the reference region of the substrate; and
printing the encoded data over the reference region of the substrate to enable the encoded data to be located on the substrate using the at least one location identification arrangement printed on the substrate, wherein the encoded data is overlaid on the reference region of the substrate in a manner which allows a second reference image of the reference region to be generated, the second reference image being indicative of the inherent characteristic of the underlying substrate, such that a comparison between data of the inherent characteristic of the substrate in the reference region, obtained from the encoded data and from the second reference image, is indicative of the authenticity of the substrate,
the method of authenticating the security document comprising the steps of:
scanning the security document to obtain the first reference image;
detecting the reference region of the substrate from the first reference image;
extracting and decoding the data encoded in the detected reference region of the substrate;
obtaining the second reference image of the reference region of the substrate; and
comparing data associated with the inherent characteristic of the reference region of the substrate and obtained from the decoded data, with respective data obtained from the second reference image.

13. The method for authenticating a security document printed on a substrate according to claim 12, wherein the encoded data is printed on the substrate in a yellow color, wherein the step of comparing data obtained from the decoded data with respective data obtained from the second reference image comprises the sub-steps of:
applying a yellow filter to the first reference image to obtain a yellow channel intensity image comprising the coded data;
performing a phase correlation on the red channel of the first reference image on the basis of the yellow intensity image; and
performing a peak detection on the performed phase correlation,
the presence of a positive peak above a predetermined threshold being indicative of the authenticity of the security document.

14. A system for printing a security document on a substrate, the system comprising:
a processing device that generates a bitmap of an intermediate document, the bitmap comprising at least one location identification arrangement;
a printing device, controlled by the processing device, that prints the intermediate document including the at least one location identification arrangement on the substrate; and
a scanning device that scans the printed intermediate document including an inherent characteristic of the substrate associated with the at least one location identification arrangement;
wherein said processing device further functions to locate on the scanned intermediate document a reference region of the substrate that is distinct from and is located in a predetermined spatial arrangement with respect to the at least one location identification arrangement;
generate encoded data comprising the inherent characteristic of the substrate in the reference region, wherein the encoded data comprises a red channel intensity image of the reference region of the substrate;
include the encoded data in the bitmap of the intermediate document, thus forming a bitmap of the security document; and
instruct the printing device to print the security document on the substrate of the printed intermediate document, such that the encoded data is overlaid on the reference region of the substrate using the at least one location identification arrangement.

15. A system for authenticating a security document printed on a substrate, the security document comprising a reference region of the substrate located based on at least one location identification arrangement printed on the substrate and for which a first reference image of the reference region is indicative of an inherent characteristic of the substrate in the reference region, and encoded data printed over the reference region, the encoded data being indicative of the inherent characteristic of the substrate; and enabled for location on the substrate using the at least one location identification arrangement printed on the substrate, the system comprising:
- a scanning device for scanning the security document; and
- processing means for processing an image obtained from the scanning device to:
  - detect the reference region of the substrate based on the at least one location identification arrangement, the reference region being distinct from and in a predetermined spatial arrangement with respect to the at least one location identification arrangement;
  - extract and decode the data encoded in the reference region of the substrate, wherein the data encoded in the reference region comprises a red channel intensity image of the reference region of the substrate;
  - process the image of the reference region of the substrate; and
  - compare data associated with a structural characteristic of the reference region of the substrate, obtained from the decoded data, with respective data of the same structural characteristic obtained from the processed image.

* * * * *